US010922445B2

(12) United States Patent
Speak et al.

(10) Patent No.: US 10,922,445 B2
(45) Date of Patent: Feb. 16, 2021

(54) COMPUTING SYSTEMS AND METHODS

(71) Applicant: BANKVAULT PTY LTD, Perth (AU)

(72) Inventors: Graeme Speak, West Perth (AU); Chris Hoy Poy, Success (AU); Neil Richardson, Cannington (AU); Peter Grant McCredie, Mullaloo (AU); Adam Law, Floreat (AU); Corrado Fiore, Perth (AU)

(73) Assignee: BANKVAULT PTY LTD, West Perth (AU)

( * ) Notice: Subject to any disclaimer, the term of this patent is extended or adjusted under 35 U.S.C. 154(b) by 409 days.

(21) Appl. No.: 15/532,655

(22) PCT Filed: Dec. 1, 2015

(86) PCT No.: PCT/AU2015/050758
§ 371 (c)(1),
(2) Date: Jun. 2, 2017

(87) PCT Pub. No.: WO2016/086269
PCT Pub. Date: Jun. 9, 2016

(65) Prior Publication Data
US 2017/0364713 A1  Dec. 21, 2017

(30) Foreign Application Priority Data

Dec. 2, 2014  (AU) ............................... 2014904884
Dec. 3, 2014  (AU) ............................... 2014904902
May 31, 2015 (AU) ............................... 2015902028

(51) Int. Cl.
*G06F 21/85* (2013.01)
*G06F 21/53* (2013.01)
*G06F 21/31* (2013.01)
*G06F 21/34* (2013.01)
*G06F 21/70* (2013.01)

(52) U.S. Cl.
CPC .............. *G06F 21/85* (2013.01); *G06F 21/31* (2013.01); *G06F 21/34* (2013.01); *G06F 21/53* (2013.01); *G06F 21/70* (2013.01)

(58) Field of Classification Search
CPC .......... G06F 21/34; G06F 21/53; G06F 21/85; G06F 21/31; G06F 21/70
See application file for complete search history.

(56) References Cited

U.S. PATENT DOCUMENTS

| 9,286,459 B2 * | 3/2016 | Hogg | ...................... G06F 9/442 |
| 2005/0182967 A1 * | 8/2005 | Phillips | ............... H04L 63/1433 726/5 |
| 2008/0016345 A1 * | 1/2008 | Holden | ................. H04L 63/105 713/166 |

(Continued)

*Primary Examiner* — Alexander Lagor
*Assistant Examiner* — Vu V Tran
(74) *Attorney, Agent, or Firm* — Patenttm.US

(57) ABSTRACT

A security device for a local computer, said security device comprising a locked-down system environment that includes a remote-access connector and an authenticator facility. The remote-access connector initiates a remote connection request with a virtual-computer service. The authenticator facility provides first authentication-data to the remote-access connector for ensuring that the security device has permission to be allocated a virtual computer from the virtual-computer service.

16 Claims, 39 Drawing Sheets

(56) References Cited

U.S. PATENT DOCUMENTS

| | | | | |
|---|---|---|---|---|
| 2008/0256536 A1* | 10/2008 | Zhao | ................... | G06F 9/45537 718/1 |
| 2009/0319782 A1* | 12/2009 | Lee | ........................ | G06F 21/34 713/156 |
| 2014/0214922 A1* | 7/2014 | Kim | ................... | G06F 9/45558 709/203 |

* cited by examiner

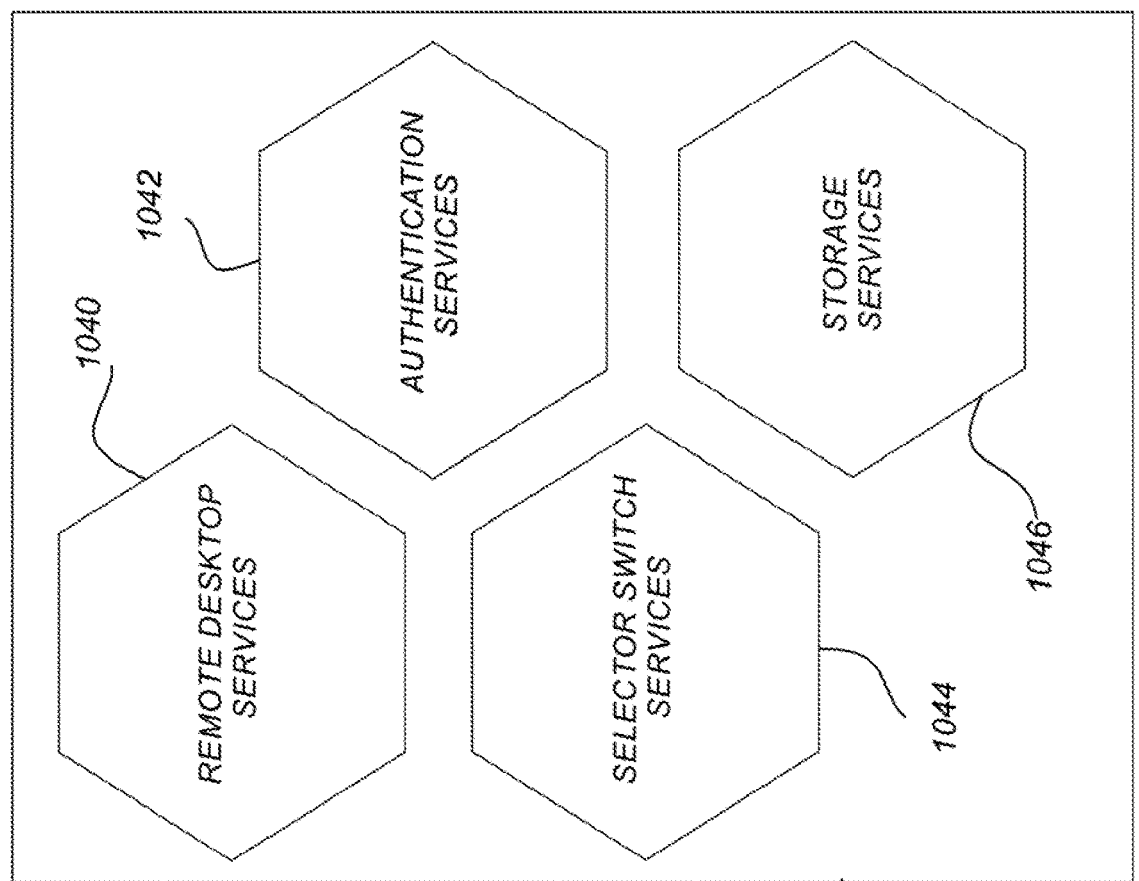
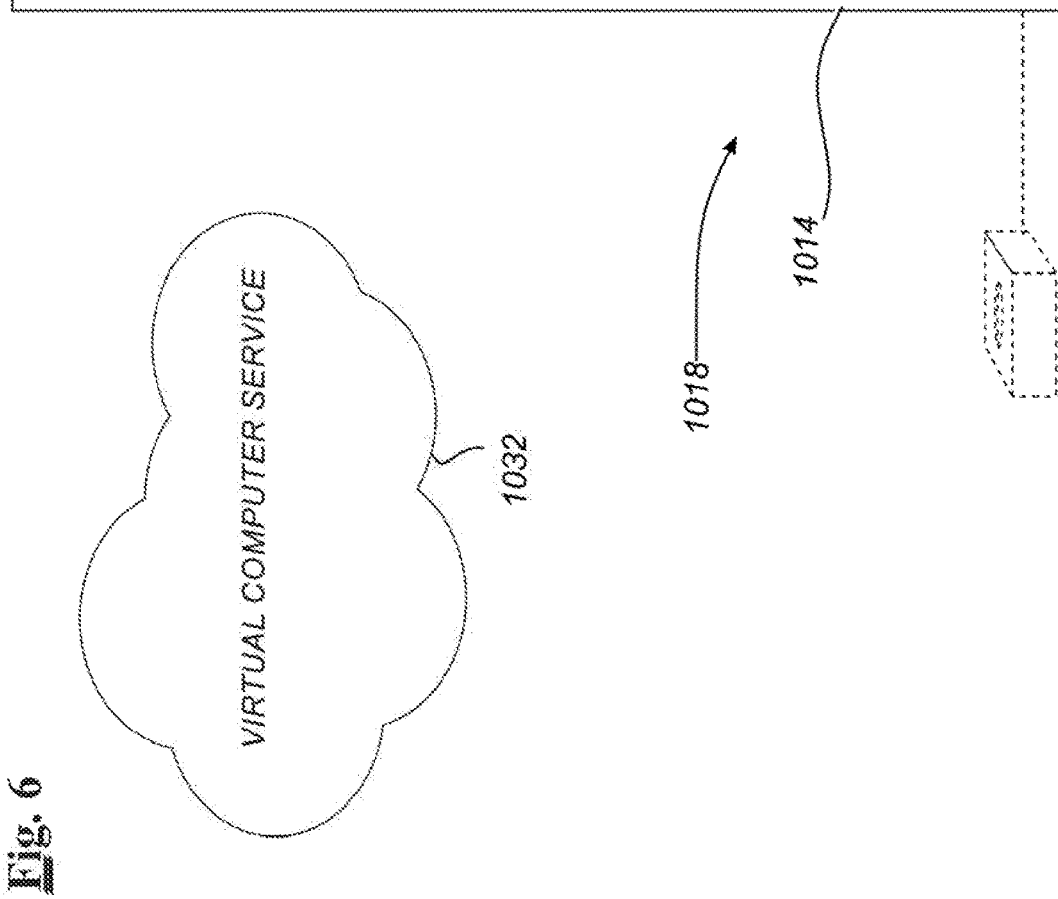
Fig. 6

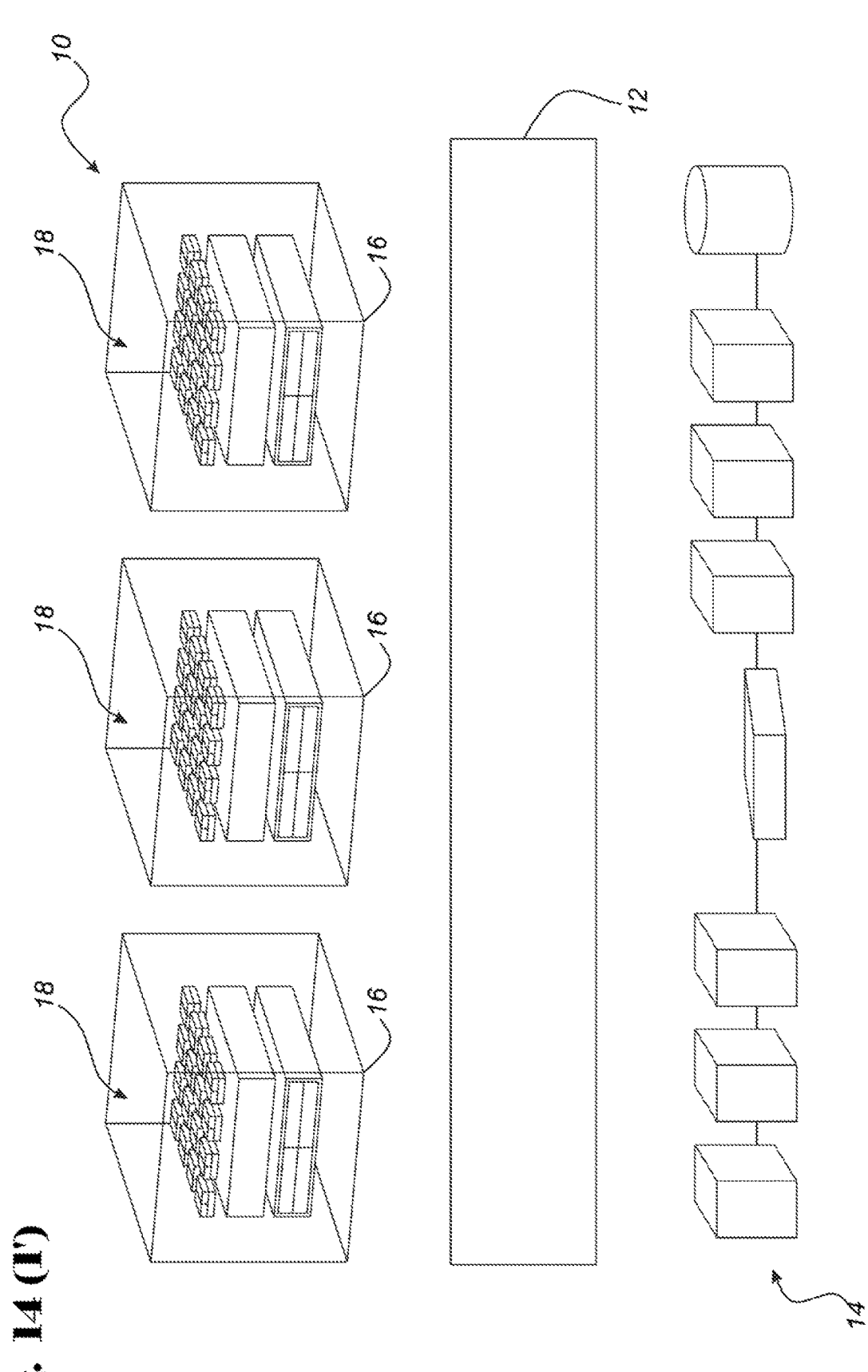
Fig. 14 (I')

Fig. 15 (2')
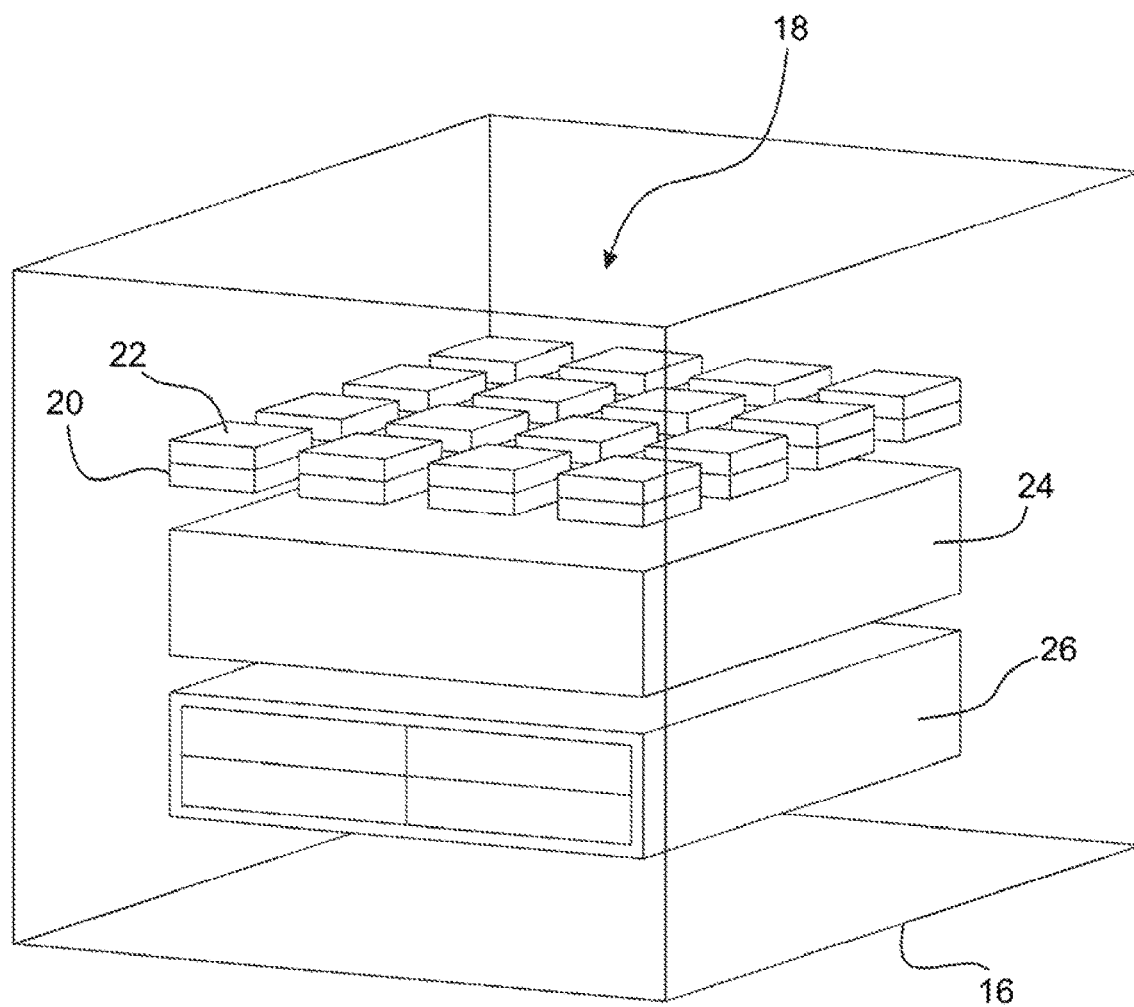

Fig. 16 (3')
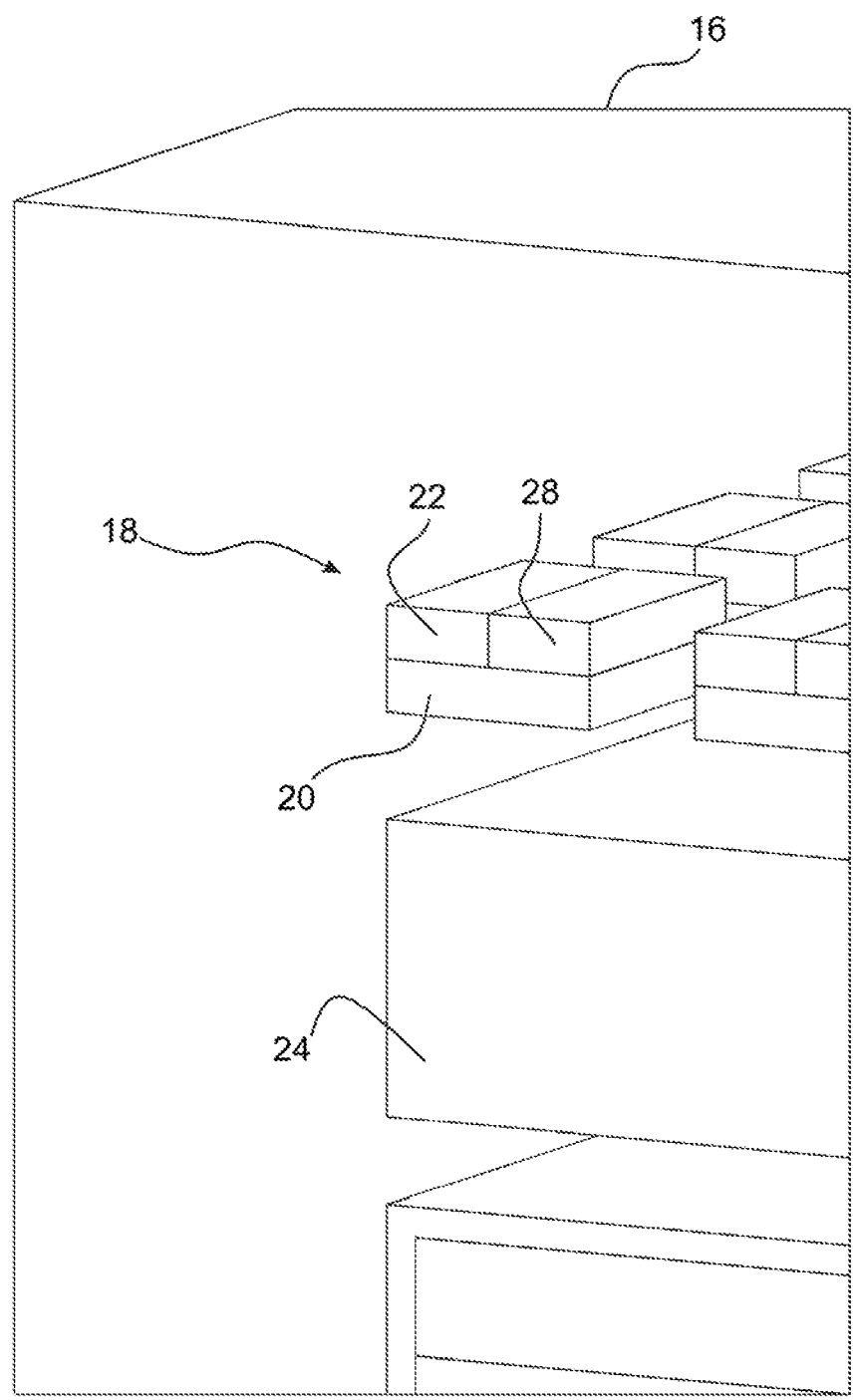

Fig. 17 (4')
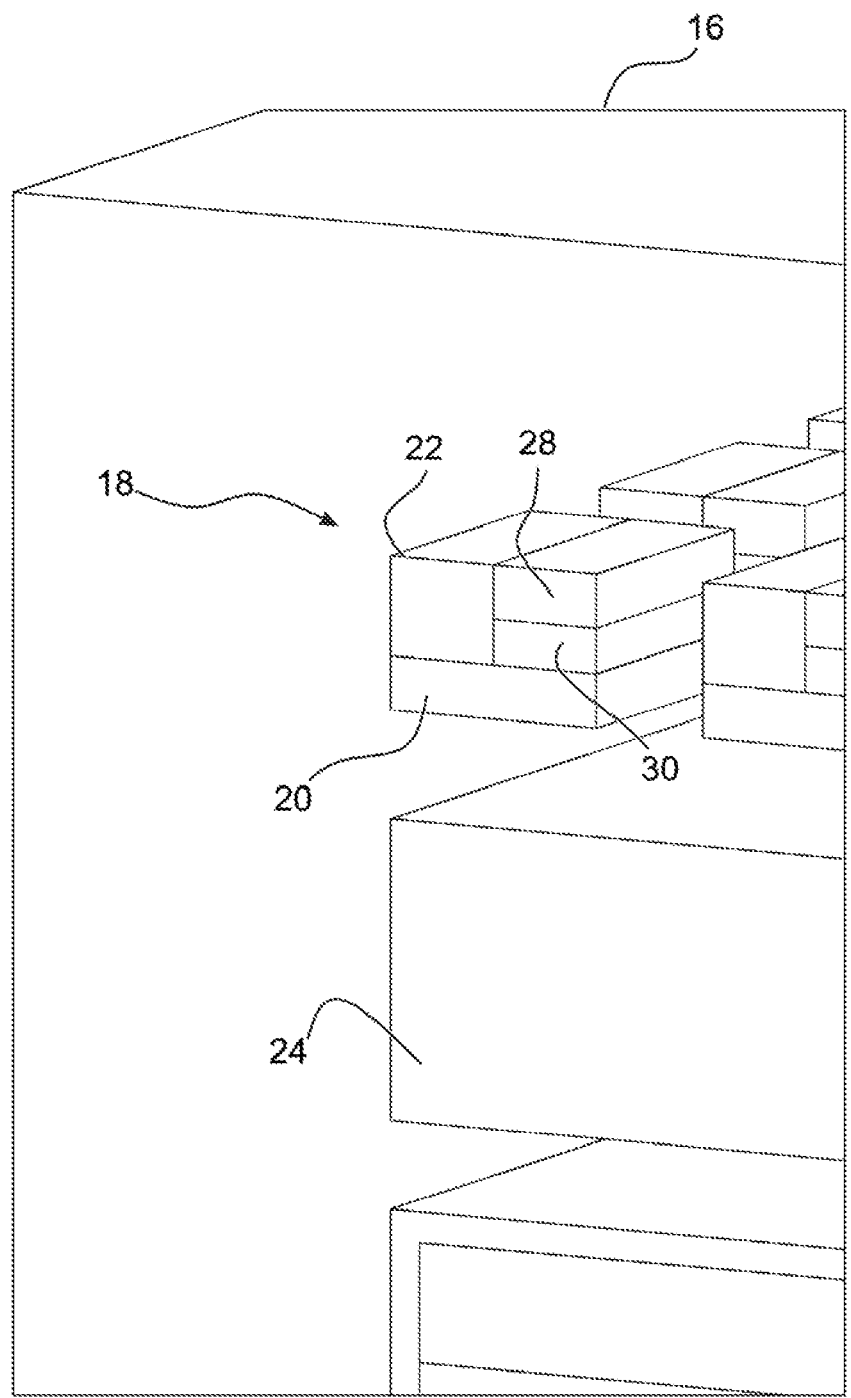

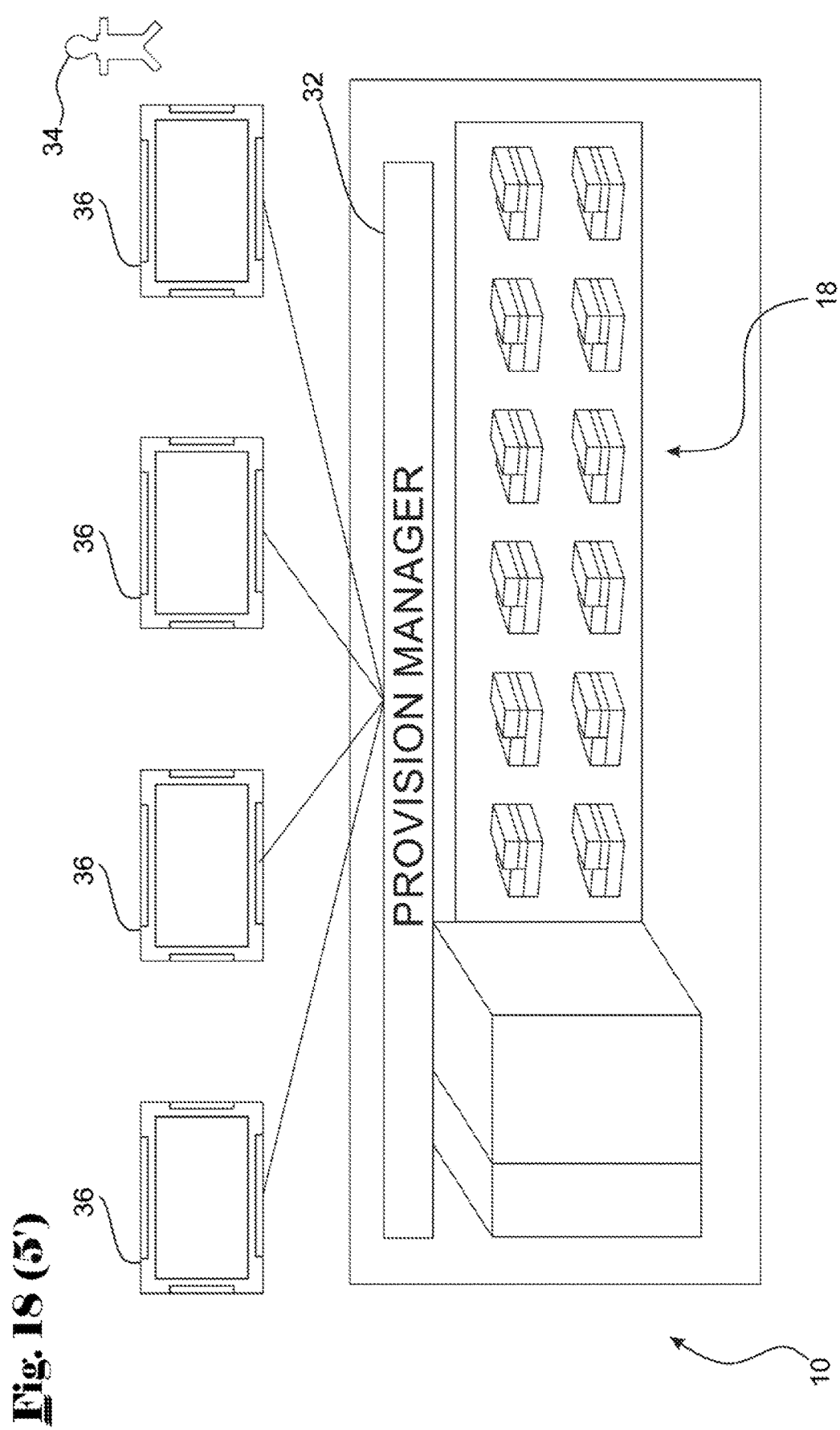
Fig. 18 (5')

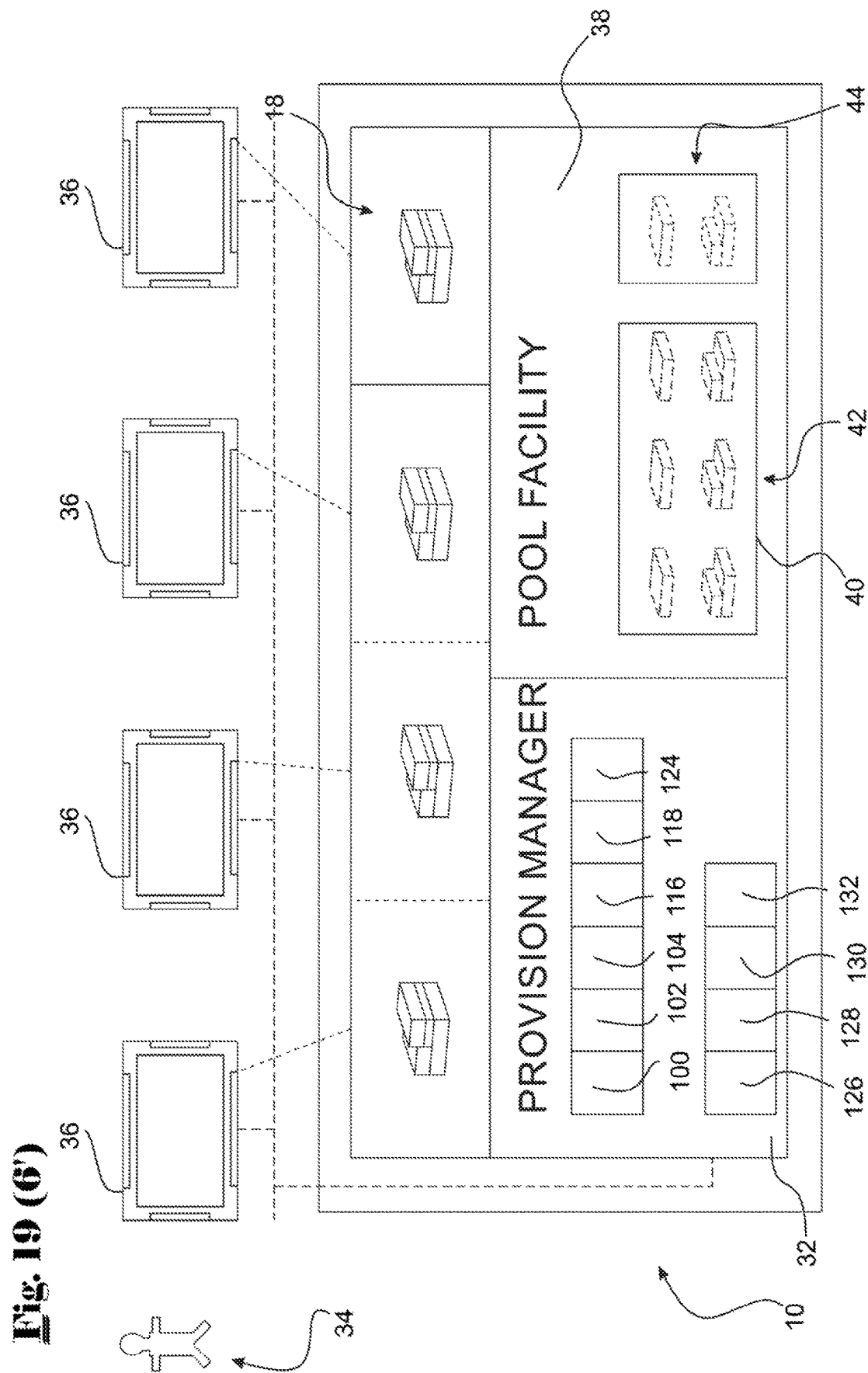

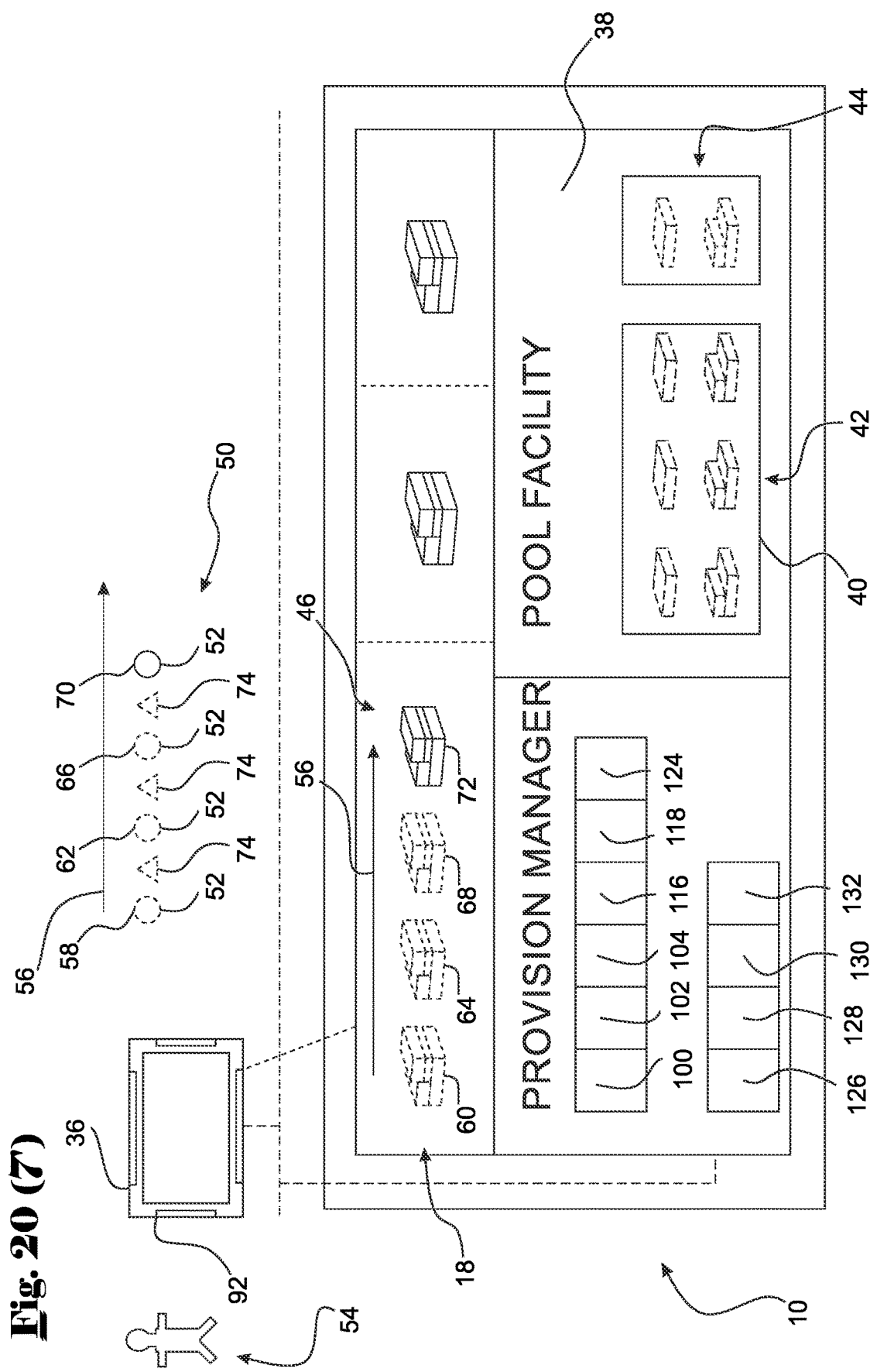
Fig. 20 (7)

Fig. 21 (8')
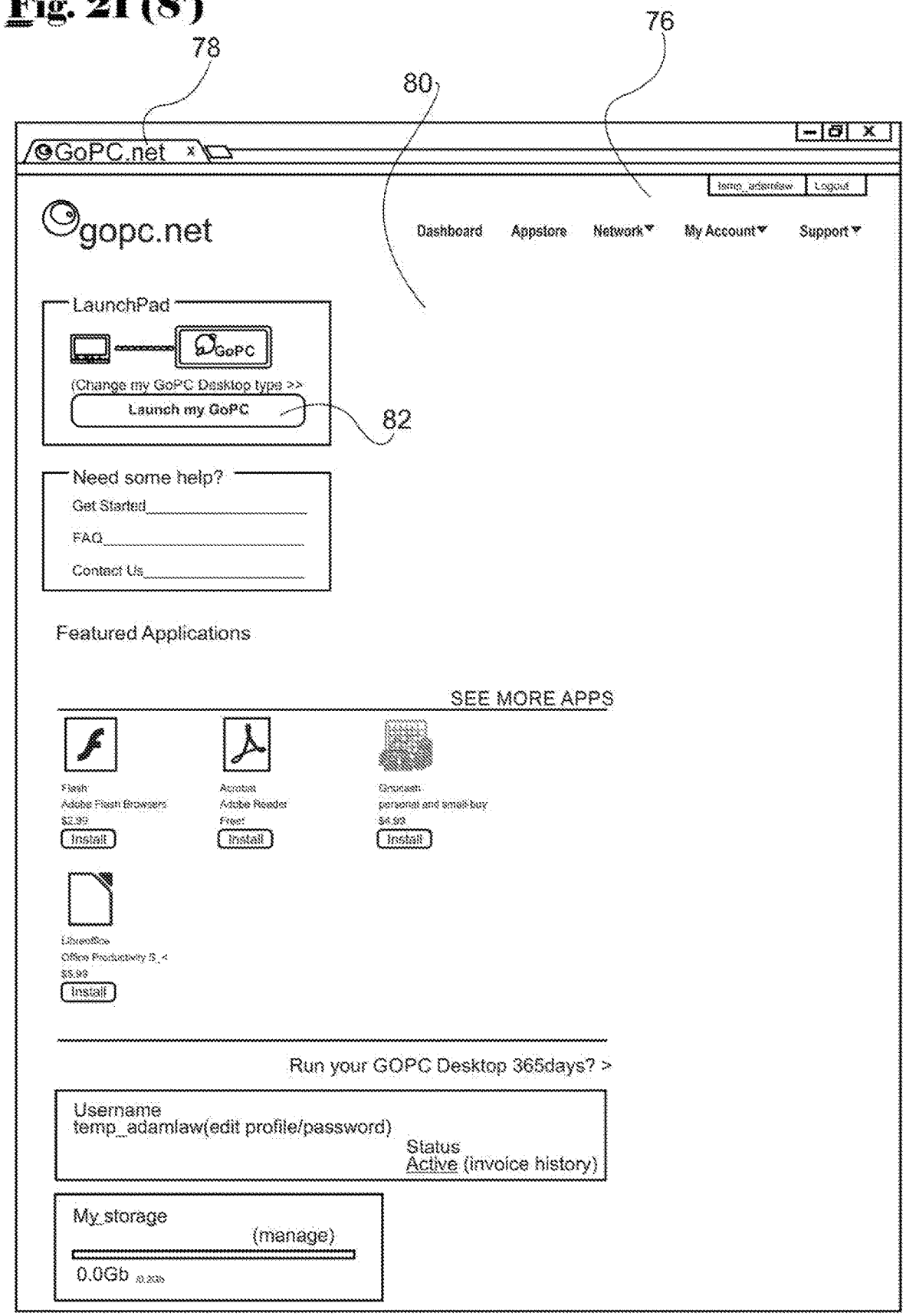

Fig. 22 (9')
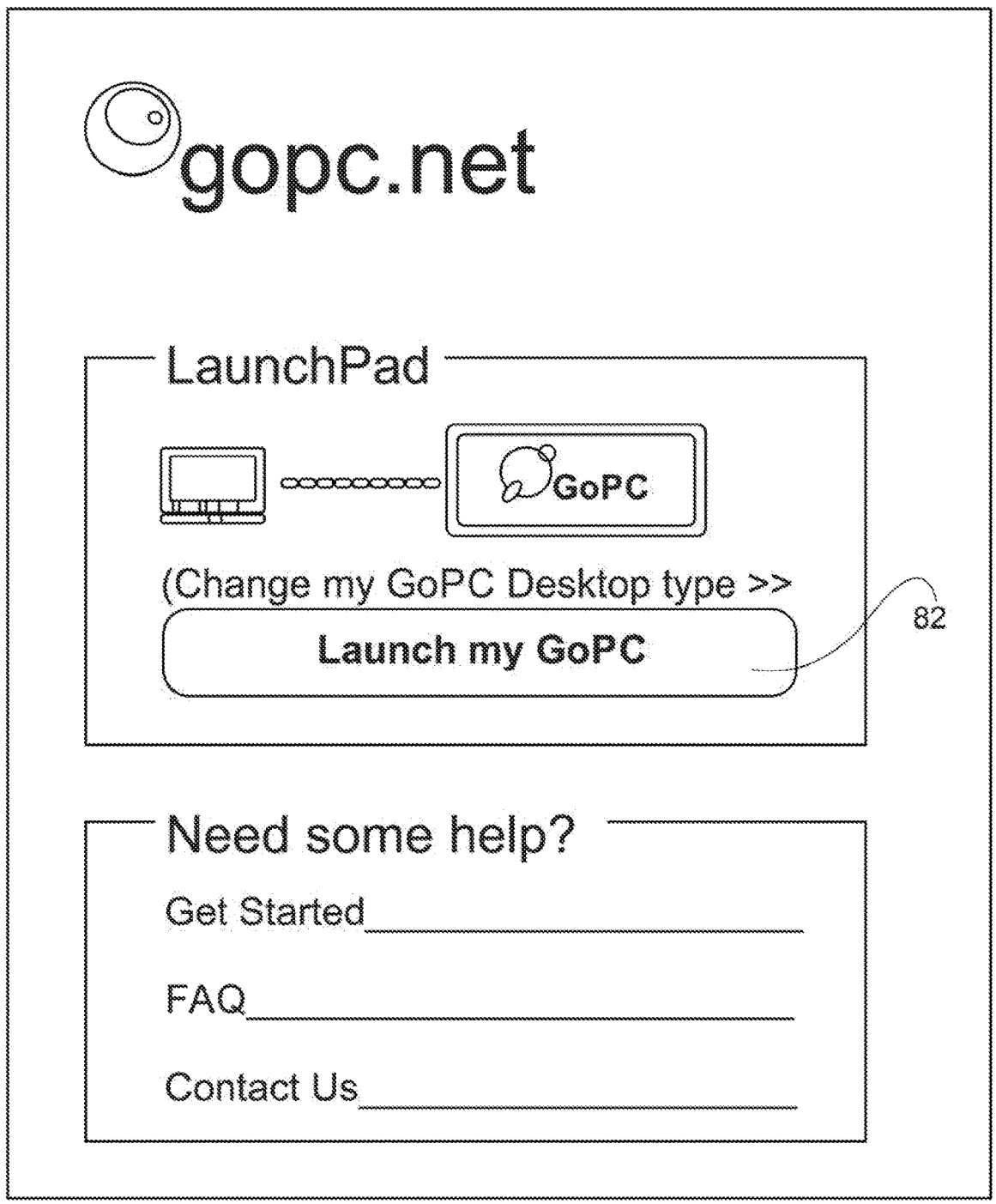

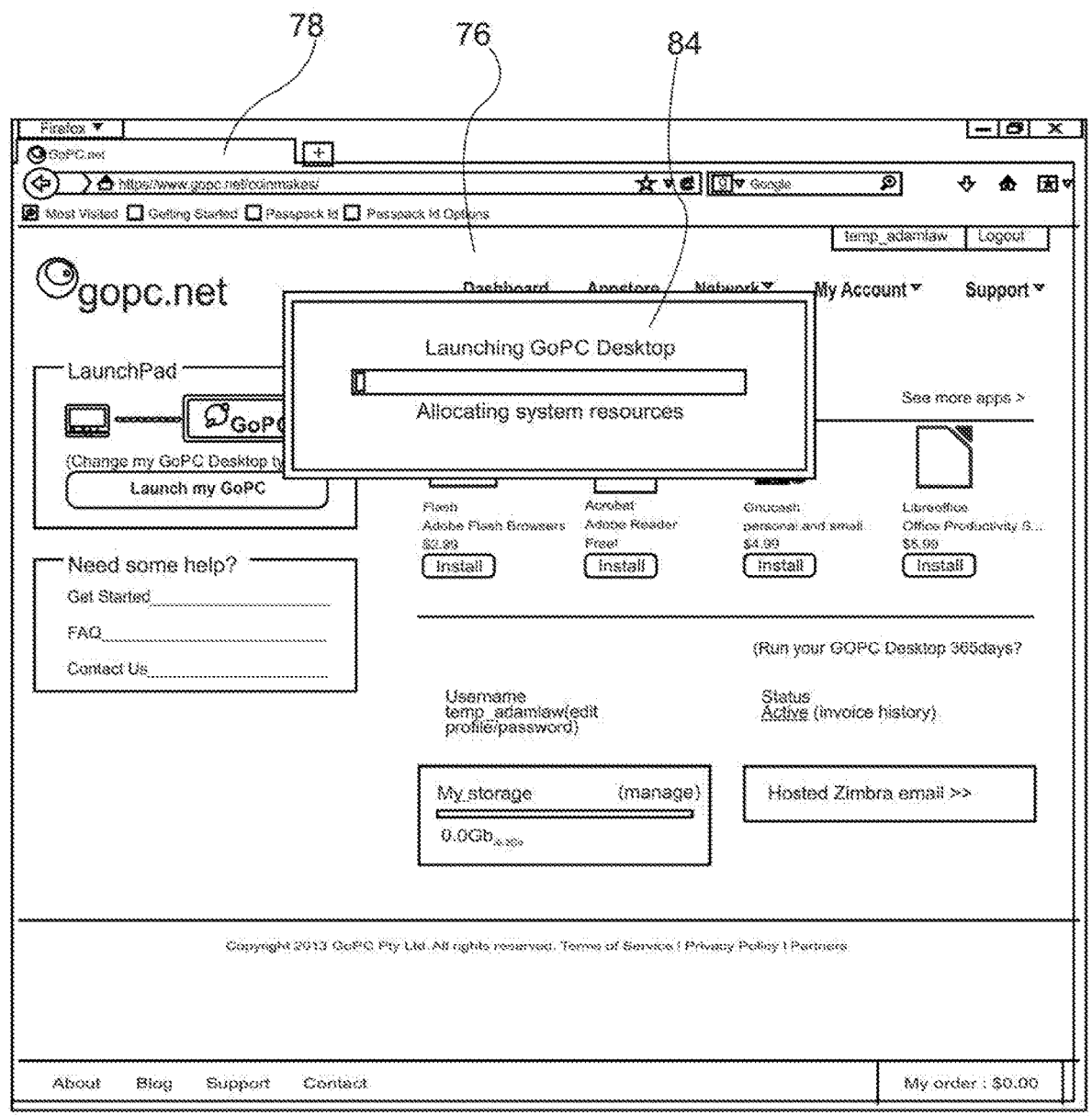
Fig. 23 (10')

Fig. 24 (11')
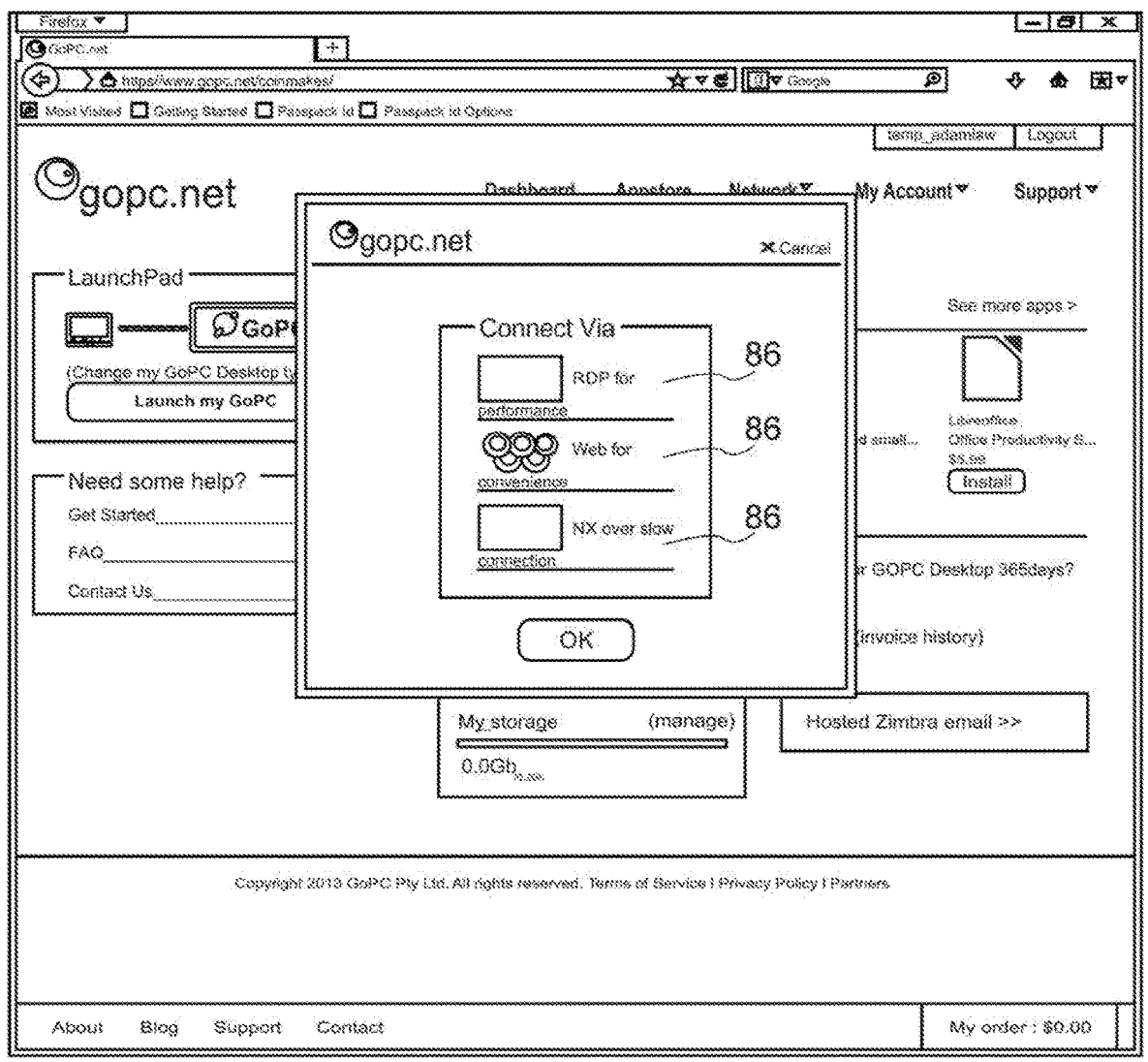

Fig. 25 (12')
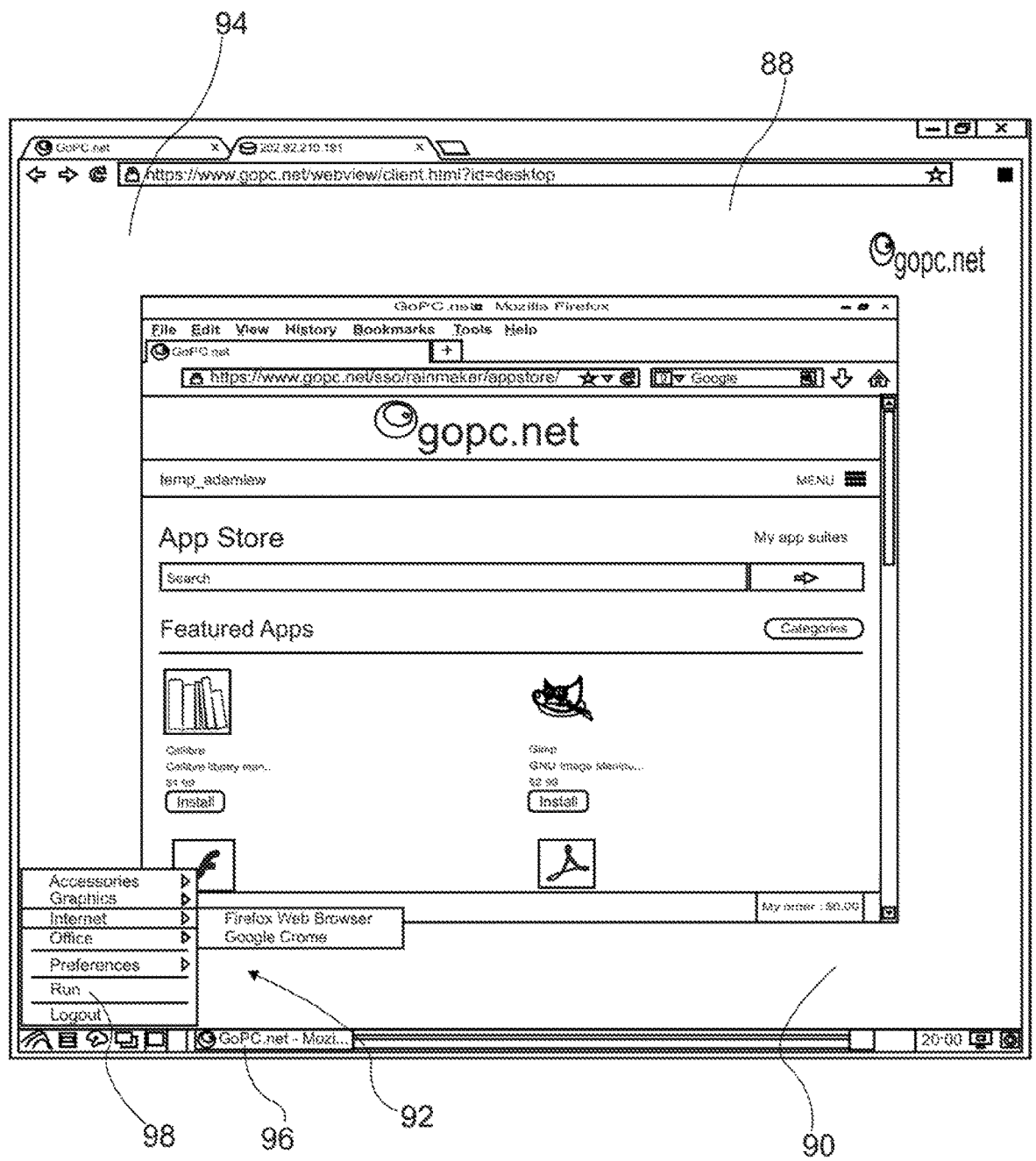

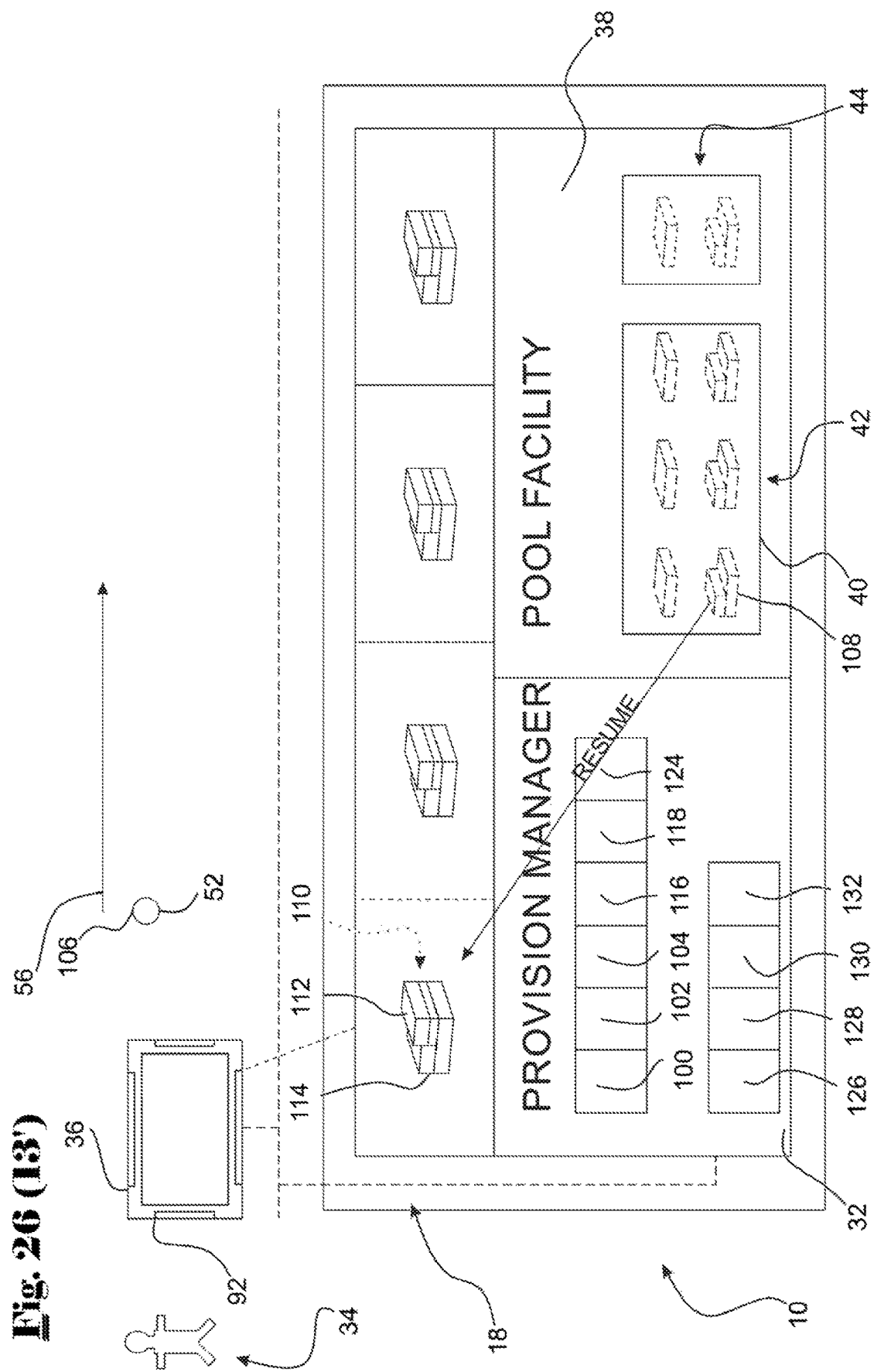

Fig. 27 (14')
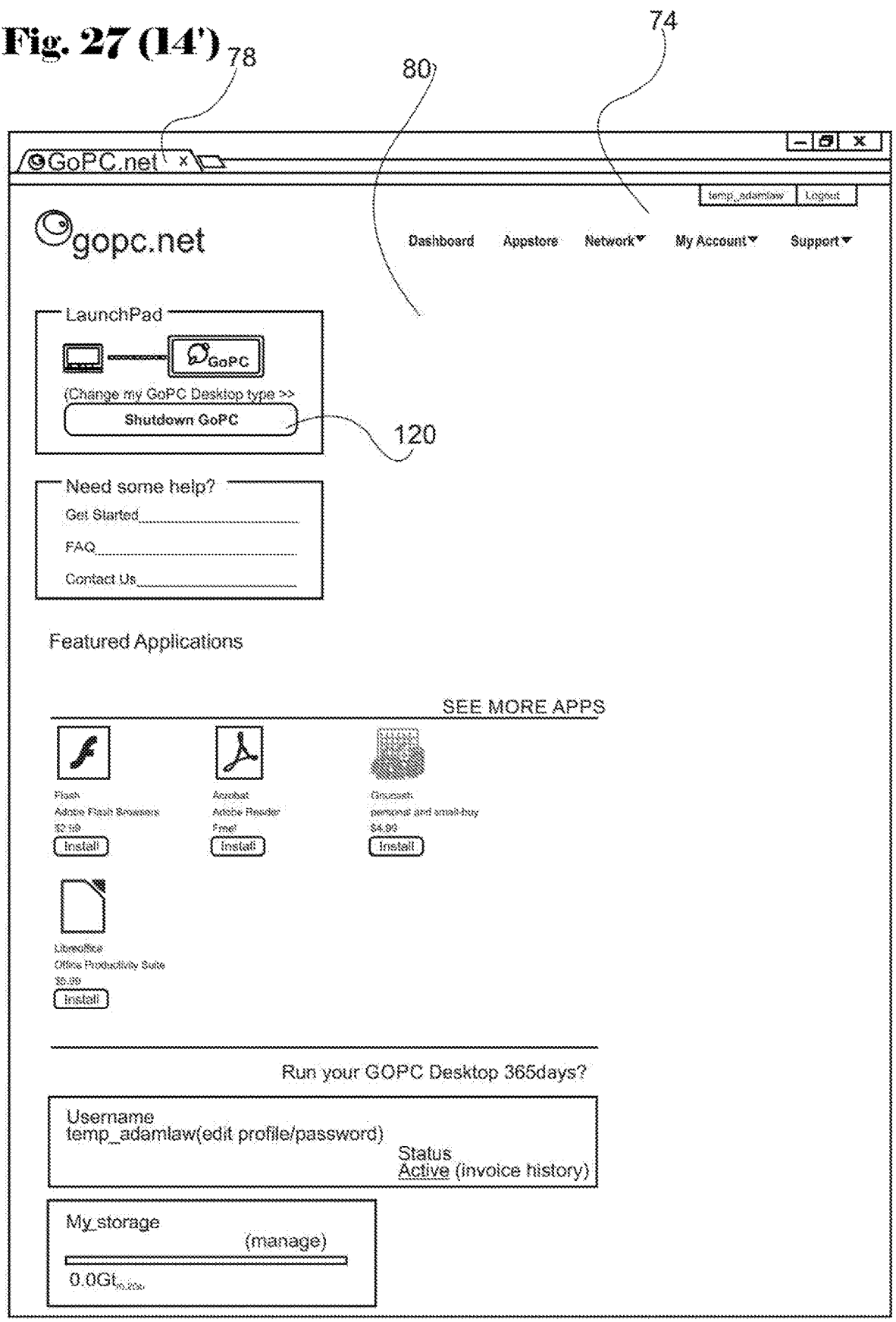

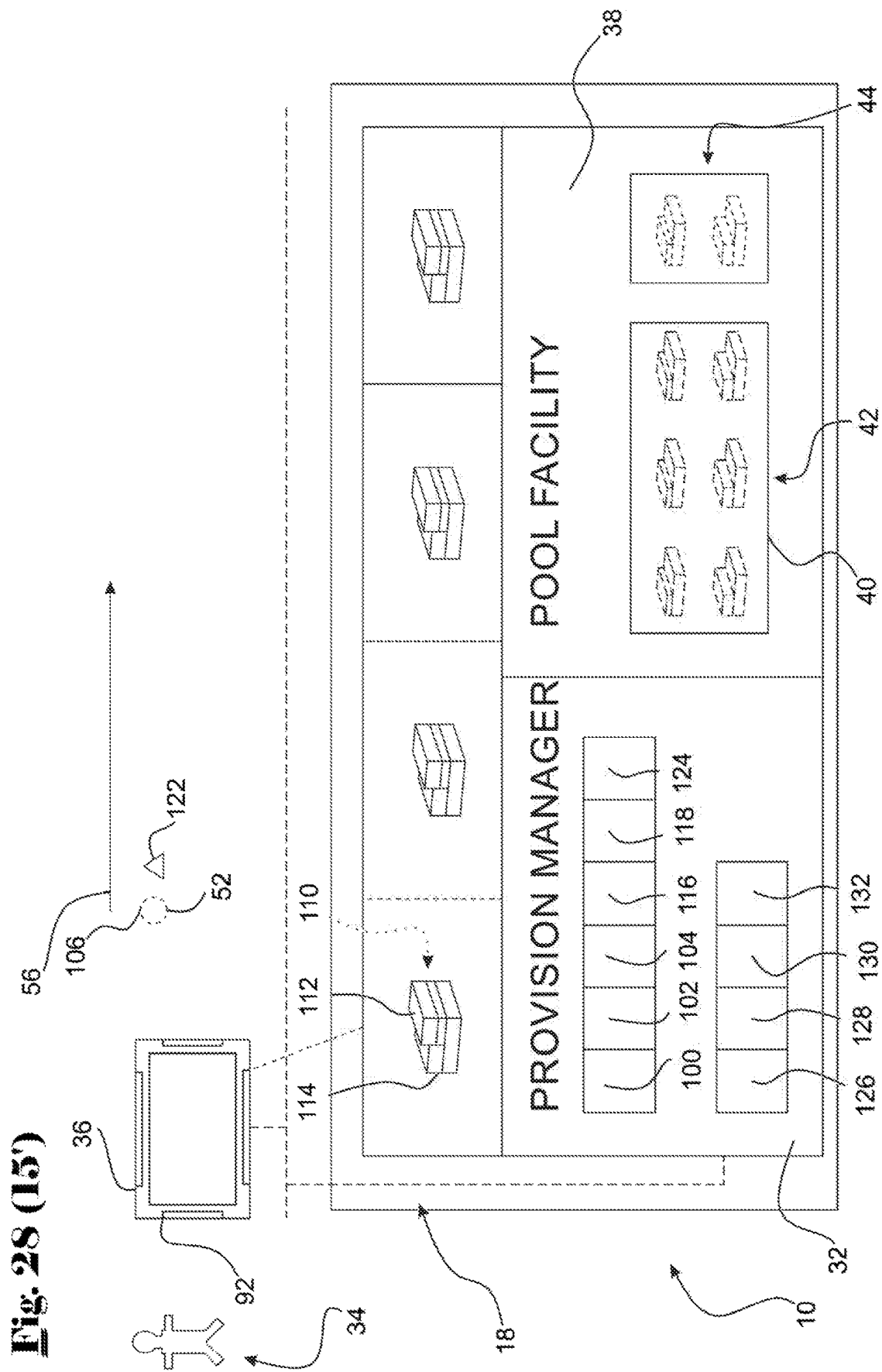

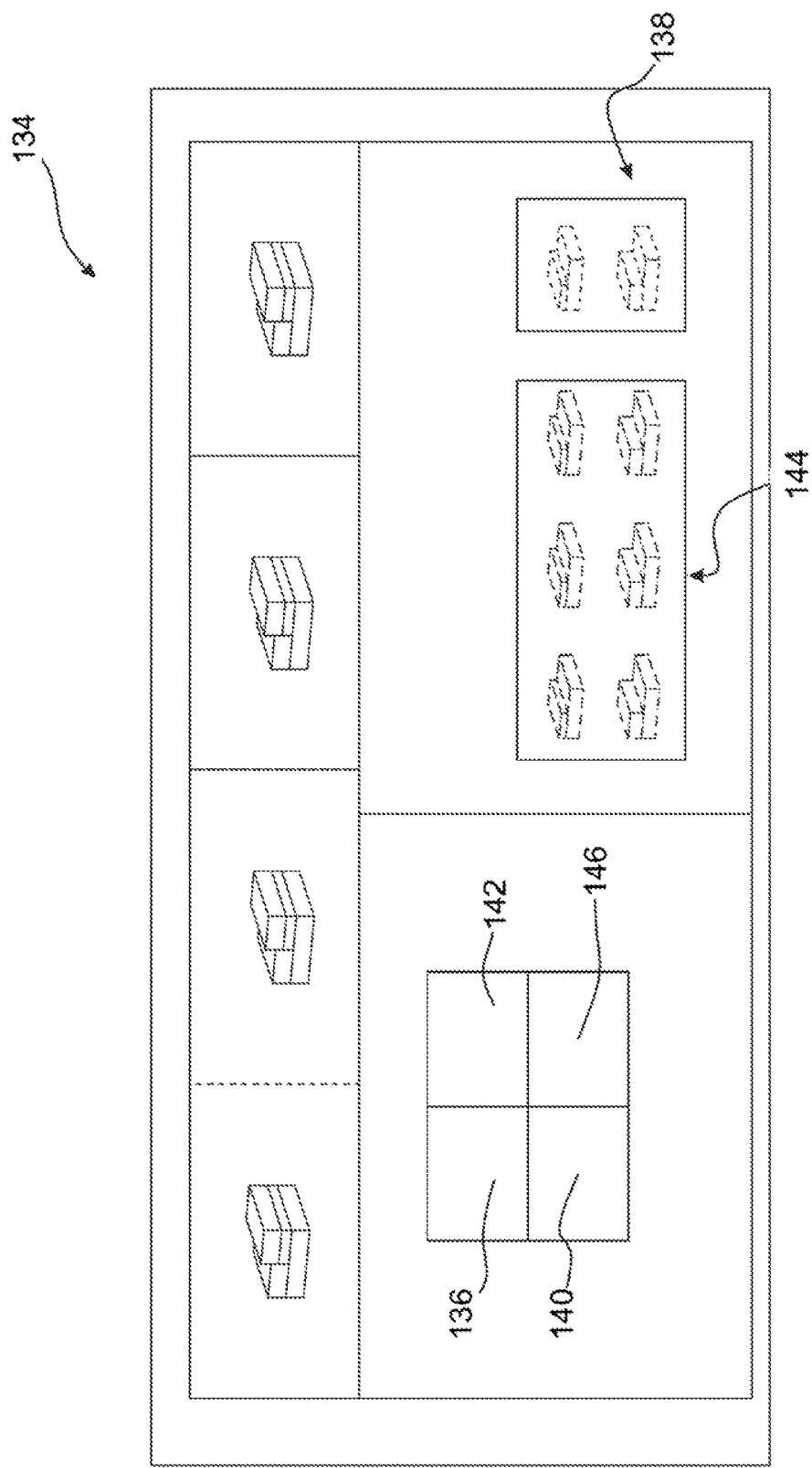
Fig. 29 (16')

Fig. 30 (17)
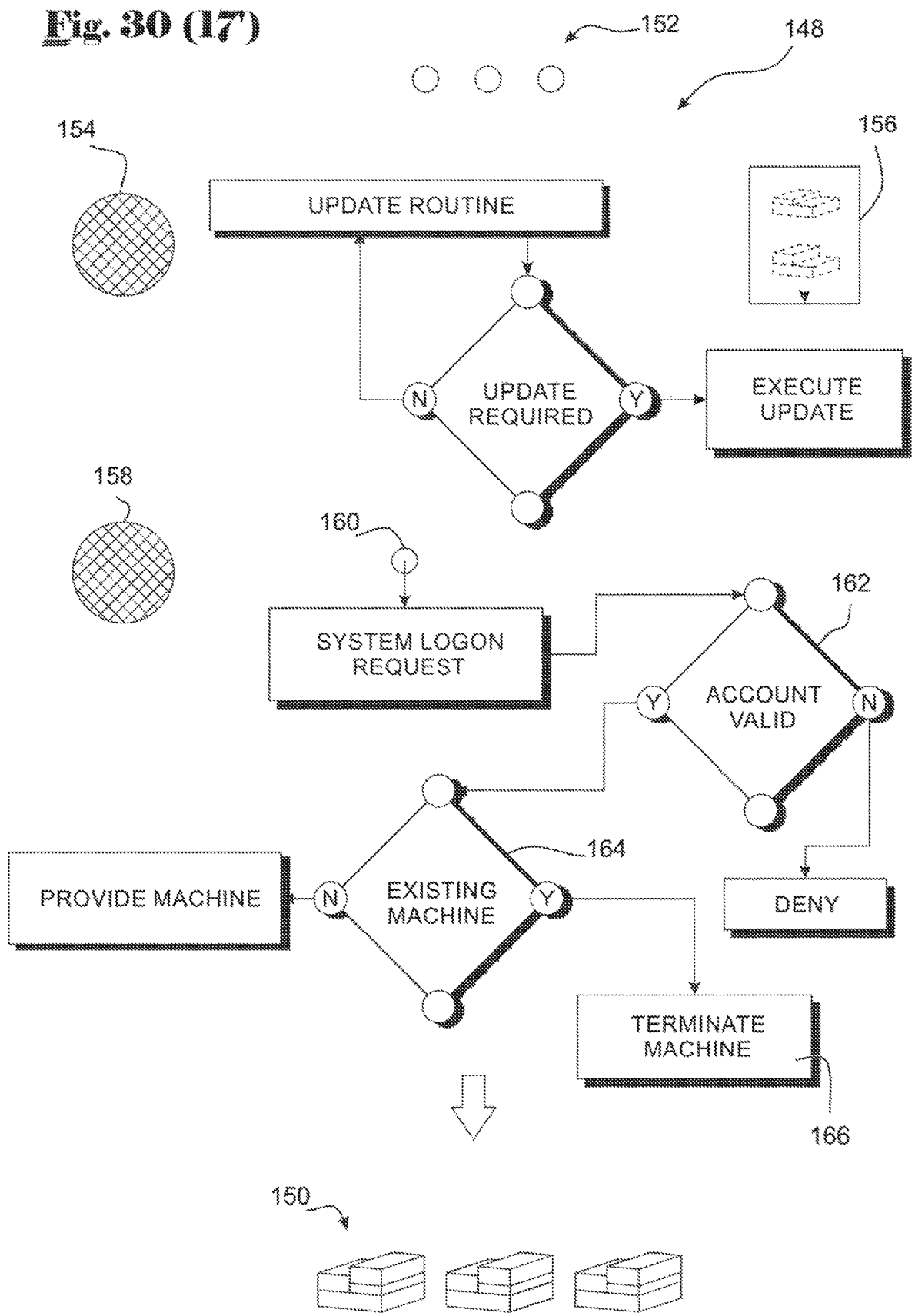

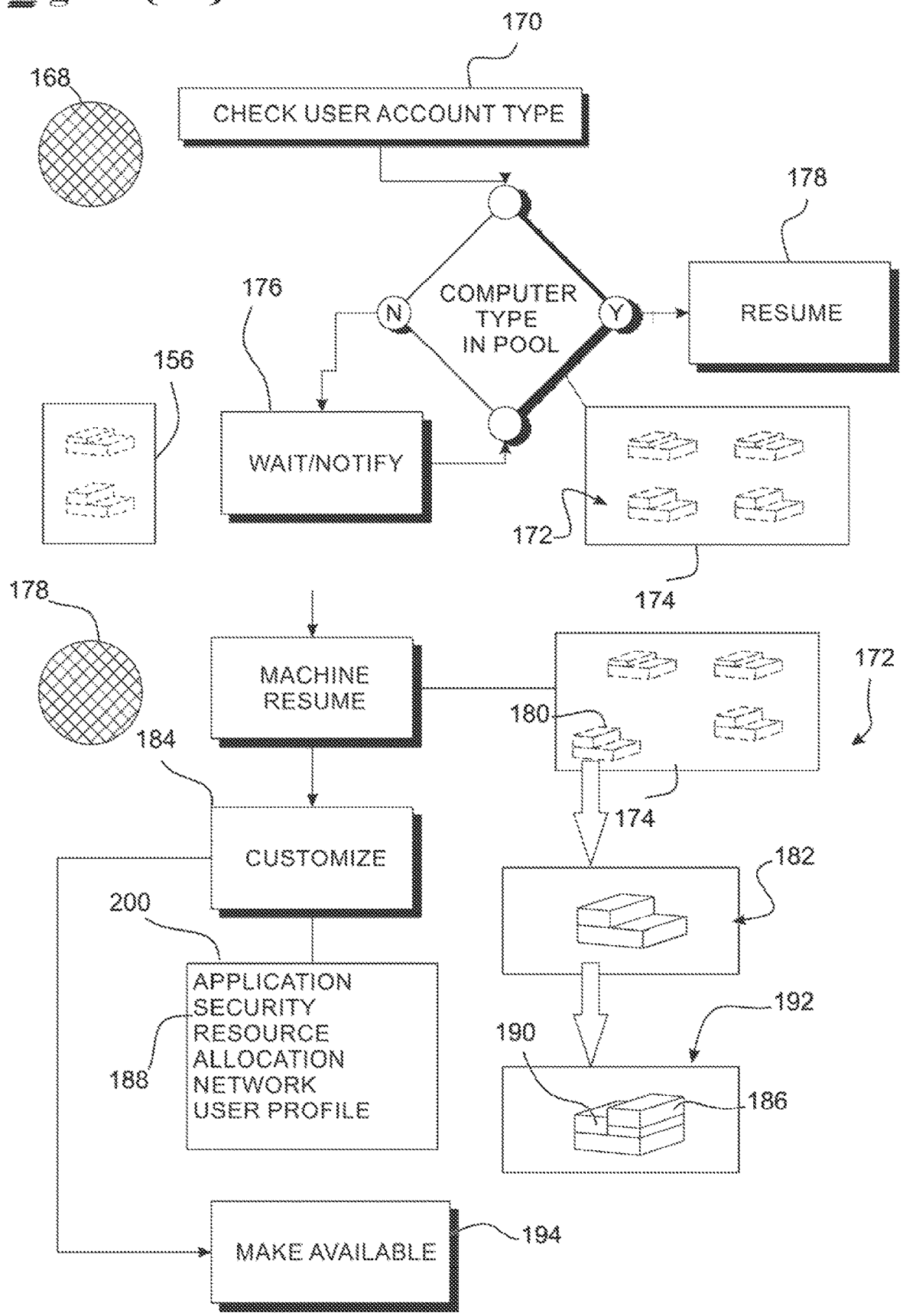
Fig. 31 (18')

Fig. 32 (19')
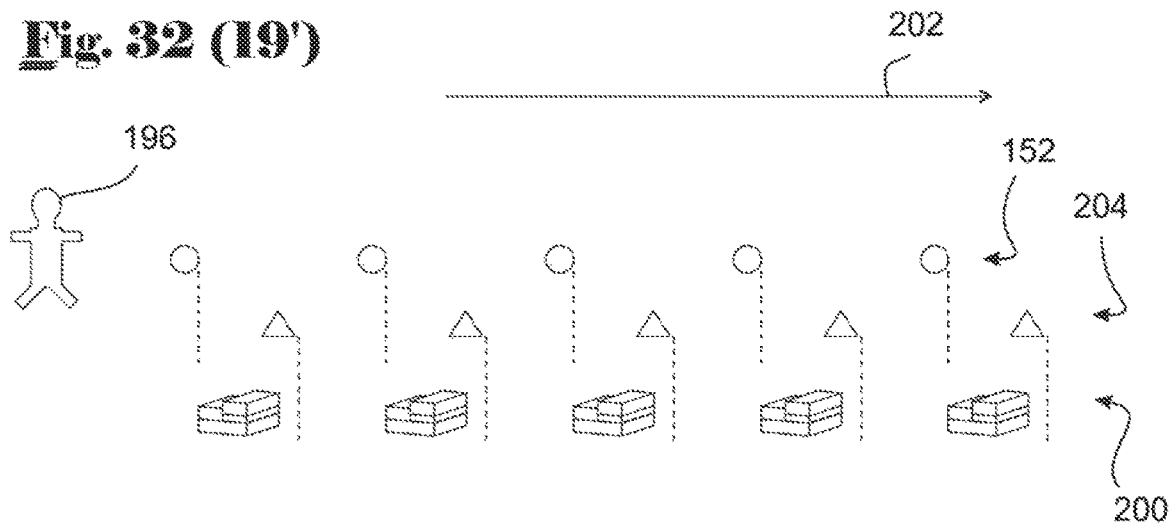
Fig. 33 (20')
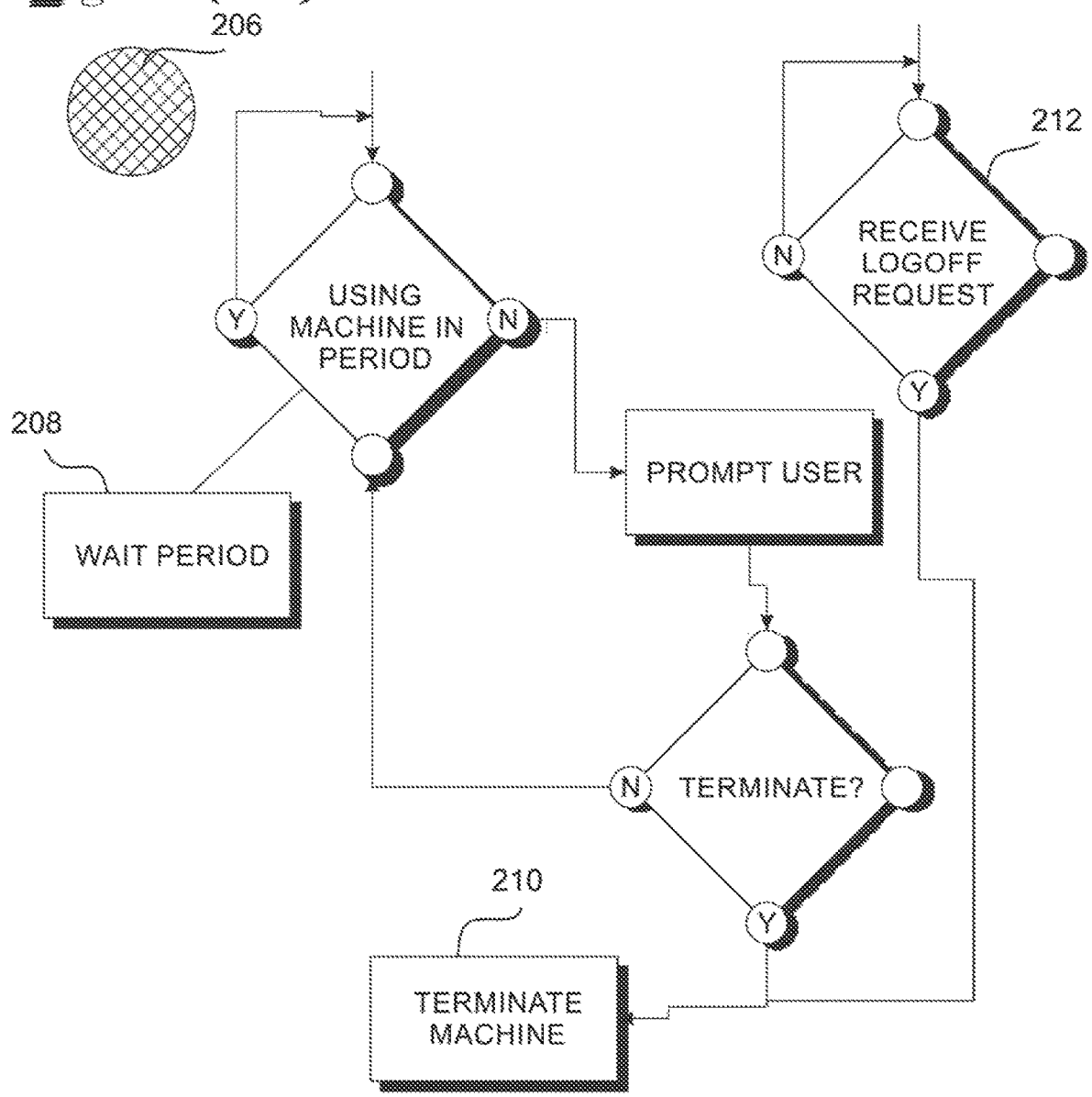

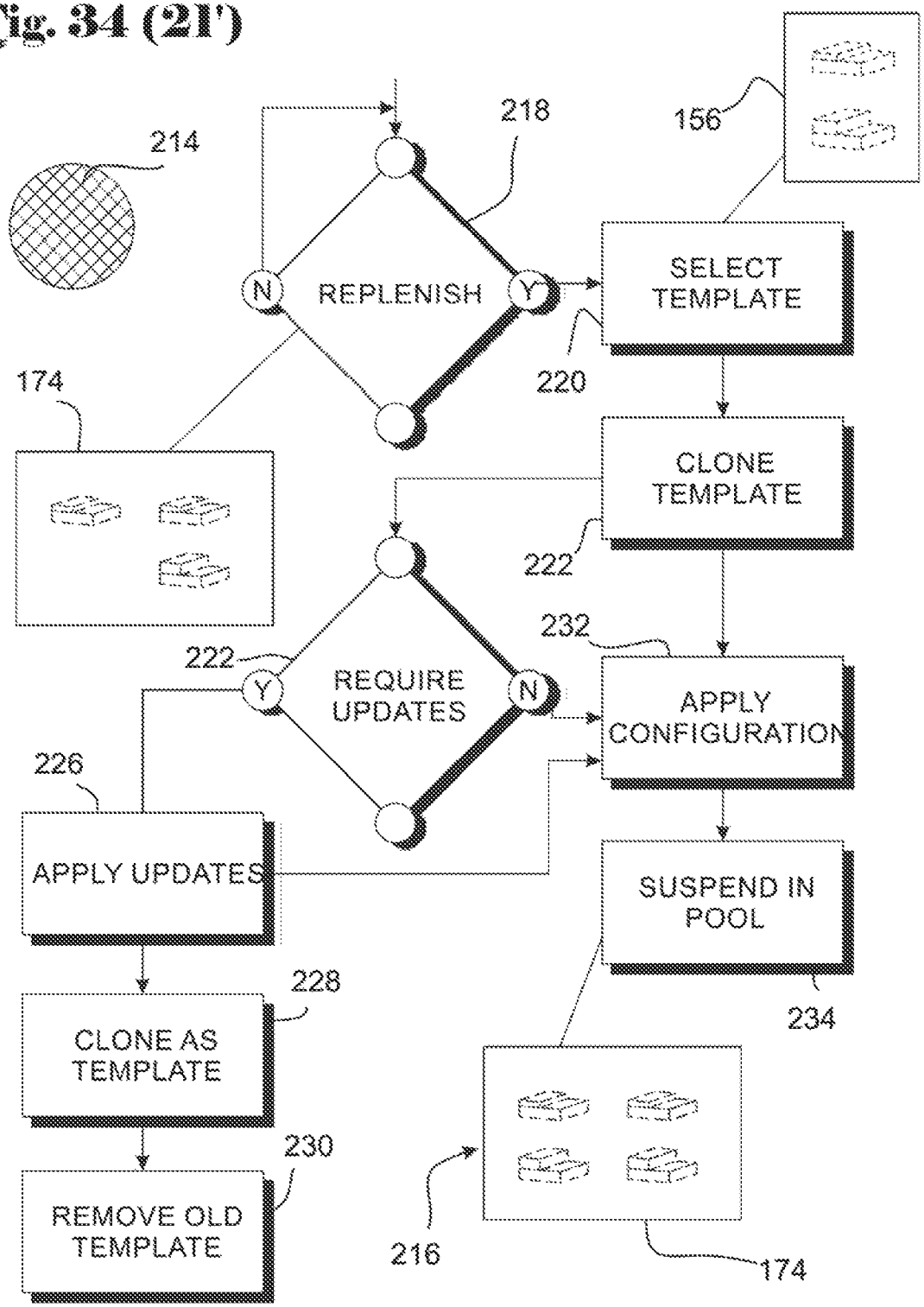
Fig. 34 (21')

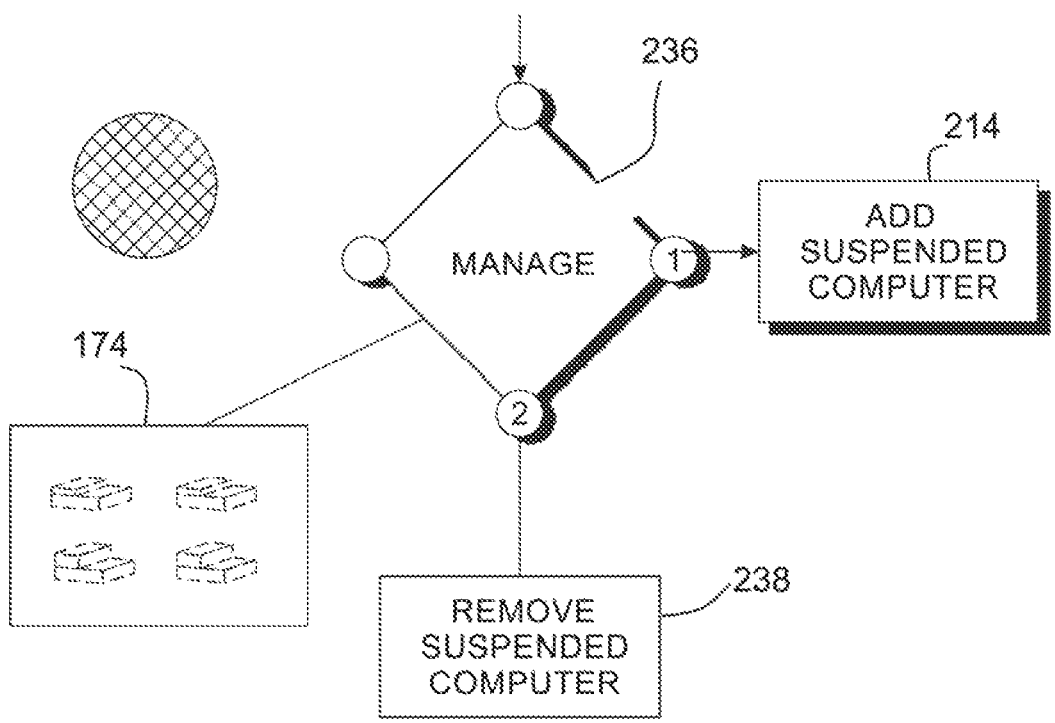
Fig. 35 (22')

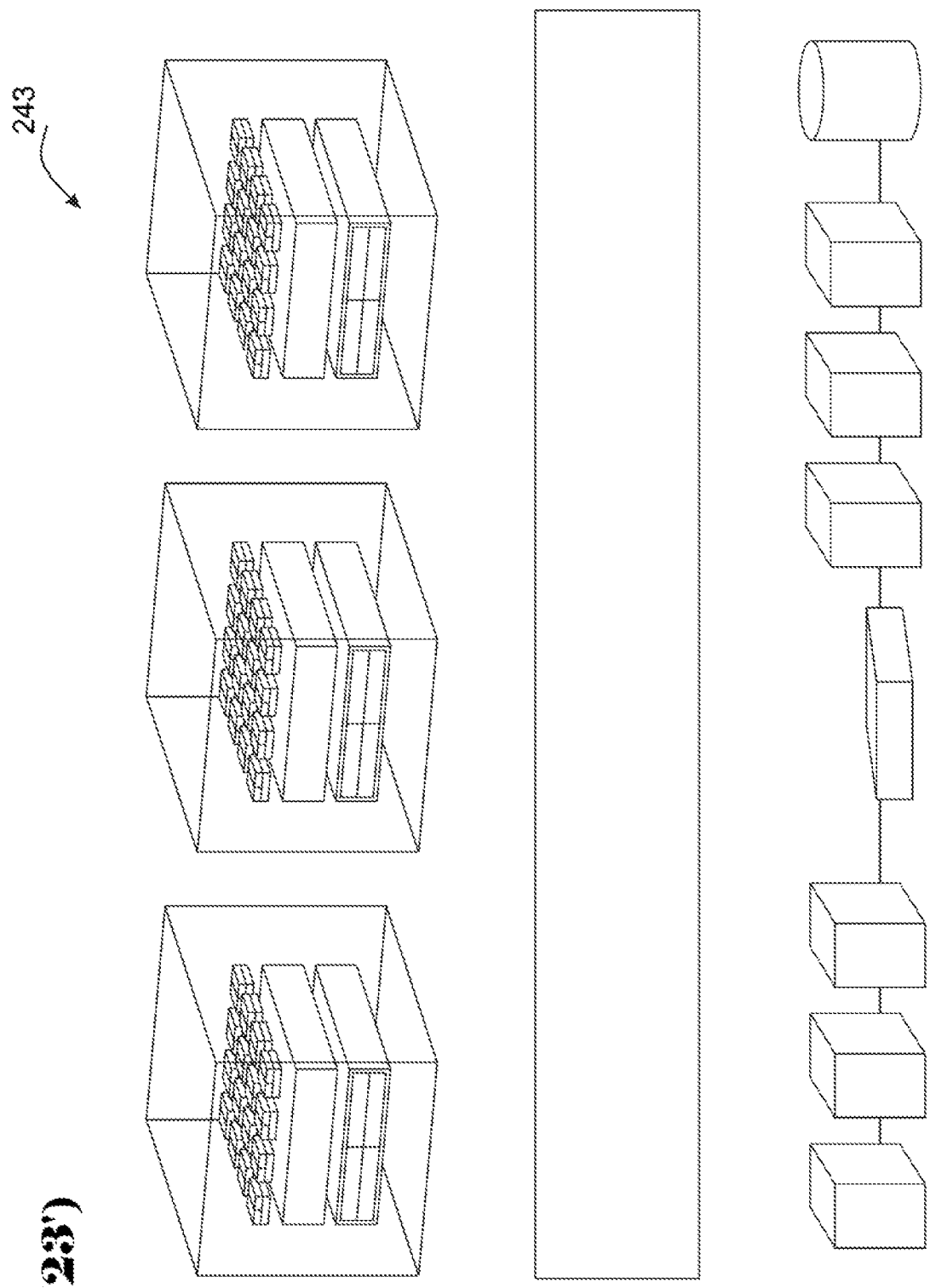
Fig. 36 (23')

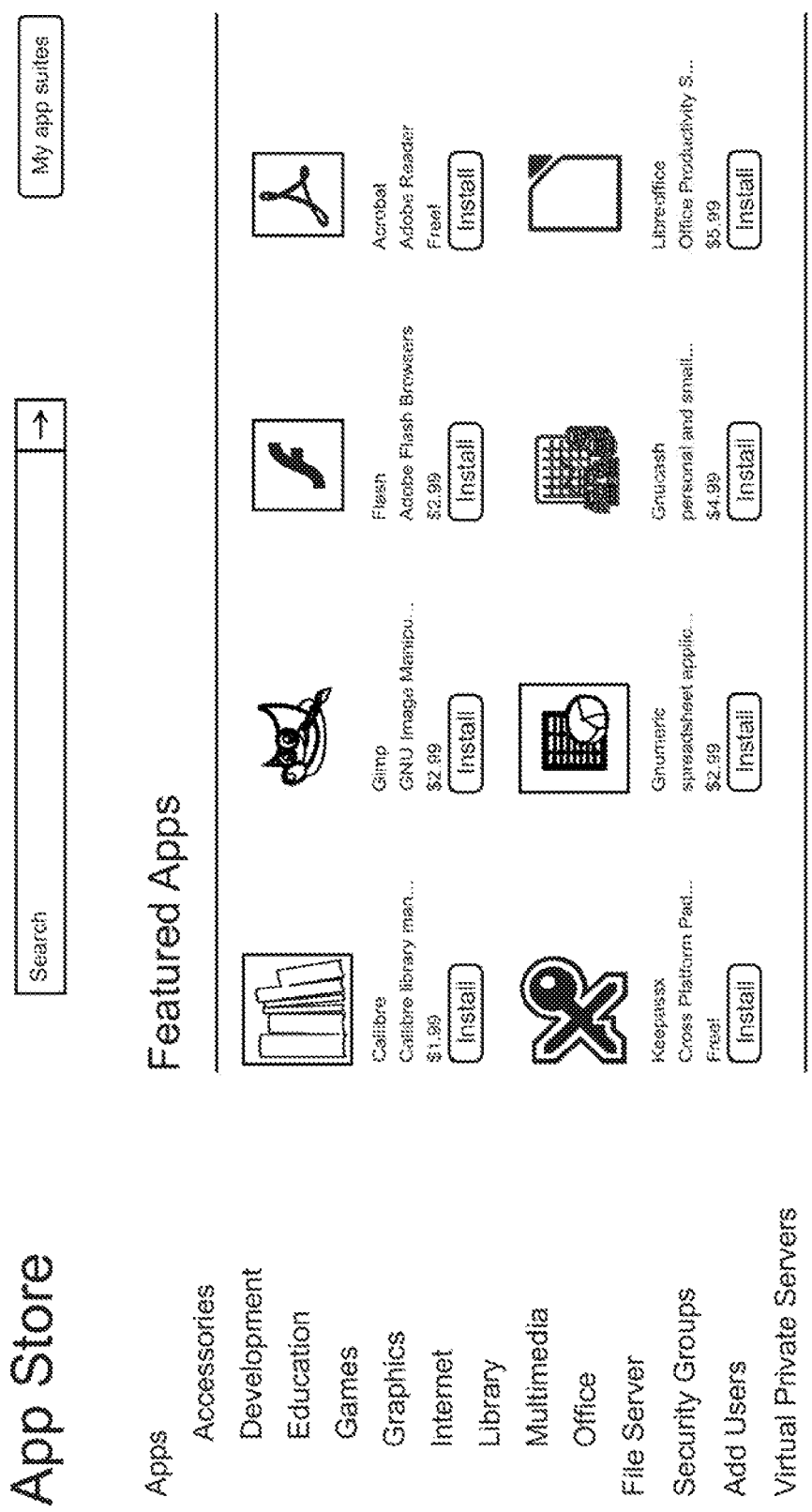
Fig. 37 (24')

Fig. 38 (25')
GetActiveGoldImage (0.039571 seconds)
AllocateIP (0.066303 seconds)
RegisterMachine (0.05087 seconds)
MachineToHostname (0.030241 seconds)
GetKeytab (0.813389 seconds)
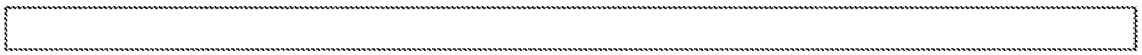
AutosignMachine (0.02223 seconds)
UpdateMachineDNS (0.061821 seconds)
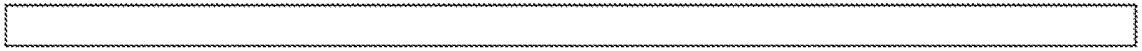
ClonePoolVM (127.698363 seconds)
PowerOn (9.651645 seconds)
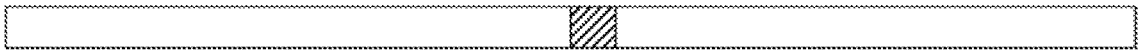
WaitForXRDP (30.089933 seconds)
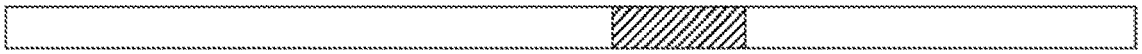
Sleep90 (90.106405 seconds)
SuspendMachine (0.04013 seconds)
SetMachineAvailable (0.034693 seconds)
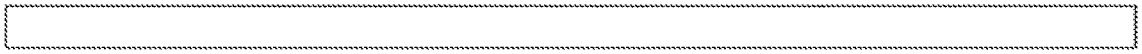

Fig. 39 (26')
GetUserID (0.187464 seconds)
CheckAccountActive (0.050262 seconds)
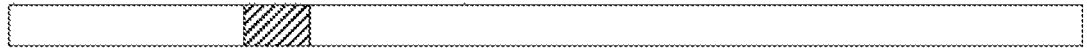
GetUserType (0.038247 seconds)
CheckMachinesUsed (0.03028 seconds)
GetActiveGoldImage (0.038205 seconds)
GetProfileForUser (0.041925 seconds)
AllocateMachine (0.082452 seconds)
MachineToHostmane (0.030317 seconds)
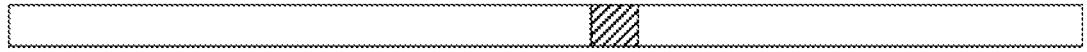
SetupMemory (0.042275 seconds)
ResumeMachine (0.038268 seconds)
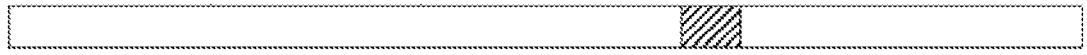
UpdateDNS (0.078308 seconds)
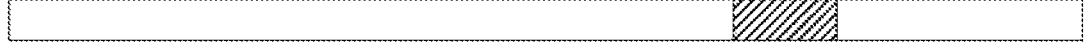
GetMachineInfo (0.13409 seconds)
StartSession (0.07047 seconds)

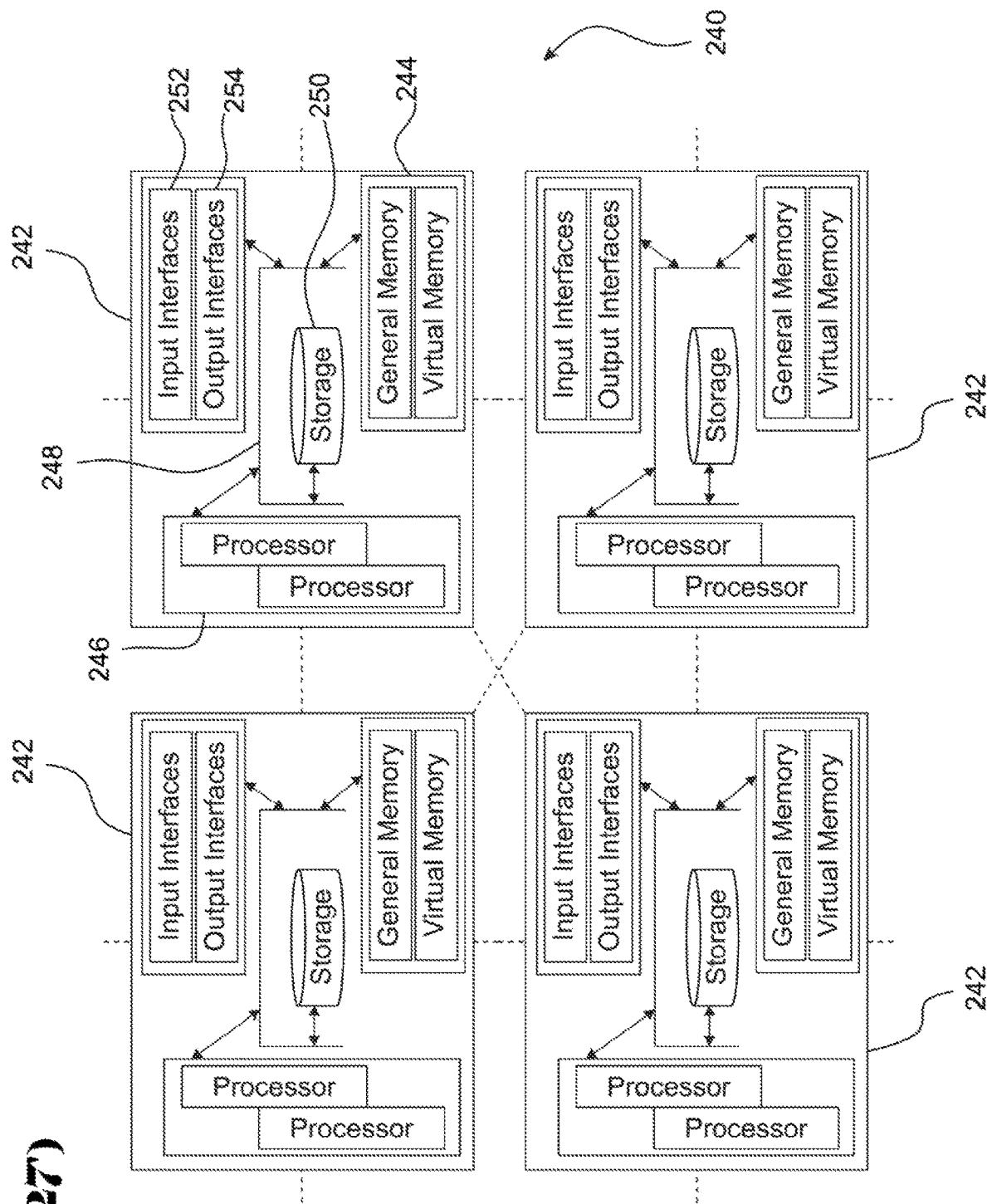
Fig. 40 (27)

COMPUTING SYSTEMS AND METHODS

INCORPORATION BY REFERENCE

The present application claims priority from Australian provisional applications: 2014904884 filed Tuesday, 2 Dec. 2014; 2014904902 filed Wednesday, 3 Dec. 2014; and 2015902028 filed Sunday, 31 May 2015. The priority applications were filed in the name of the Applicant and are hereby incorporated by reference for all purposes.

FIELD OF THE INVENTION

In particular forms, the present invention concerns computing systems and methods. In one particularly preferred form there is provided a security device for providing a secure financial interface allowing a user to access his or her bank account.

BACKGROUND TO THE INVENTION

For a user to access his or her financial account online, the user generally has to connect through an HTML browser that is connected to the Internet. The user generally has to enter in a username and a password before the user is provided with access. Examples of financial accounts include bank accounts, asset portfolios, trust accounts, and so forth.

In some instances the user must also enter in further authentication details that are sent to the user using an SMS or another form of push notification. Two factor authentication systems of this nature provide an added level of security.

Unfortunately the user's computer system used to establish the Internet browser connection is often subject to cyber-attack threats. Such cyber-attack threats generally originate from poorly maintained systems that do not restrict user program installations. The cyber threats include malware and Trojans, as well as other attacks. Mobile phones and SMS push notifications have similar cyber-attack threats.

It is to be recognised that any discussion in the present specification is intended to explain the context of the present invention. It is not to be taken as an admission that the material discussed formed part of the prior art base or relevant general knowledge in any particular country or region.

SUMMARY OF THE INVENTION

According to an aspect of preferred embodiments herein described there is provided a computer implemented method of providing virtual computers for use by users comprising: providing a virtual computer service and providing each user with a user security device; each user security device providing a locked down operating environment including—a remote access connector and authenticator facility; in the method, receiving remote connection requests initiated by the users and sent by the remote access connectors to the virtual computer service; the authenticator facility providing first authentication data to the remote access connector; and the virtual computer service authenticating the first authentication data to ensure that the security device is an authenticated security device that has permission to be allocated a virtual computer from the virtual computer service.

Preferably the user security devices are used by inserting each user security device into a local computer, the user security devices each providing a locked down system environment including a remote access connector and an authenticator facility; the remote access connector initiating a remote connection request with the virtual computer service; and the authenticator facility providing first authentication data uniquely identifying the local computer to the remote access connector for ensuring that the security device has permission to be allocated a virtual computer from the virtual computer service.

Preferably during a configuration operation, the security device sends the first authentication data uniquely identifying the local computer and the virtual computer services uses the first authentication data to associate the user's account on the virtual computer service with the local computer.

Preferably, during a configuration operation, the security device sends the first authentication data uniquely identifying the local computer and the virtual computer services uses the first authentication data to associate the user's account on the virtual computer service with the local computer on a one to one basis.

According to an aspect of preferred embodiments herein described there is provided a security device for use by a user, the security device comprising: a locked down system environment including a remote access connector, a display output and an authenticator facility; the remote access connector able to initiate a remote connection request with a virtual computer service; the display output for generating a graphical user interface in association with the virtual computer; and the authenticator facility providing first authentication data to the remote access connector for ensuring that the security device has permission to be allocated a virtual computer from the virtual computer service.

Preferably the locked down system environment includes an operating system directed to preventing third party attacks and providing no more than remote desktop services, authentication services, selector switch services and storage services.

Preferably the security device includes: a single step activator for communicating with the remote access connector to initiate the remote connection request; the single step activator being able to be operated by a user with a single action.

Preferably the single step activator communicates with the remote access connector to initiate the remote connection request; the authenticator facility providing remote access connector with the authentication data; the authentication data being able to be used by the virtual computer service to authenticate the remote connection request.

Preferably the first authentication data is unique to the security device; the authentication data being able to be used by the virtual computer service to authenticate the device and, as a result, the request.

Preferably the encrypted data is read from a readable storage forming part of the security device.

Preferably the security device further includes a selector input hub able to select whether input command signals from at least one input device are sent to the remote access connector or a local receiver in the same location as the security device.

Preferably the selector input is able to be connected to a keyboard and a mouse; the selector input hub being able to select whether the input command signals from the keyboard and mouse are sent to the remote access connector or a local computer.

Preferably the security device includes a selector video hub able to select and direct video signals to the display output of the security device; the video signals being selected from video output from the remote access connector and a video input port of the security device.

Preferably the security device includes a selector video hub able to select and direct video signals to the display output of the security device; the video signals being selected from video output from the remote access connector and a video input port of the security device the video input port being able to be connected to the video output of a local computer.

Preferably the security device includes a single step activator for both communicating with the remote access connector to initiate the remote connection request and switching a selector hub, forming part of the security device.

Preferably the selector hub provides a selector input hub able to select whether input command signals from at least one input device are sent to the remote access connector or a local receiver in the same location as the security device.

Preferably the selector hub provides a selector video hub able to select and direct video signals to the display output of the security device; the video signals being selected from video output from the remote access connector and a video input port of the security device.

Preferably the selector hub includes a physical sensor that is responsive, in a reversible manner, to a single physical action to switch the video output, keyboard and mouse input away from a local operating system so as to be available for the remote access connector.

Preferably the security device includes a locator allowing the virtual computer system to determine the location of the security device.

Preferably the security device includes a locator for determining device location and data that is sent to the virtual computer service on the location of the security device. The determination of the location of the security device may be an estimation. Preferably the locator is able to estimate the general location of the device with reference to one or more of: (i) GPS; (ii) Assisted GPS; (iii) Synthetic GPS; (ii) Carriers Cell ID; (ii) Carrier Triangulation; (iv) WIFI; (iv) Bluetooth Beacons; (vi) Terrestrial Transmitters. Preferably various combinations of these technologies are used by the locator.

Preferably the security device includes an indicator to indicate whether the device is in an authorized location. Preferably a store of one or authorised locations for a number of security devices is maintained by the virtual computer service.

Preferably the device communicates over the Internet.

The security device may be able to communicate over mobile telephony networks including to a terrestrial cellular network of base stations (cell sites). The device may be able to communicate over mobile telephony networks including orbiting satellites (satellite telephone networks). The device may include and be able to receive and communicate using a mobile Universal Integrated Circuit Card—colloquially referred to by some as a SIM Card. The SIM card may be used to provide an identifier of the device.

Preferably the security device is a dedicated financial security device with a locked down system environment for providing access to financial information. The financial information may be banking information, trust account information, share portfolio information.

Preferably the security device is a dedicated asset security device with a locked down system environment for providing access to asset information. The asset information may be real estate portfolio information.

According to an aspect of preferred embodiments herein described there is provided a security device for a local computer, the device including: a locked down system environment including a remote access connector and an authenticator facility; the remote access connector able to initiate a remote connection request with a virtual computer service; and the authenticator facility able to provide first authentication data to the remote access connector for ensuring that the security device has permission to be allocated a virtual computer from the virtual computer service.

Preferably the locked down system environment includes an operating system directed to preventing third party attacks and provides no more than remote desktop services and authentication services.

Preferably the locked down system environment includes an operating system directed to preventing third party attacks and provides no more than remote desktop services, authentication services and storage services.

Preferably the authenticator facility is able to provide the remote access connector with the first authentication data; the virtual computer service able to use the first authentication data to authenticate the remote connection request.

Preferably the first authentication data includes authentication data unique to the local computer.

Preferably the first authentication data includes authentication data unique to the security device.

Preferably the security device comprises removable media that is able to be inserted to provide an operating system when booting the local computer.

Preferably the electronic security device comprises a thumb drive.

Preferably the electronic security device comprises a compact disc.

Preferably the security device comprises removable media that is able to be connected to provide an operating system when booting the local computer. The removable media may be connected electronically or otherwise.

Direct physical insertion of a USB removable drive is preferred.

According to an aspect of preferred embodiments herein described there is provided a peripheral switch for use with a local computer having a local monitor, the peripheral switch including: (i) a remote access connector and an authentication facility; and (ii) a number of ports or cables for connection to a keyboard, a mouse, the local computer, and the local monitor; the remote access connector being configured to read authentication data from the authentication store and authenticate with a virtual computer service in order to associate a virtual computer with the device; the switch being operable to move an effective association of the monitor, keyboard and mouse between the remote access connector and the local computer; wherein when the remote access connector is not connected to a virtual computer and the association is or is intended be moved to the remote access controller, the remote access controller automatically executes a sequence directed towards the remote access connector authenticating with the virtual computer service to connect a virtual computer in a relatively seamless manner.

According to an aspect of preferred embodiments herein described there is provided a computer system comprising: a virtual computer service able to associate virtual computers with portable peripheral devices wherein each peripheral device comprises a peripheral switch for use with a local computer having a monitor, the peripheral switch including: (i) a remote access connector and an authentication facility; and (ii) a number of ports or cables for connection to a keyboard, a mouse, the local computer, and the local monitor; the remote access connector being configured to read authentication data from the authentication store and authenticate with a virtual computer service in order to associate a virtual computer with the device; the switch being operable to move an effective association of the monitor, keyboard and mouse between the remote access connector and the local computer; wherein when the remote access connector is not connected to a virtual computer and the association is or is intended be moved to the remote access controller, the remote access controller automatically executes a sequence directed towards the remote access connector authenticating with the virtual computer service to connect a virtual computer in a relatively seamless manner.

According to an aspect of preferred embodiments herein described there is provided a device for use by a user, the device comprising: a remote access connector; a display output and an authenticator facility; the remote access connector able to initiate a remote connection request with a virtual computer service; the display output for generating a graphical user interface in association with the virtual computer; and the authenticator facility providing first authentication data to the remote access connector for ensuring that the device has permission to be allocated a virtual computer from the virtual computer service.

Preferably the virtual computer service comprises a computer system that is configured to authenticate devices at the device level.

Preferably the virtual computer service comprises a computer system that is configured to authenticate devices at the device level before allocating virtual computers.

According to a further aspect of preferred embodiments herein described there is provided a computer system for use by users, the system comprising: (i) a virtual computer service for providing virtual computers; and (ii) security devices for connecting to the virtual computers; each security device comprising: a locked down system environment including a remote access connector, a display output and an authenticator facility; the remote access connector able to initiate a remote connection request with a virtual computer service; the display output for generating a graphical user interface in association with the virtual computer; and the authenticator facility providing first authentication data to the remote access connector for ensuring that the security device has permission to be allocated a virtual computer from the virtual computer service.

Preferably each locked down system environment includes an operating system directed to preventing third party attacks and providing no more than remote desktop services, authentication services, selector switch services and storage services.

Preferably each security device further includes a single step activator for communicating with the remote access connector to initiate the remote connection request; the single step activator being able to be operated by a user with a single action to connect to the virtual computer service.

Preferably the single step activator communicates with the remote access connector to initiate the remote connection request; and the authenticator facility provides remote access connector with the first authentication data.

Preferably the authentication data is unique to the security device.

Preferably the single step activator communicates with the remote access connector to initiate the remote connection request; the authenticator facility providing remote access connector with the authentication data; and the virtual computer service requesting further authorisation data to provide two factor authentication.

Preferably the further authentication data required comprises at least one of: (i) an access password; (iii) a one-time authentication code; and (iii) a unique push authentication code sent by the virtual computer service.

Preferably the authenticator facility is able to read encrypted data from a removable one time password generator connected to the security device and provide a one-time password as the further authentication data for use by the remote access connector.

Preferably the encrypted data is read from a readable storage forming part of the security device.

Preferably the virtual computer service allocates a virtual computer and provides access only to single application allowing the user to access the user's financial information.

Preferably the virtual computer service allocates a virtual computer and provides access to single application allowing the user to access the users banking information and transfer banking information to a storage area.

Preferably the virtual computer service is adapted to allocated different virtual computers to each device over time with different IP address; wherein the IP addresses are proactively chosen to be associated with different geolocations.

Preferably the virtual computer service is able to allocate virtual computers according to a strategy seeking to limit the possibility of a security breach or unauthorised information disclosure to a third party. Preferably this includes allocating virtual computers associated with different geolocations to the devices. Preferably the virtual computers are located in different regions of the world so as to have different IP (Internet protocol) addresses. The virtual computers may be located in different geo-located datacentres.

Preferably the virtual computer service is configured to maintain a list of one or more authorised security device locations for each security device. Preferably the virtual computer service is configured to receive location data from the security devices.

The location data may be determined by reference to one or more of: (i) GPS; (ii) Assisted GPS; (iii) Synthetic GPS; (ii) Carriers Cell ID; (ii) Carrier Triangulation; (iv) WIFI; (iv) Bluetooth Beacons; (vi) Terrestrial Transmitters. Preferably various combinations of these technologies are used by the locator.

Preferably the virtual computer service is configured to send information to each device to display an indicator as to whether the device is in an authorised location. If a device is not at an authorised location then the virtual computer service does not provide a virtual computer for access by the device.

Preferably the virtual computer service allocates a virtual computer and provides access to single application allowing the user to access the users banking information and transfer banking information to a storage area.

According to a further aspect of preferred embodiments herein described there is provided a computer implemented method of providing virtual computers for use by users comprising: providing a virtual computer service and providing each user with a user security device; each user security device providing a locked down operating environment including a remote access connector, a display output and an authenticator facility; in the method receiving remote connection requests initiated by the users and sent by the remote access connector to the virtual computer service; the authenticator facility providing first authentication data to the remote access connector; and the virtual computer service authenticating the first authentication data to ensure that the security device is an authenticated security device that has permission to be allocated a virtual computer from the virtual computer service.

Preferably the method includes allocating different virtual computers to each device over time with different IP address; wherein the IP addresses are chosen to be associated with different geolocations.

Preferably the virtual computer service or allocated virtual computer requests further authorisation data from the user to provide two factor authentication.

Preferably the wherein the first authentication data for a security device is unique to the security device or a predetermined group of security devices; and is provided by the remote access connector the virtual computer service for ensuring that the security device has permission to be allocated a virtual computer.

Preferably the virtual computer service allocates a virtual computer and provides access only to single application allowing the user to access the user's financial information.

Preferably the virtual computer service allocates a virtual computer and provides access only to single application allowing the user to access the user's asset information.

Preferably the virtual computer service is configured to maintain a list of authorised device locations.

Preferably the virtual computer service is configured to receive location data from the security devices.

The location data may be determined by reference to one or more of: (i) GPS; (ii) Assisted GPS; (iii) Synthetic GPS; (ii) Carriers Cell ID; (ii) Carrier Triangulation; (iv) WIFI; (iv) Bluetooth Beacons; (vi) Terrestrial Transmitters. Preferably various combinations of these technologies are used by the locator.

Preferably the virtual computer service is configured to send information to each device to display an indicator as to whether the device is in an authorised location.

In computing, of course, no absolutes can be provided. As would be apparent to a person skilled in the art, 'security' 'locked down' and 'preventing' are to be read is in the sense of being configured for the requisite purpose without absolutes. It is always possible that preferred embodiments of the present invention could be compromised by a third party. Security is relative and is generally provided substantially as much as is possible and practicable in the circumstances.

Locked down systems are generally minimal, again in the sense of the purpose, to limit access extraneous features that may present security risks. As exploits are uncovered, updates are generally made to existing functionally to limit security risks.

According to an aspect of preferred embodiments herein described there is provided a method of providing virtual computers, the method including: ensuring that a series of system logon requests by users results in each user being provided with a series of virtual computers having different geolocations.

Preferably the method is for security reasons and seeks to limit the possibility of a security breach or unauthorised information disclosure to a third party.

According to an aspect of preferred embodiments herein described there is provided a method of providing virtual computers, the method including: ensuring that a series of system logon requests by users results in each user being provided with a series of virtual computers that reflect applied updates; each virtual computer being provided by resuming a virtual computer from a pool of suspended virtual computers where the suspended virtual computers are based on at least one virtual computer template; customizing each virtual computer after being resumed from the pool of suspended virtual computers to provide an active virtual computer; and regularly updating the at least one virtual computer template.

Preferably the method includes ensuring that the virtual computers provided to the users are regularly updated by terminating virtual computers based on system logoff requests by users.

Preferably the method includes ensuring that the virtual computers provided to the users are regularly updated by maintaining suspended virtual computers in the pool based on one or more regularly updated virtual computer templates.

Preferably the method includes maintaining suspended virtual computers in the pool includes creating suspended virtual computers in the pool and ensuring that the suspended virtual computers have a desirable turnover rate.

Preferably the method includes maintaining suspended virtual computers in the pool includes providing suspended virtual computers in the pool and deleting or otherwise removing older suspended virtual computers from the pool.

Preferably the method includes providing suspended virtual computers in the pool with each suspended virtual computer having services suspended in a substantially deployed state.

Preferably the method includes providing the suspended virtual computers in the pool with each suspended virtual computer having remote desktop services suspended in a substantially deployed state.

Preferably the substantially deployed state comprises a state in which the services are available as part of a fully operational system in the sense of being enabled and functional.

Preferably the method includes providing the suspended virtual computers in the pool by cloning one or more of the virtual computer templates to provide a number of virtual computers; installing applications on the virtual computers according to the different user classes; and suspending the virtual computers.

Preferably, in order to accommodate different user classes, the method includes uninstalling applications from a number of virtual computers cloned from the at least one virtual computer template.

Preferably the method includes creating suspended virtual computers in the pool with each suspended virtual computer having services suspended in a substantially deployed state; and ensuring that application installation or uninstallation is limited to 30 seconds or less in duration.

Preferably customizing the resumed virtual computer for a user includes allocating a security profile for the user.

Preferably the method includes communicating with a classification update facility to instruct active virtual computers to install or remove applications in response to alterations in user classification.

Preferably the suspended virtual machines are suspended in memory in a non-repeatable suspended state. The suspended virtual machines may be suspended in memory in a repeatable suspended state. The suspended virtual machines may be suspended on disk in a non-repeatable suspended state. The suspended virtual machines may be suspended on disk in a repeatable suspended state.

According to an aspect of preferred embodiments herein described there is provided a method of providing virtual computers, the method including: creating at least one virtual computer template; determining whether the or each at least one virtual computer template requires updating; caching suspended virtual computers based on the at least one virtual computer template; resuming the cached suspended virtual computers to provide active virtual computers in response to system logon requests.

Preferably each suspended virtual computer is cached with services suspended in a substantially deployed state.

According to an aspect of preferred embodiments herein described there is provided a method of providing virtual computers, the method including: providing a series of virtual computers as a result of a series of logins; wherein providing each virtual computer in the series of virtual computers includes resuming a suspended virtual computer from a pool of suspended virtual computers to provide a resumed virtual computer and customizing the resumed virtual computer; the suspended virtual computers in the pool being based on at least one virtual computer template.

Preferably the method includes creating suspended virtual computers in the pool with each suspended virtual computer having services suspended in a substantially deployed state.

According to an aspect of preferred embodiments herein described there is provided a method of providing virtual computers, the method including: caching suspended virtual computes; and resuming the cached suspended virtual computers to provide active virtual computers in response to system logon requests.

According to an aspect of preferred embodiments herein described there is provided a method of providing virtual computers, the method including: providing a series of virtual computers as a result of a series of logins by a user; wherein providing each virtual computer in the series of virtual computers includes resuming a suspended virtual computer to provide a resumed virtual computer; and customizing the resumed virtual computer for the user.

According to an aspect of preferred embodiments herein described there is provided a method of providing virtual computers, the method including: ensuring that a series of system logon requests by users results in the users being provided with a series of virtual computers that reflect applied updates; each virtual computer being provided by resuming a virtual computer from a pool of suspended virtual computers where the suspended virtual computers are based on at least one virtual computer template; customizing each virtual computer after being resumed from the pool of suspended virtual computers to provide an active virtual computer; and regularly updating the at least one virtual computer template.

According to an aspect of preferred embodiments herein described there is provided a computer system for providing virtual computers, the computer system including: a pool facility for storing a pool of suspended virtual computers based on at least one virtual computer template; and a provision manager for providing a series of virtual computers as a result of a series of system logon requests by users; the provision manager including an update facility, a resume facility and a customization facility; the update facility for updating the or each at least one virtual computer template; the resume facility for resuming virtual computers from the pool of suspended virtual computers provided by the pool facility; the customization facility for customizing virtual computers after being resumed from the pool of suspended virtual computers to provide active virtual computers.

Preferably the provision manger includes a termination facility for terminating virtual computers based on system logoff requests; the termination facility for assisting with ensuring that the virtual computers provided to the users are regularly updated.

Preferably the provision manger is able to ensure that the virtual computers provided to the users are regularly updated by maintaining suspended virtual computers in the pool based on one or more regularly updated virtual computer templates.

Preferably the provision manager is configured to maintain suspended virtual computers in the pool by ensuring that the suspended virtual computers have a desirable turnover rate.

Preferably the provision manager is configured for maintaining suspended virtual computers in the pool by creating suspended virtual computers in the pool and deleting or other removing older suspended virtual computers in the pool.

Preferably the provision manger includes a creation facility configured for providing suspended virtual computers in the pool with each suspended virtual computer having services suspended in a substantially deployed state.

Preferably the creation facility is configured for providing the suspended virtual computers in the pool with each suspended virtual computer having remote desktop services suspended in a substantially deployed state.

Preferably the substantially deployed state comprises a state in which services are available as part of a fully operational system in the sense of being enabled and functional.

Preferably the provision manager includes: a creation facility for providing the suspended virtual computers in the pool by cloning one or more of the at least one virtual computer template to provide a number virtual computers; an installation facility for installing applications according to the different user classes; and a suspension facility for suspending the virtual computers.

Preferably the provision facility includes an uninstall facility for accommodating different user classes, the uninstall facility for uninstalling applications from virtual computers cloned from the at least one virtual computer template.

Preferably the system includes a classification update facility for instructing active virtual computers to install or remove applications from in response to alterations in user classification.

According to an aspect of preferred embodiments herein described there is provided a computer system for providing virtual computers to users, the computer system including: a provision manager for providing a series of virtual computers for a series of system logon requests by users; the provision manager including a resume facility and a customization facility; the resume facility for resuming suspended virtual computers; the customization facility for customizing virtual computers for the users after being resumed.

According to an aspect of preferred embodiments herein described there is provided a computer system for providing virtual computers, the computer system including: a creation facility for providing virtual computer templates; an update facility for determining whether revised virtual computer templates are required with new updates; a cache facility for caching suspended virtual computers based on the virtual computer templates; and a resume facility for resuming the cached suspended virtual computers to provide virtual computers in response to system logon requests by users.

Preferably the cache facility is configured to cache each suspended virtual computer in a state with services suspended in a substantially deployed state.

According to an aspect of preferred embodiments herein described there is provided a computer system for providing virtual computers, the computer system including: a pool facility for storing a pool of suspended virtual computers based on at least one virtual computer template; and a provision manager for providing a series of virtual computers as a result of a series of system logon requests by users;

the provision manager including an update facility, a resume facility and a customization facility; the update facility for updating the or each at least one virtual computer template; the resume facility for resuming virtual computers from the pool of suspended virtual computers provided by the pool facility; the customization facility for customizing virtual computers after being resumed from the pool of suspended virtual computers to provide active virtual computers.

Preferably the cache facility is configured to cache each suspended virtual computer in a state with services suspended in a substantially deployed state.

Preferably there is provided a preceding method or system, run via at least one computer processor.

Preferably there is provided a non-transient computer readable medium having stored thereon computer executable instructions for performing a computer implemented method as detailed above.

Preferably there is provided a non-transient computer readable medium having stored thereon computer executable instructions encoding a computer implemented system as detailed above.

Preferably there is provided a non-transient computer-readable medium encoded with one or more facilities configured to run an application configured to carry out a number of operations to provide any one of the preceding methods or systems Preferably there is provided a non-transient computer implemented method or system detailed above.

According to an aspect of preferred embodiments herein described there is provided a computer system for providing virtual computers, the computer system including: a creation facility for providing virtual computer templates; an update facility for determining whether revised virtual computer templates are required with new updates; and a provision facility for providing virtual computers in response to system logon requests by users.

According to an aspect of preferred embodiments herein described there is provided a method of providing virtual computers, including: creating virtual computer templates; providing new virtual computers in response to system logon requests by users; and updating the computer templates.

It is to be recognised that other aspects, preferred forms and advantages of the present invention will be apparent from the present specification including the detailed description, drawings and claims.

BRIEF DESCRIPTION OF DRAWINGS

In order to facilitate a better understanding of the present invention, several preferred embodiments will now be described with reference to the accompanying drawings in which the following Figures are group under the headings below.

Security Systems

FIG. 6 provides further schematic view of the system and device shown in FIG. 2.

Virtualization Systems

Figure 1:
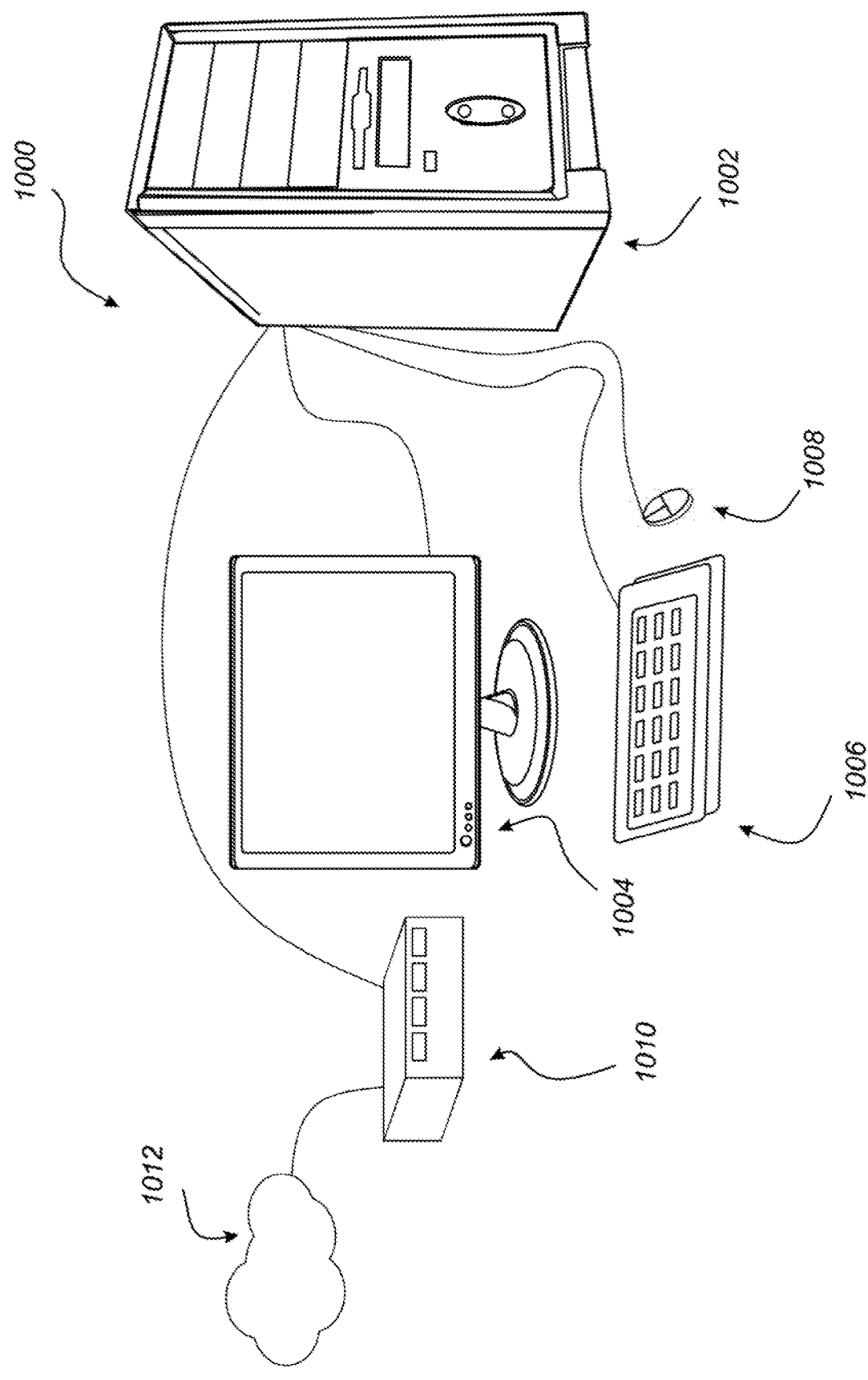
FIG. 1 provides a schematic view of a known system.
Figure 2:
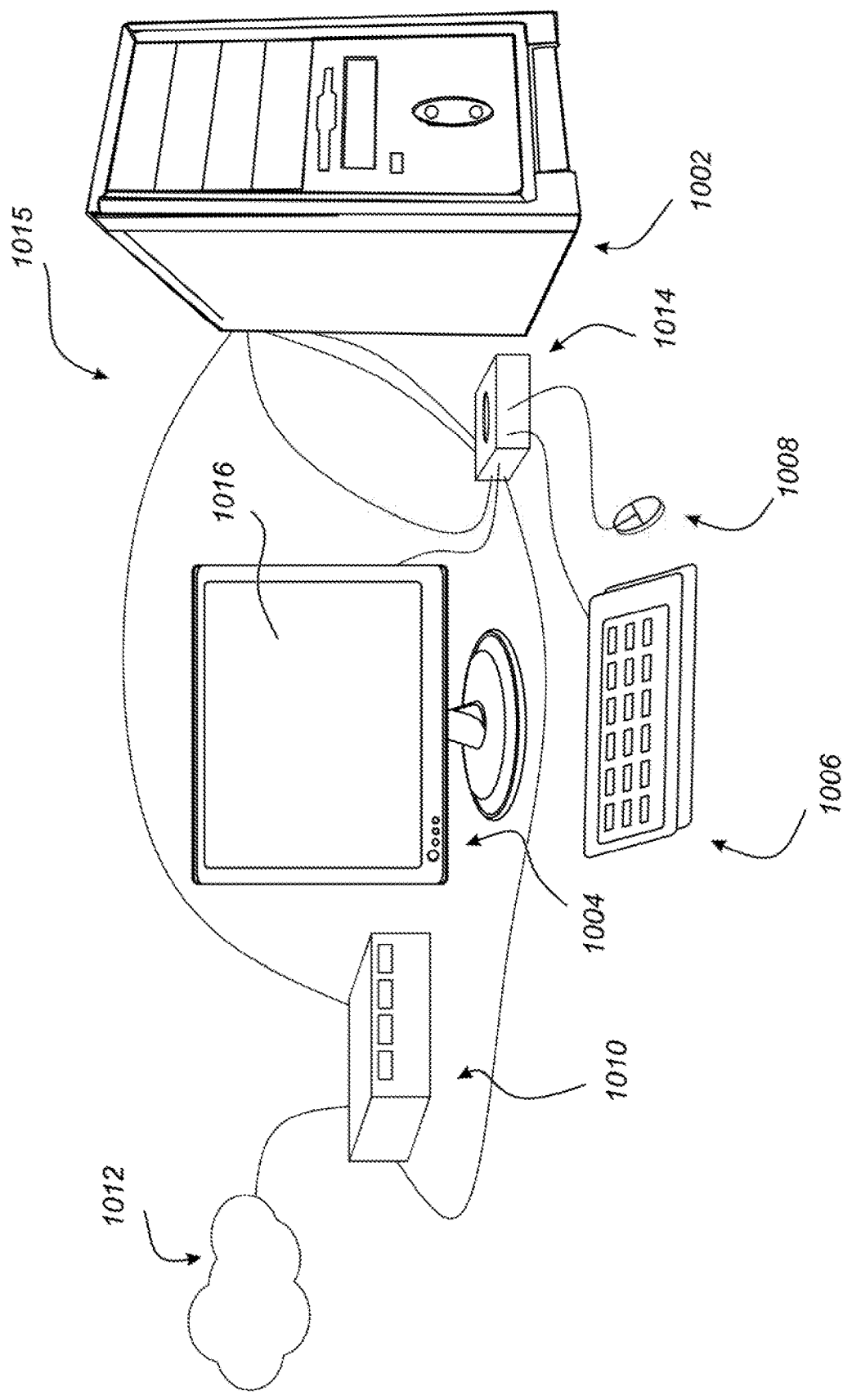
FIG. 2 provides schematic view of a system and device according to a preferred embodiment of the present invention.
Figure 5:
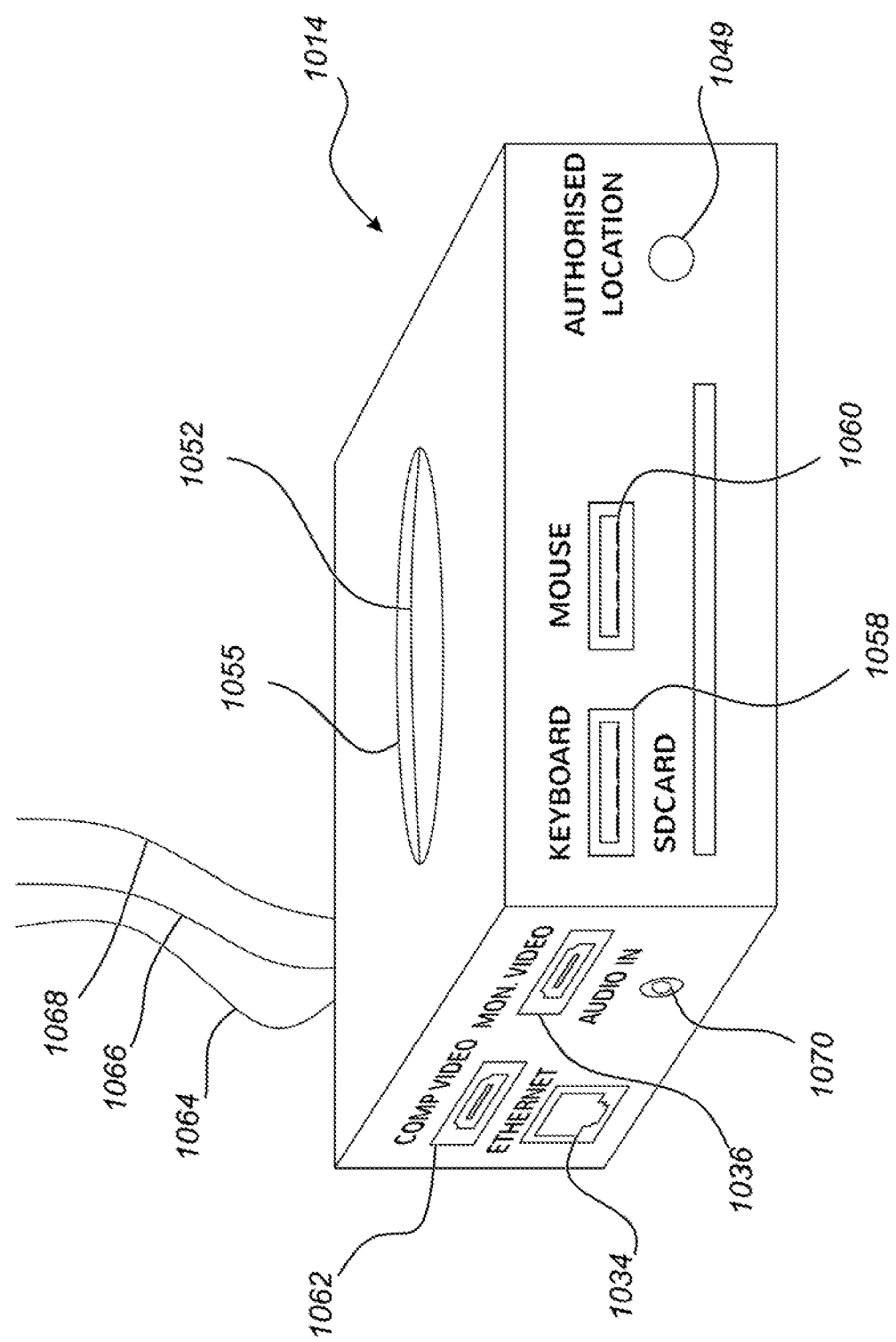
FIG. 5 provides a perspective illustrative view of the device shown in FIG. 2.

FIG. 14 (1') provides a schematic illustration of a computer system;

FIG. 15 (2') provides a schematic illustration of a virtual computer shown in FIG. 1';

FIG. 16 (3') provides a further illustration in relation to the virtual computer shown in FIG. 2';

FIG. 17 (4') provides a further illustration in relation to the virtual computer shown in FIG. 15 (2');

FIG. 18 (5' provides a further illustration of the computer system shown in FIG. 1';

FIG. 19 (6') and 20 (7') provide further illustrations in relation to FIG. 5';

FIGS. 21 (8') to 24 (11') provide screen images demonstrating the manner in which system logon requests are handled in the system shown in FIG. 1';

FIG. 25 (12') provides a screen image of an interface provided subsequent to a logon request in the system shown in FIG. 1';

FIG. 26 (13') provides a schematic illustration representing an initial state of the system shown in FIG. 1';

FIG. 27 (14') provides a screen image showing a button allowing the user to issue a logoff request in the system shown in FIG. 1';

FIG. 28 (15') provides a schematic illustration of a logoff request in relation to FIG. 14';

FIG. 29 (16') provides a schematic illustration of a computer system;

FIGS. 30 (17') and 31 (18') provide schematic illustrations of a method;

FIG. 32 (19')' provides a schematic illustration of a series of logon requests in relation to the method shown in FIG. 30(17');

FIG. 33 (20') to 35 (22') provide further schematic illustrations in relation to the method shown in FIG. 30 (17');

FIG. 36 (23') provides a schematic illustration of a computer;

FIG. 37 (24') provides a screenshot of an application store provided in the system shown in FIG. 36 (23');

FIG. 38 (25') provides a screen shot providing a time breakdown of a first process in relation to the system shown in FIG. 36 (23');

FIG. 39 (26') provides a screenshot providing a time breakdown of another process in relation to the system shown in FIG. 36 (23'); and FIG. 40 (27') provides an illustration of a system.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

FIG. 1 illustrates a typical computer system 1000. The computer system 1000 includes a computer 1002, a monitor 1004, a keyboard 1006, a mouse 1008 and a router or switch 1010 and an external network 1012.

FIG. 2 illustrates a preferred embodiment of the present invention in the form of a computer system 1015. In the embodiment there is provided a security device 1014 that, provides a further embodiment of the invention in its own right. The security device 1014 is operable by the user to provide a secure banking interface 1016 that is displayed on the monitor 1004.

Figure 3:
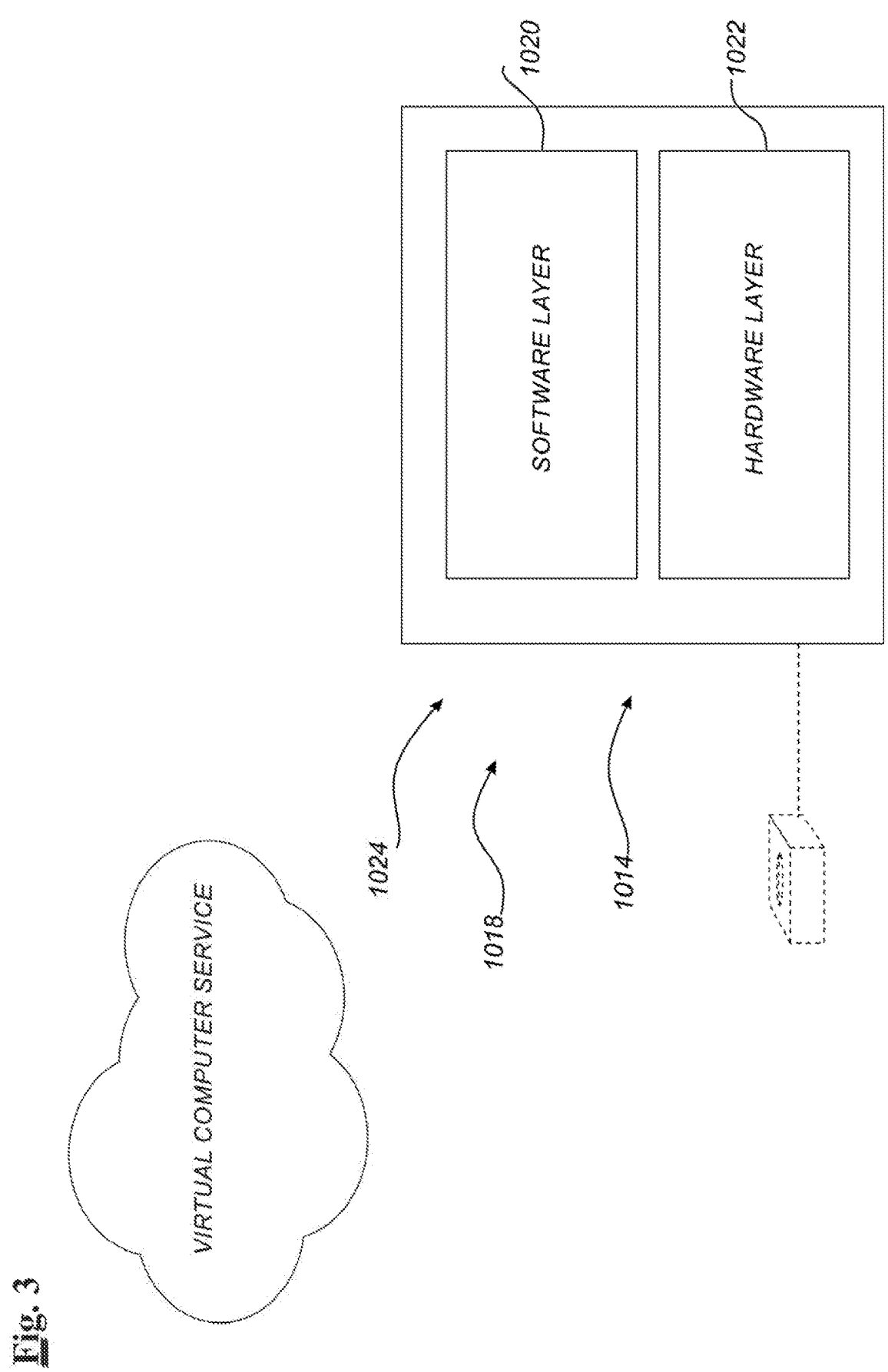
FIG. 3 provides a schematic view of the system and device shown in FIG. 2.

Referring to FIG. 3, the security device 1014 provides a locked down system environment 1018. The locked down system 1018 provides a software layer 1020 and a hardware layer 1022. The environment 1018 provides an operating system 1024 directed to preventing third party attacks.

Figure 4:
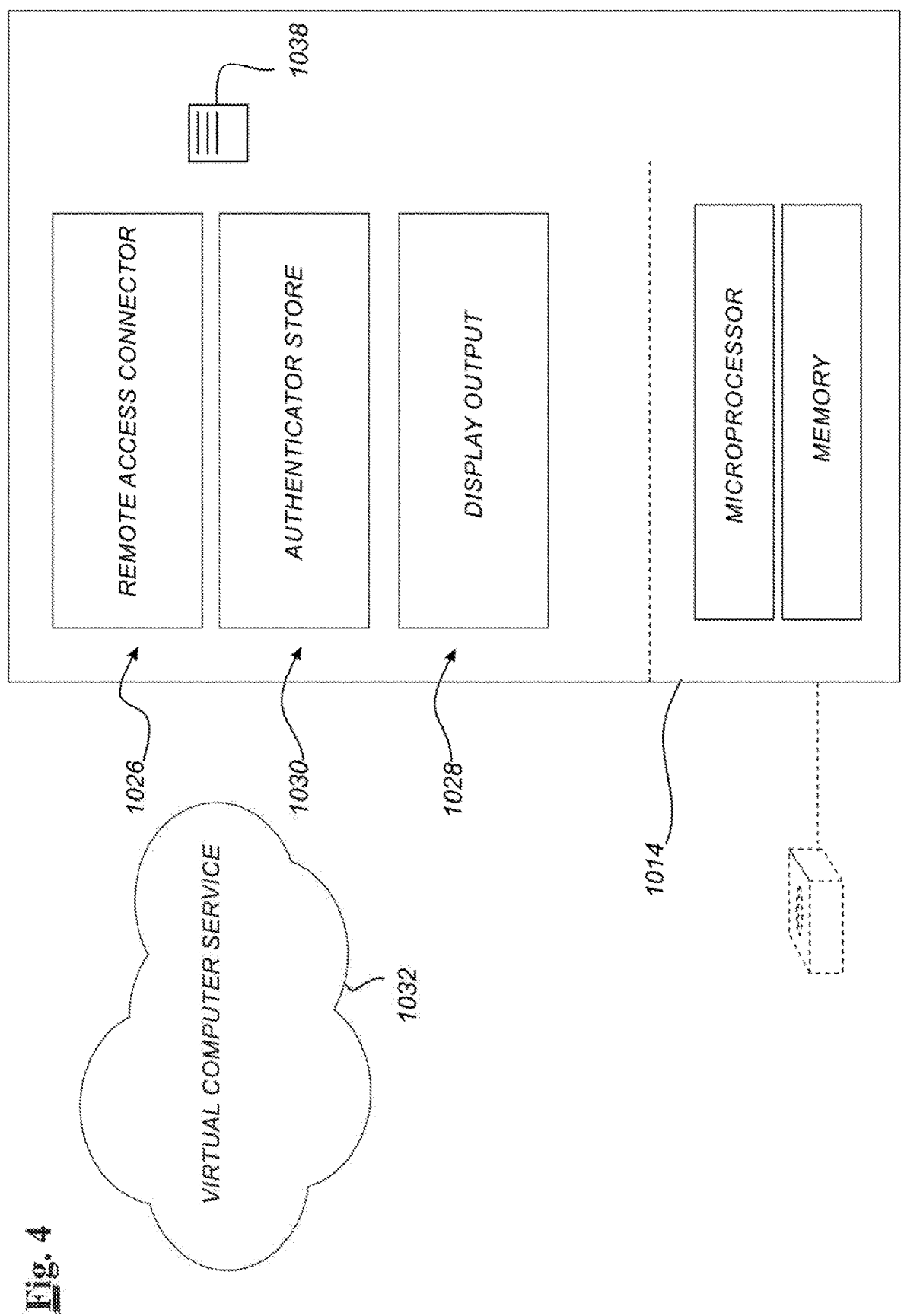
FIG. 4 provides a further schematic view of the system and device shown in FIG. 2.

Referring to FIG. 4, the security device 1014 provides a remote access connector 1026, a display output 1028 and an authenticator facility 1030. The remote access connector 1026 is able to send a remote connection request to a virtual computer service 1032. The remote connection request is connection request for a virtual computer to be allocated by the virtual computer service.

The virtual computer service 1032 in combination with a number of security devices 1014 provides a further preferred embodiment of the present invention.

The remote access connector 1026 sends the remote desktop connection request to the virtual computer service 1032 with a view to the allocation of a virtual computer, provided by a remote computer, in communication through the router/switch 1010.

In this embodiment the remote access connector 1026 is connected to an Ethernet connector 1048. Wireless connections and other connections allowing communication with a virtual computer over a network are of course also possible. In this embodiment the virtual computer service 1032 operates using KVM (Kernel-based Virtual Machine). Various wireless protocols are possible.

The physical construction of the security device 1014 is illustrated in FIG. 5. As shown the security device include an Ethernet port 1034 that allows the remote access connector 1026 to communicate with the virtual computer service 1032. The display output 1028 sends display information to the monitor 1004 through a monitor port 1036. In this manner the display output 1028 is able to generate a graphical user interface that represents the virtual computer.

As shown in FIG. 4, the authenticator facility 130 is able to provide first authentication data 1038 to the remote access connector 1026 for ensuring that the security device 1014 has permission to be allocated a virtual computer from the virtual computer service 1032.

The first authentication data in the embodiment comprises the MAC address of the Ethernet connector. In other embodiments a unique device identifier is permanently stored in a read only manner in a memory component of the device and is used as the first authentication data. Many ways of storing unique identifies in electronic devices are known. In this embodiment the unique identifier is encrypted in ROM. In embodiments the identifier may keep changing with time or use. The identifier may be a randomly generated string including a date time identifier. Various random number generators that are distinguished on the device level are known including FOB key generators as used in banking operations.

Referring to FIG. 6 the locked down system environment 1018 includes an operating system directed to preventing third party attacks and provides no more than remote desktop services 1040, authentication services 1042, selector switch services 1044 and storage services 1046. The locked down system environment 1018 is locked down in the sense of providing not providing any further notable services and provide minimal required access. Preferably a minimum operating environment to allow banking operations is provided via the remote desktop services. The system is locked down to both external parties trying to gain access through the network and the user. The user only has access to the remote connection facilities to make the connection to the virtual computer. Unauthorized external parties do not have access. In some embodiments no party other than the user has access. Various permissions approaches are possible.

In one particularly preferred embodiment a custom operating system is provided. The custom operating system is limited to providing remote protocol functionality that connects to the virtual computer service 1026. The remote protocol functionality may be a custom remote protocol functionality or one of NX, RDP, ICA. This protocols are distinguished in that they have the ability to provide a remote desktop of some form. In this embodiment the remote desktop is limited to providing a banking application running on the remote desktop only the banking application is accessible by the user. In the embodiment a browser is being hosted that can access the bank via the Internet. The bank could of course be connected to by VPN or dialup connection.

Figure 7:
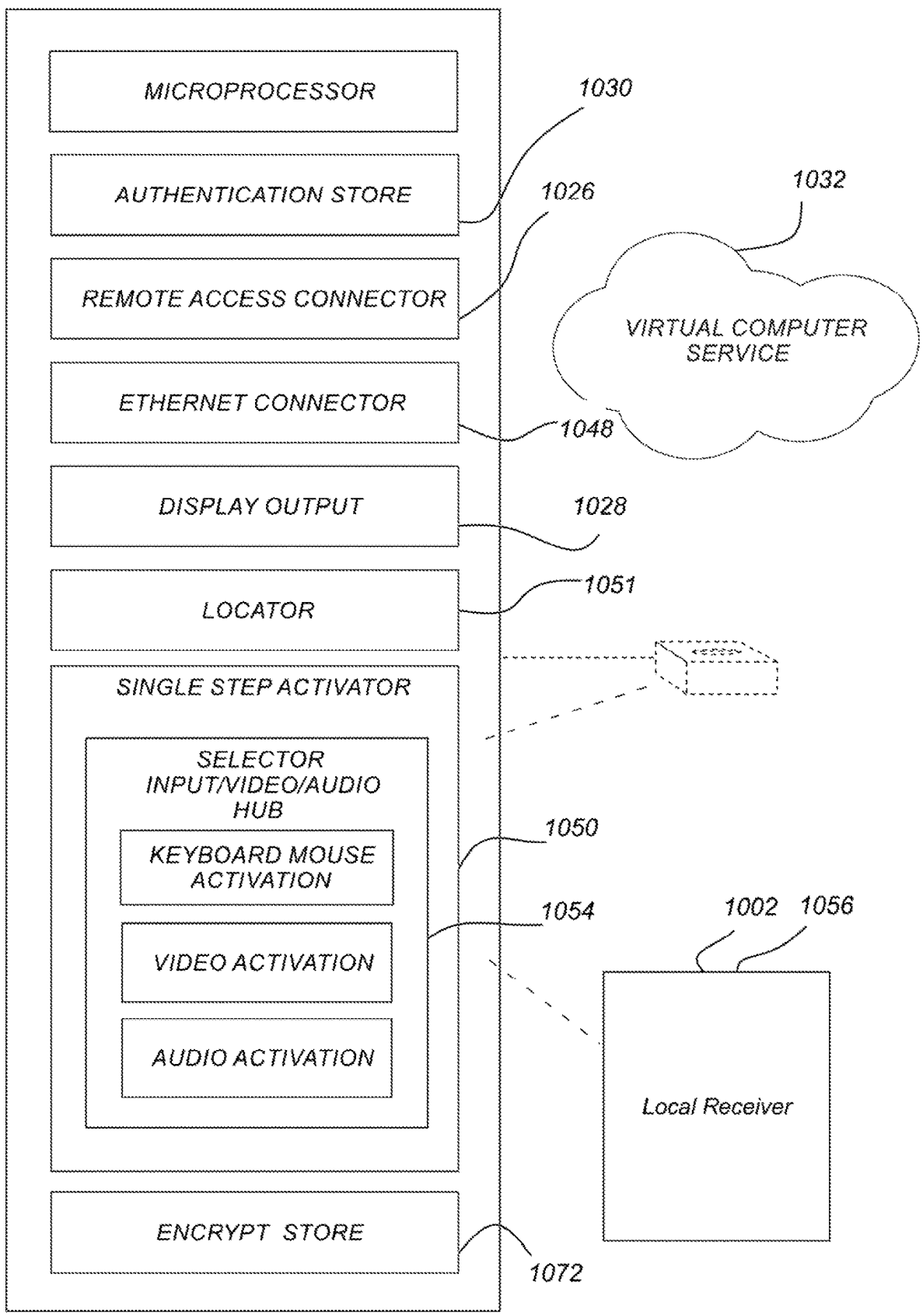
FIG. 7 provides further schematic view of the system and device shown in FIG. 2.

FIG. 7 provides a further illustration of the device 1014. As before there is a remote access connector 1026, an authentication facility 1030, an Ethernet connector 1048, and a display output 1028.

As shown in FIG. 7, the security device 1014 includes a single step activator 1050 for communicating with the remote access connector 1026 to initiate the remote desktop connection request. Using the single step activator 1050 a user is able to connect to the virtual computer service 1032 for further authentication.

Notably virtual computers provided by the virtual computer service are to be understood as being part of the virtual computer service. Further authentication may be requested by an allocated virtual computer itself or another facility of the virtual computer service. The virtual service provides a computer system of one or more interconnected hardware devices that cooperate to provide the virtual computers.

In this embodiment, the user is asked for a username and password. This occurs after the first authentication data 1038 has been authenticated by the virtual computer service 1032. In this manner two factor authentication is provided. There is device level authentication using the MAC address and subsequent user authentication using the keyboard or another communication input (such as a mobile phone associated with the device).

Various hardware based identification systems could be employed. U.S. Pat. No. 8,726,407 describes a number of known systems. Illustrative examples detailed in U.S. Pat. No. 8,726,407 include 'Illustrative examples of various machine parameters that may be accessible to an application or applications running on or interacting with a processor of the client machine to generate fingerprint data may include, for example: machine model; machine serial number; machine copyright; machine ROM version; machine bus speed; machine details; machine manufacturer; machine ROM release date; machine ROM size; machine UUID; and machine service tag. For further example, these machine parameters may include: CPU ID; CPU model; CPU details; CPU actual speed; CPU family; CPU manufacturer; CPU voltage; and CPU external clock; memory model; memory slots; memory total; and memory details; video card or component model; video card or component details; display model; display details; audio model; and audio details; network model; network address; Bluetooth address; hard disk drive model; hard disk drive serial number; hard disk drive configuration details; hard disk drive damage map; hard disk drive volume name; NetStore details; and NetStore volume name; optical drive model; optical drive serial; optical details; keyboard model; keyboard details; mouse model; mouse details; printer details; and scanner details; baseboard manufacturer; baseboard product name; baseboard version; baseboard serial number; and baseboard asset tag; chassis manufacturer; chassis type; chassis version; and chassis serial number; IDE controller; SATA controller; RAID controller; and SCSI controller; port connector designator; port connector type; port connector port type; and system slot type; cache level; cache size; cache max size; cache SRAM type; and cache error correction type; fan; PCMCIA; modem; portable battery; tape drive; USB controller; and USB hub; device model; device model IMEI; device model IMSI; and device model LCD; wireless 802.11; webcam; game controller; silicone serial; and PCI controller; machine model, processor model, processor details, processor speed, memory model, memory total, network model of each Ethernet interface, network MAC address of each Ethernet interface, dard disk drive model, hard disk drive serial identifier (e.g., using Dallas Silicone Serial DS-2401 chipset or the like), OS install date, nonce value, and nonce time of day. The foregoing examples are merely illustrative, and any suitable machine parameters may be used.'

In some preferred embodiments a number of unique identifiers are stored in a ROM of the device. These unique identifiers are used by the device as the first authentication data as a one-time password and include a time code. As described a database of sequential passwords may be stored on both the device and in the virtual computer service.

Various machine serial numbers and component features; time of day combined or varied for the purpose of authentication. Other embodiments may use a more complicated device level fingerprint. The types of fingerprint include passive finger prints and active fingerprints. Generally active fingerprints tolerates a degree of active querying using a trusted execution engine.

The security device 1014 includes a locator 1051 allowing the virtual computer service 1032 to determine the location of the security device. In this embodiment the security device is able to use GPS and sends details of its general location to the virtual computer service 1032. In this embodiment the location data is sent in combination with the authentication data 1038. The virtual computer service 1032 is configured to maintain a list of authorised locations for the security device. If the device is not in an authorized location then an alert may be generated. Access is not provided in such a circumstance. Various combinations of location technologies can be used in various embodiments. In this embodiment an indicator 1049 provides a visual indication as to whether the device is in an authorised location. This is shown in FIG. 5.

The single step activator 1050 includes a physical sensor 1052. The physical sensor 1052 comprises a pushable button 1055. The user presses the button 1055 to request a connection to the virtual computer service 1032 through router network 1012. The virtual computer service 1032 responds to the remote access connector 1026.

The display output displays a graphical user interface requesting a username and password on the monitor 1004. In other embodiments the physical sensor 1052 senses a physical characteristic to cause the virtual allocation services 1032 to be connected to via the network 1012. Various arrangements are possible including the use of a motion sensor or finger printer sensor in replace of the button.

As would be apparent the single step activator 1050 communicates with the remote access connector 1026 to initiate the remote desktop connection request; the authenticator facility provides the remote access connector with the authentication data. The first authentication data provided by the authentication facility 1030 is unique to the security device. The virtual computer service 1032 requests further authorisation data from the user to provide two factor authentication. In the case where a virtual computer is allocated before the user and password are requested an authorised, an incorrect user name and password results in the virtual computer is terminated.

Other embodiments may require one or more of (i) an access password without a user name; or (iii) a one-time authentication code; or (iii) a unique push authentication code sent by the virtual computer service. Various arrangements for two factor authorisation are possible.

Advantageously the security device further 1014 further includes a selector input hub 1054 that is able to select whether input command signals are sent to the remote access connector or a local receiver 1056 (the local computer 1002) in the same location as the security device. In this embodiment the local receiver 1056 comprises the computer 1002. As such a single keyboard and mouse can be used in the computer system 1015.

Referring to FIG. 5, the device 1014 includes a keyboard port 1058, and a mouse port 1060. The keyboard port 1058 and mouse port 1060 are interchangeable in the sense that the mouse could be plugged into the keyboard port and the keyboard could be plugged into the mouse port. These ports form part of the selector input hub 1054.

Advantageously the selector hub is able to send the keyboard and mouse command signals to either the remote access connector 1026 or the local computer 1002. In this manner the selector hub 1050 is able to be connected to the keyboard 1006 and the mouse 1008. The selector hub 1050 is able to select whether the input command signals from the keyboard and mouse are sent to the remote access connector 1026 or the local computer 1002. The selector hub 1050 provides a switching arrangement.

The selector hub 1050 also provides a selector video hub 1050 that is able select and direct video signals to the display output 1028. The selector hub 1050 selects the video signals selected from a video output from the remote access connector 1026 and a video input port 1062.

In this embodiment the selector hub 1050 is able to direct either the video signals associated with the virtual allocation service/virtual computer or the computer when connected to the video input port 1062, to the monitor port 1036 forming part of the display output 1028. The selector hub 1050 switches the keyboard mouse and video to and from the local computer 1002 in response to a single activation by the user using the pushable button 1055.

The selector hub 1050 also provides a selector audio hub 1050 that selectively provides audio output associated with the local computer or device in a similar manner to the video. An audio input port 1070 is provided for the local computer to send audio output in a manner similar to the video.

The activation using the pushable button 1055 is reversible. As such a first push of the button 1055 will switch away from the local computer 1002 and a second push of the button will switch back to the local computer 1002. Following the second press the remote access control will operate to break the connection with and terminate the virtual computer of virtual computer service. In other embodiment there may be a timed delay before the termination of the virtual computer.

Thus the single step activator 1050 is provided for communicating with the remote access connector 1026 to initiate connection and disconnection from the remote computer and switch control using the selector hub 1054 to and from the local computer 1002.

It would apparent that the selector hub 1054 could of course switch to another connected local receiver in the same location as the security device.

As shown in FIG. 5, the device 1014 includes: (i) a first connection 1064 for providing keyboard control for the local computer 1002; (ii) a second connection 1066 for providing mouse control for the local computer 1002; and (iii) a third connection 1068 for providing an audio line output. Generally the first and second connections 1064 and 1066 will be connected to the computer 1002 and the third connection 1068 will be connected to speaker or speaker system. When the security device 1014 is in a 'first state' the first and second connections 1064, 1066 are deactivated the third connection transmits audio associated with the remote access. When switched to a 'second state' associated with the local computer, the first and second connections 1064, 1066 are activated and the third connection transmits audio associated with the local computer.

A selector hub having: (i) wireless; or (ii) wireless and corded functionality are also possibilities. Wired connections are presently preferred. In this embodiment the keyboard and mouse send encrypted signals to the security device 1014 using private key infrastructure. It is to be appreciated however that it may be possible to also transport keyboard and mouse signals via Ethernet or another communication channel.

In this embodiment the device 1014 has an encryption facility 1072 is able to send a public key to the keyboard and mouse. The keyboard has a corresponding encrypt facility that encrypts the keystrokes signals sent to the security device 1014 using the public key. Similarly the mouse has an encrypt store that that encrypts the mouse signals sent to the security device 1014 using the public key. In this embodiment the keyboard and mouse are also authenticated using the virtual computer service 1032. Both the keyboard and mouse have unique identifiers that are sent to the virtual computer service for authentication by the remote access connector 1026. In this manner each of the device, keyboard and mouse are authenticated. Once authenticated the keyboard and mouse are activated and able to control the virtual computer service.

Figure 8:
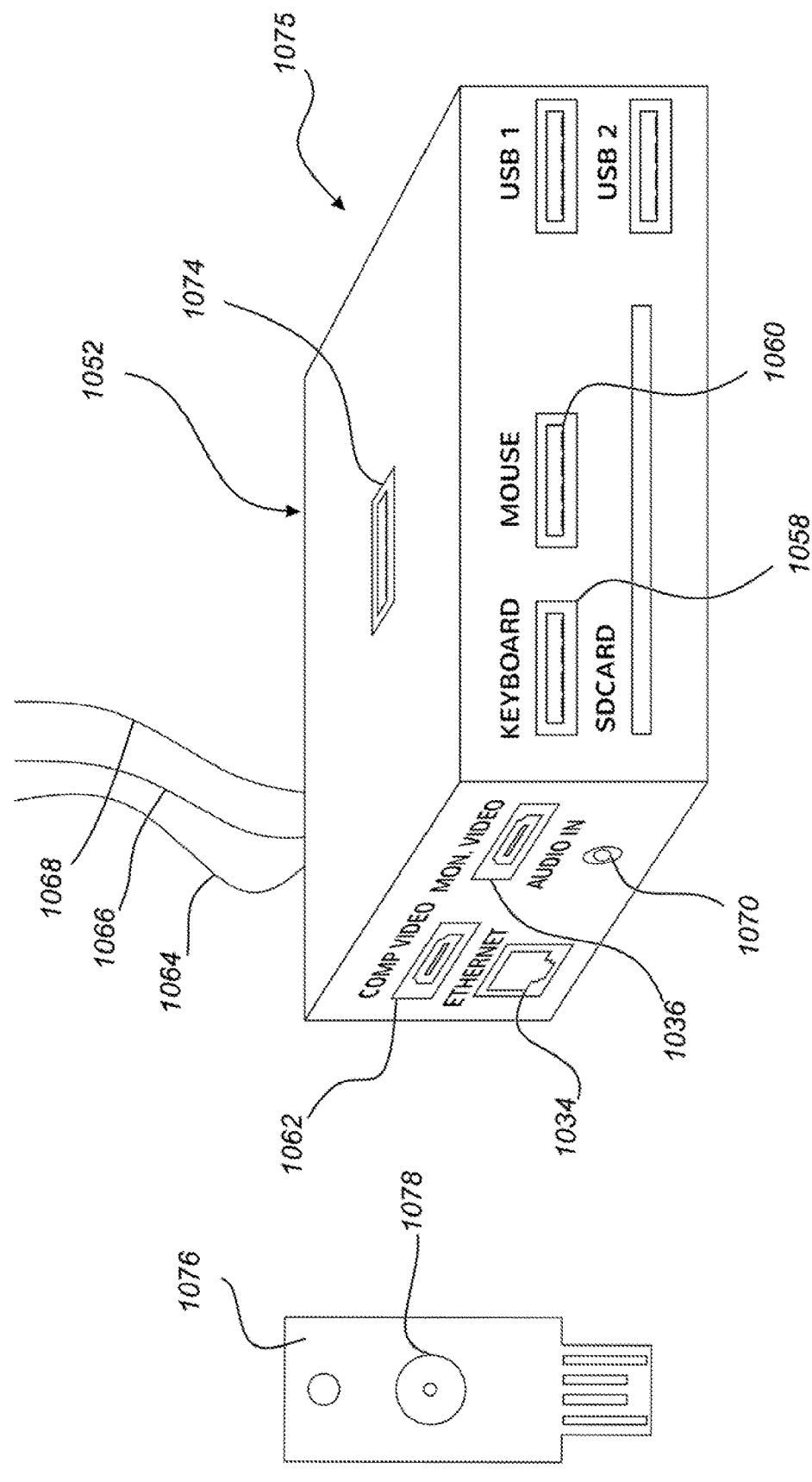
FIG. 8 provides a view of a further preferred embodiment of the present invention.

Referring to FIG. 8, there is shown a further security device 1075 according to a further preferred embodiment of the present invention. Similar parts are labelled with numerals corresponding to the embodiment described in relation to FIG. 2. Instead of there being a push button 1055 there is provided a port 1074 for a one time password generator 1076. In this embodiment the one time password generator 1076 comprises a Yubikey manufactured by Yubico.com. The user inserts the one time password generator 1076 into the port 1074 and presses a button 1078. The device 1014 queries the virtual computer service to authenticate the association of the one-time password generator 1076 with the device 1075. If the authenticated, the device 1075 operates similarly to pressing the button 1055 in the first embodiment.

In the device 1075, the authenticator facility 1030 is able to read encrypted data from a one-time password generator 1076 and provide a one-time password as the further authentication data for use by the remote access connector. The one time password provides a second factor of authentication in addition to the identification of the device 1075

Figure 9:
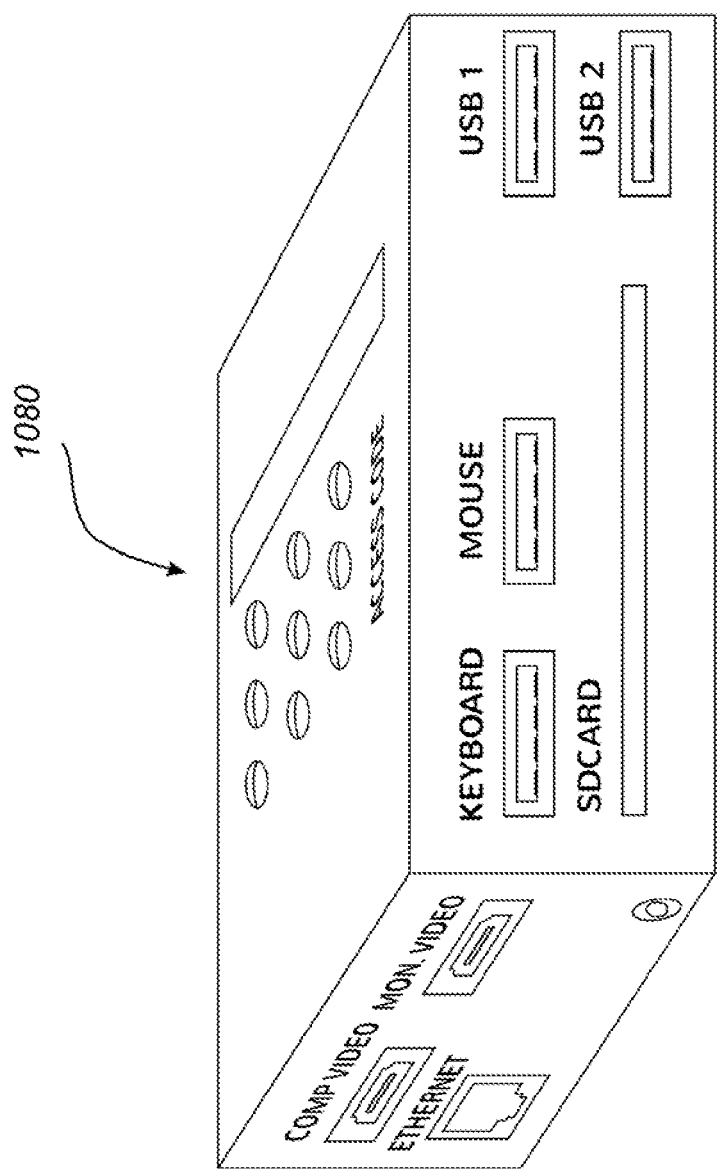
FIG. 9 provides a perspective view of another preferred embodiment of the present invention.

Referring to FIG. 9 there is shown a further preferred embodiment of the present invention. The security device includes an access code input device 1080 instead of there being a push button 1055. The access code provides a different manner of further authentication. The use of hardware tokens of this form are generally known.

The overall system comprising the virtual computer service and a number of the devices provides a further preferred embodiment. The system is operable to provide secure virtual computers for use by users. The computer system provides a secure banking terminal that is distinguished from the local computer environment by being a controlled environment in terms of updates and program installations. The virtual computers supplied are preferably locked down.

The overall system comprises: a virtual computer service for providing virtual computers and user security devices for connecting to the virtual computers; each security device comprising: a locked down system environment including a remote access connector able to initiate a remote desktop connection request with a virtual computer service to allocate a virtual computer; a display output for generating a graphical user interface connected with the virtual computer, and an authenticator facility providing first authentication data to the remote access connector for ensuring that the security device that has permission to be allocated a virtual computer from the virtual computer service.

Each security device is adapted to be connected to a local computer and be isolated therefrom apart from a hub allowing the selection of keyboard, mouse, video and audio inputs and signals.

The security devices are each provided with a locked down operating system directed to preventing third party attacks; the operating system being directed to provide no more than remote desktop services, authentication services, selector switch services and storage services.

A single step activator is physically operable a user with a single action to connect to a devices to the virtual computer service. The authenticator facility provides remote access connector with the authentication data. The authentication data is unique to the security device. The virtual computer service requires further authentication.

Figure 10:
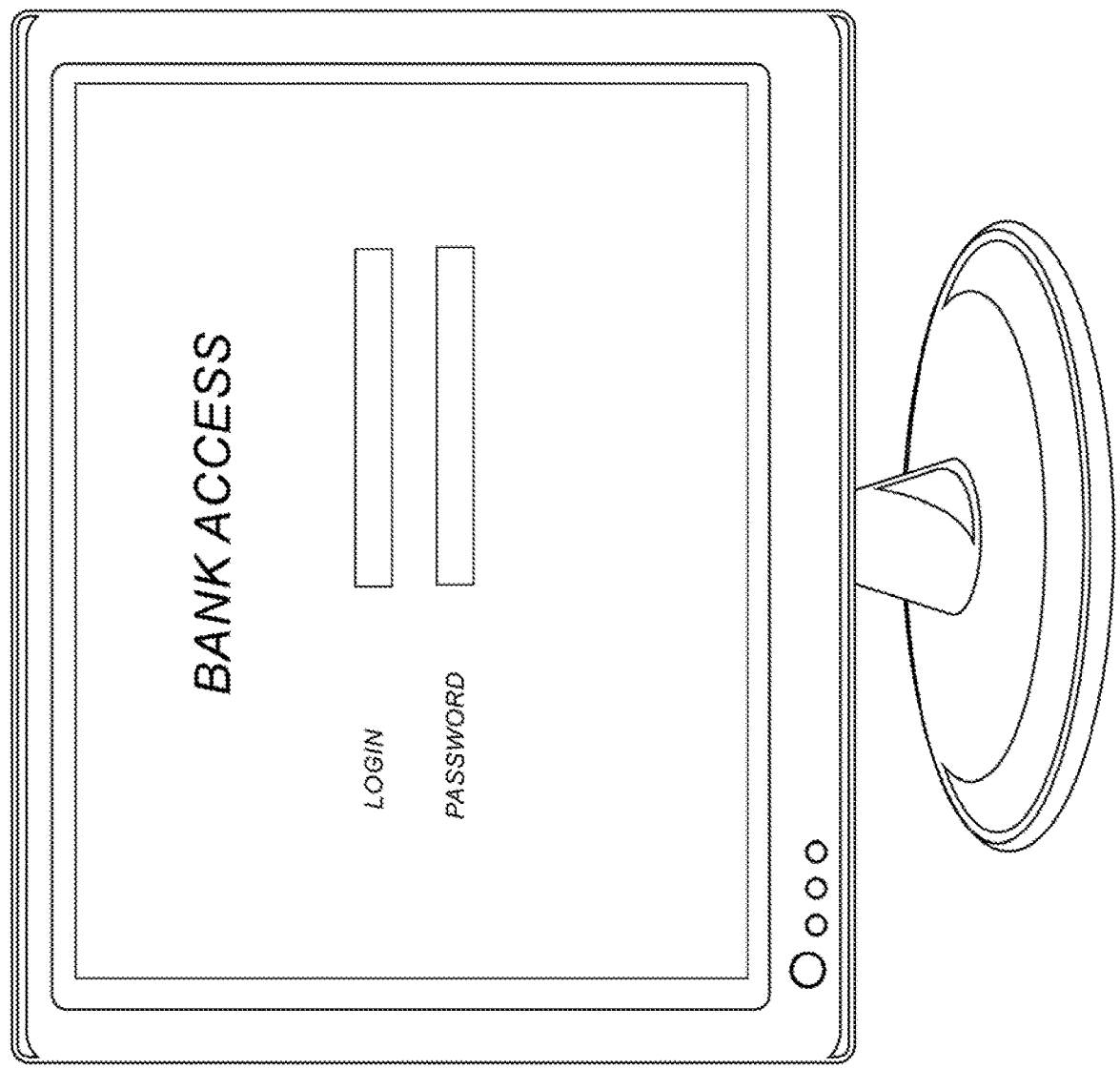
FIG. 10 provides an illustration of an interface used in a banking system according to another preferred embodiment of the present invention.

The virtual computer service provides the virtual computer as a secure banking interface. In the embodiment the virtual computer service allocates a virtual computer and provides access to single application allowing the user to access the user's banking information. This application comprises a web browser fixed the banks online banking portal. One possible bank access login interface is illustrated in FIG. 10. Notably the user is not able to switch away from the banking interface and access other functionality possibly provided by the allocated virtual computer By providing a virtual computer it is also possible that banking information can be transferred to a secure storage area associated with a user account. This storage area may be accessible via the internet for use by the user.

Figure 12:
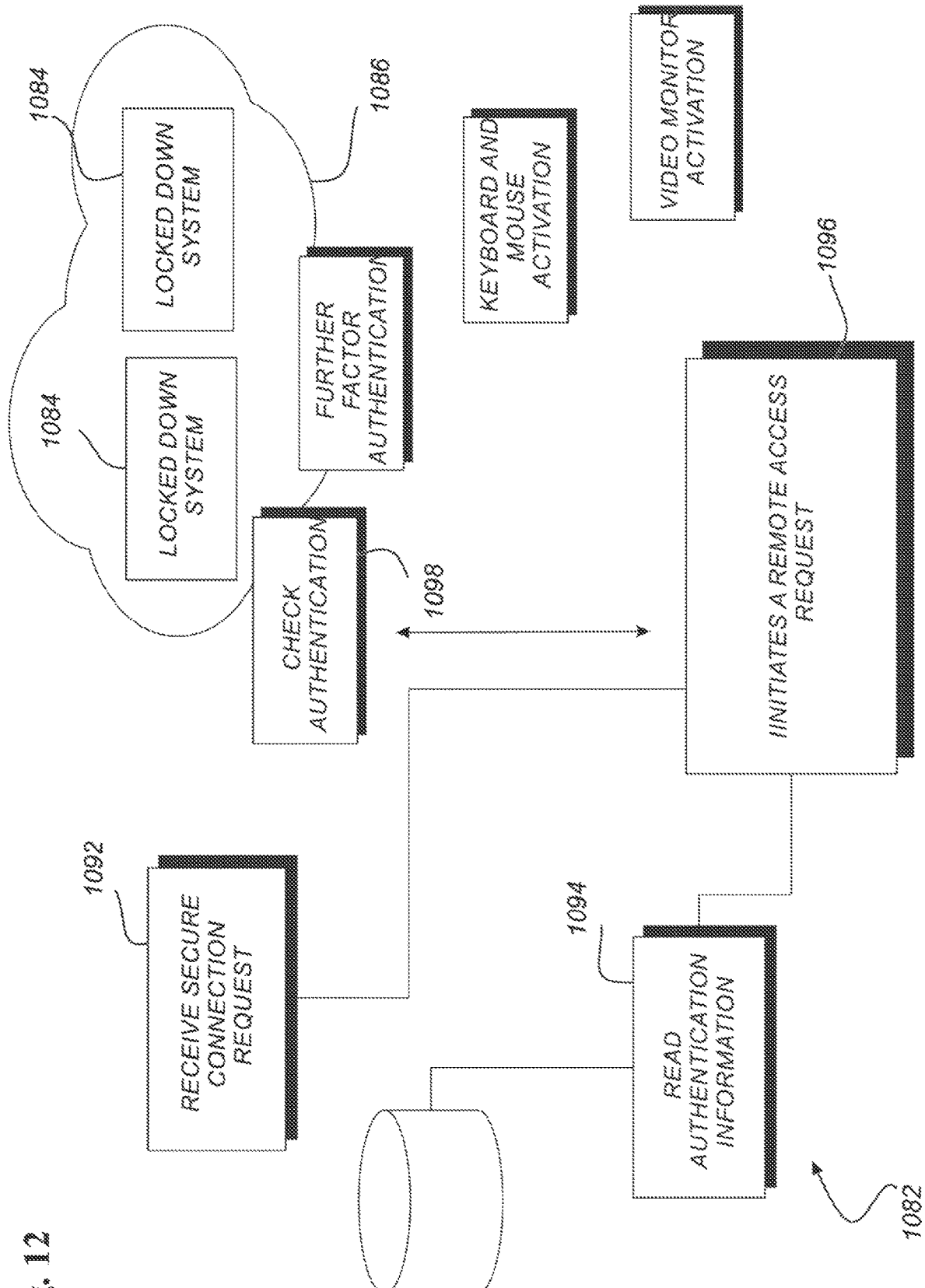
FIG. 12 provides a schematic illustration of a method according to another preferred embodiment of the present invention.

Referring to FIG. 12 there is shown a computer implemented method 1082 of providing virtual computers 1084 for use by users 1088. The method 1082 includes providing a virtual computer service 1086 and providing each user 1088 with a user security device 1090.

As before each user security device 1090 provides a locked down operating environment including a remote access connector, a display output and an authenticator facility. Upon requiring a secure bank interface each of the users is able to initiate a remote desktop connection request sent by the remote access connector to the virtual computer service 1086.

Each of the devices 1090 is associated with a unique identifier that uniquely identifies a device on a one to one basis. The unique identifiers are encrypted and provide authentication data that is sent to the virtual computer service via a global communications network ('Internet') when a user activates a security device 1090.

In the method a secure connection request is made by a user. At block 1092, a device receives a request. At block 1094 authentication data is ready from or by an authentication facility. At block 1096 the device initiates a remote access request with the virtual computer service 1086 using a remote access connector.

At block 1098 the virtual computer service 1086 checks the first authentication data (device level) to ensure that that the security device is an authenticated security device that has permission to be allocated a virtual computer by the virtual computer service 1086.

In the embodiment, this occurs using an encrypted connection that is established by the exchange of public keys unique to each of the security device 1090 and the virtual computer service 1086.

By the devices 1090 each including a unique encrypted identifier the virtual computer service 1086 is able to control access on a device level. In addition the banking interface requests further user identifying information to provide multiple factor user identification. Each of the virtual computers 1084 provided comprises a locked down system.

In particular embodiments, the sequence of virtual computers 1084 provided to a particular device is selected to ensure that the IP addresses of the virtual computers provided in response to multiple requests have IP addresses associated with different locations to prevent repetitive intrusion attempts for a particular user. The advantages of varying the IP address will be suited to only particular applications and possibly not say banking, as in the present embodiment.

In the present embodiment, the user is using a local machine and wishes to securely connect to their bank, the user uses presses a button in a single action, this switches the keyboard, video and mouse inputs away from the local machine. A further presses switches back to the local machine with a time delay before the virtual computer allocated and logged into is terminated.

Preferably the switching occurs using a single step activation (pushing a button or possibly swiping a card). The user can switch between his or her local machine and the secure banking interface multiple times while at the computer.

In the method, the virtual computer service allocates a virtual computer and provides access to single application allowing the user to access the users banking information.

In other embodiments the first authentication data for a security device may be unique to the security device or a select group of security devices. Being using to a select group of security device is possibly but presently not preferred.

In each of the embodiments described the virtual computers are provided as freshly built virtual computers having applied updates. By being freshly built and by the devices having locked down operating systems, a particular useful overall method and system is considered to be able to be provided.

In addition it is to be appreciate that the various specification connections shown and described could be modified to allow for a combination and modification. For example there is software presently available that allows for keyboard and USB input to be sent over Ethernet. As such the connections 1064-1068 could be removed entirely with use being made solely of the Ethernet connection to the shared router/switch. The audio output 1068 could also be sent over Ethernet or another protocol. The operating system of the device 10 may be stored on a removable SD card.

As noted with computer security is it generally not possible to provide a no-breakable system. The system is locked down in terms of applying approaches to limit intrusion risk. Ideally updates are regularly provided. In some instances a secured updated operating system for a device may be provided by post, requiring activation by telephone or otherwise. In an embodiment the operating system is stored on an SD Card.

Figure 13:
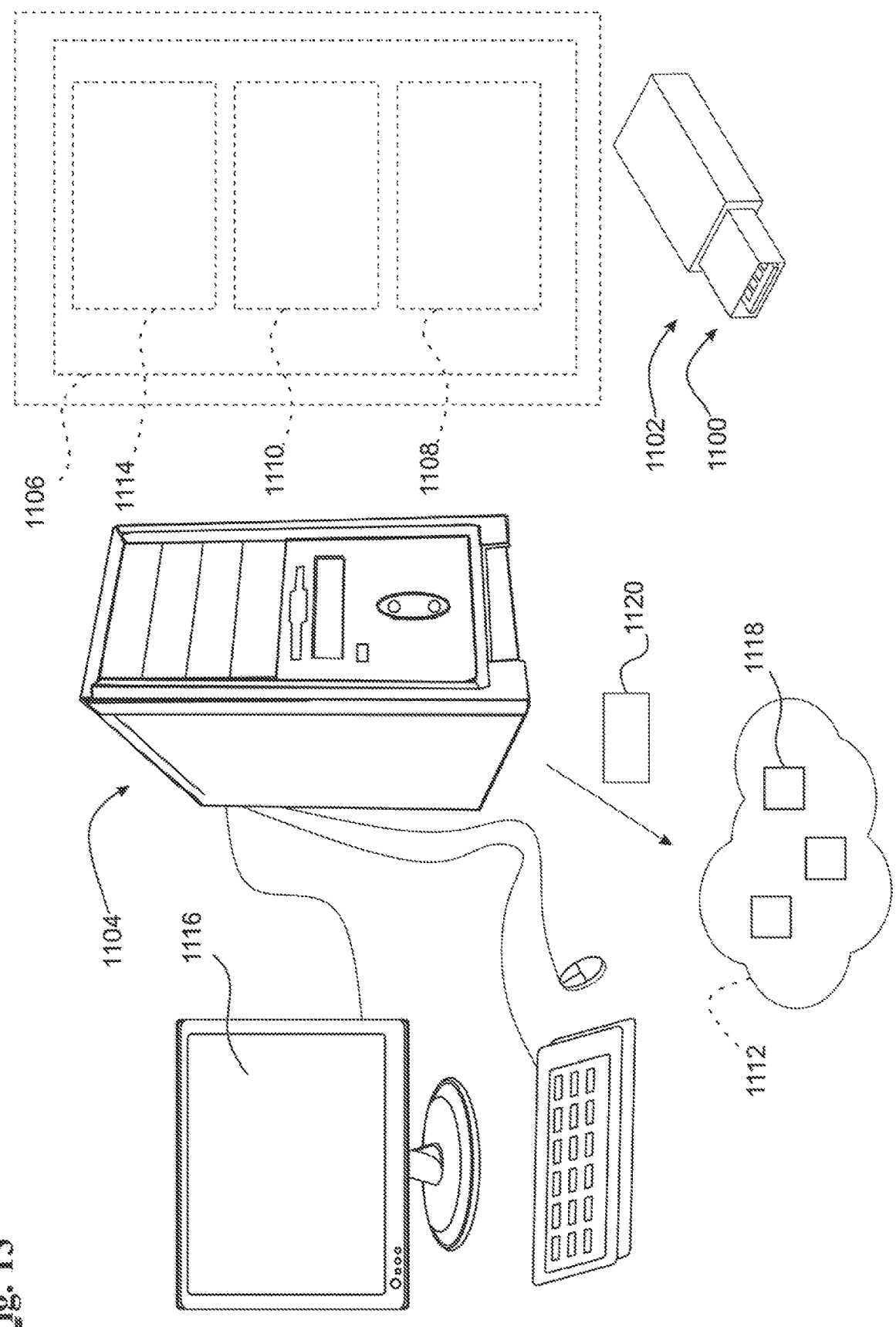
FIG. 13 provides a schematic illustration of a device according to another preferred embodiment of the present invention.

Referring to FIG. 13 the applicant has envisaged an electronic security device 1100 for a local computer 1104, the security device according to yet another preferred embodiment of the present invention.

More particularly, the electronic security device 1100 provides a removable media 1102 that is inserted into the local computer 1104. As before, the electronic device 1100 provides: a locked down system environment 1106 including a remote access connector 1108 and an authenticator facility 1110. After booting using the locked down system environment 1106, the remote access connector 1108 is able to initiate a remote connection request with a virtual computer service 1112.

The authenticator facility 1110 provides first authentication data 1120 to the remote access connector 1008 which provides the data to the virtual computer service 1112 for ensuring that the security device 1100 has permission to be allocated a virtual computer 1118 from the virtual computer service 1112. The system environment 1106 provides a display facility 1114 for generating a graphical user interface 1116 that is displayed on the local computer 1104 in association with the virtual computer 1118.

As before, the locked down system environment 1106 includes an operating system directed to preventing third party attacks. The operating system is directed towards providing no more than remote desktop services and authentication services. Notably, in other embodiments, the locked down system environment also provides storage services for the user. In this embodiment local printing services are provided as part of the remote desktop services. Other embodiments may exclude include local printing services.

In this embodiment the authenticator facility 1110 is able to provide the remote access connector 1108 with the first authentication data 1120. The virtual computer service 1112 use the first authentication data 1120 to authenticate the remote connection request initiated by the remote access connector 1108.

The first authentication data 1120 is unique to the local computer 1104 and comprises the CPU serial number. Although the security device 1100 could itself contain unique authentication data, the ability for the user to copy the operating system to other removable drives, may be useful. Notably once the virtual computer service 1112 has associated the local computer with the user account it is not possible to associate further local computers with the user account. Other embodiments may provide for a predetermined number (more than one) of different local computer associations.

By comprising a thumb drive the electronic security device 1100 comprises removable media that is able to be inserted to boot the local computer. In operation the local computer 1104 is set to boot from the thumb drive when inserted. If the thumb drive is not inserted, the local computer boots as normal from the hard disk.

In the case of booting from the electronic security device 1100, the remote connector 1108 sends the first authentication data 1120 comprising authentication data unique to the local computer 1104. The use of compact disc media to provide the electronic security device 1100 is also possible. The electronic security device could be provided as an SD card.

Other embodiments are of course possible, with the security device being otherwise connected for communication with the virtual computer.

In another embodiment there is provided a computer implemented method of providing virtual computers for use by users. At a first block, the method provides a virtual computer service and each user with a non-user specific security device. Each user security device provides a locked down operating environment including a remote access connector and an authentication facility.

At a second block, the method includes, receiving remote connection requests initiated by the users and sent by the remote access connector of each user's security device to the virtual computer service. The authenticator provides first authentication data to the remote access connector. The virtual computer service authenticates the first authentication data to ensure that the security device is an authenticated security device that has permission to be allocated a virtual computer.

In the method, the user security devices are used by inserting each user security device as a thumb drive into the user's computer. The remote access connector of the thumb drive initiates a remote connection request with the virtual computer service. The first authentication data provided by each authenticator facility includes authentication data that uniquely identifies the local computer (being the CPU serial number). The username/password/CPU# provide unique multifactor authentication.

In the method, only a single local computer can be associated with a user's account. This provides a security advantage. During the first use of the device on a local computer, the virtual computer service performs a configuration operation in which the first authentication data provides data unique to the local computer, sent by the remote connector. This data is used by the virtual computer service to associate the user's account with the local computer on a one to one basis.

If there are some collisions of unique numbers thought to be unique, but which are not, the identifiers may be effectively unique. In other words, a small number of non-unique collisions will not comprise the effective security of the system. In this embodiment a username and password are still used to provide multifactor authentication.

In another embodiment, an electronic security device is provided as a USB drive having a cut down Linux operating system which has only two primary functions, namely: (i) setting up an encrypted connection and passing the username/password to the virtual computer service's authentication service; and (ii) displaying a remote desktop of the virtual machine in the data centre. In some embodiments, the electronic security device doesn't have the capability of doing anything else.

In operation the USB drive is inserted into a USB of a PC. The PC's BIOS is set up to boot first from the USB drive. The machine is booted and runs client software stored on the USB drive.

When the user types in his or her username/password this, along with other unique identifiers in the local PC hardware, are transmitted to the virtual service's authentication service. In terms of a local pc unique identifier, there are unique identifiers in the hardware such as the unique serial number of the CPU which can be read by the operating system. Sometimes other silicon chips also have unique identifiers. By themselves or in combination with each other they offer a unique identifier.

The first time a new account is created it has no association with the remote PC. When the user logs in the unique serial number is communicated to the authentication service which then stores an association between the local computer and the user's account on the virtual computer service.

Upon first time use, the virtual computer service's authentication service accepts the user's current username/password when entered and starts a setup procedure where it associates the unique local computer authentication data with the user's account. It does this a single time so that the computer itself provides the basis of the unique data. This allows the thumb drive to be copied, by the user with the copies stored in a secure location. If lost or stolen the thumb drives can only be used with the local computer.

Thus, the first time a new account is created it has no association with the virtual computer service or the user's account. When the user logs in the unique serial number is communicated to the authentication service. It creates a PAM session (Pluggable Authentication Module) which has the security settings of the user that allows the user to access everything as if it is that user. It looks in the AFS file system as that user and attempts to locate a file/database entry for holding the PC's unique serial identification number. As noted if an association with a local computer doesn't exist then it creates a database entry/file saving the PC's serial number. The system then continues on to build and associate a new virtual machine for the user to work from.

As part of the process, the next occasion the user logs in, the virtual computer service's authentication service checks the PC's serial number with the number in the database/file. If it matches then the system continues on to provide the user with a virtual machine. If however it doesn't match then the process aborts.

It is to be appreciated that the procedure creates a useful security advantage.

- The user can only create their virtual machine if they have their unique username+password+PC serial number.
- Being stored on a separate USB device means it can stay with the user so they know it is valid and hasn't been changed.
- The user needs the software (which can also have a unique software identifier put in there such as a security certificate) as well as the original PC. It's impossible to replicate this unique combination ensuring that this user's account cannot be logged in by anybody else.

Another system envisaged by the applicant, provides a removable electronic security device having a GPS facility built into the device. The GPS facility is provided for the purpose of provide geolocation authentication data to the virtual computer service as authentication data regardless of the whether the local computer provides a geolocation facility. Other systems may use of unique number associated with the security device. Various combinations of unique authentication data are possible.

The manner of providing virtual computers is detailed in the following section entitled 'Virtual Computer Provision'. This section seeks to detail concepts of co-pending application PCT/AU2014/050050 filed by GOPC PTY LTD incorporated herein by reference. The system described therein and reproduced in FIGS. 1' to 27' are used by the virtual computer service described above to provide the virtual computers for large number of security device connections.

Virtualization Background

Virtualization is the process of taking computer resources comprising processing, memory and storage and providing an artificial environment for network, machine, input/output, application or storage functionality. In common use, virtualization generally refers to the operation of real world systems as a virtualized infrastructure which operates similarly to a physical infrastructure.

The expression 'virtual network' generally refers to the provision of physical network functionality by emulating the network in a software/virtualised environment. The expression 'virtual machine' is used in various contexts. In order to clarify the various contexts, the expression 'system virtual machine' generally refers to providing the functionality of a complete platform that supports the execution of a functioning operating system. In comparison, the expression 'process virtual machine' generally refers to providing the functionality of a platform that supports the execution of a single process, the process being an instance of an application. The expression 'virtual computer' as used herein generally refers to a system virtual machine as opposed to a process virtual machine.

The expression 'hypervisor' generally refers to a facility that provides for the provision of a number of virtual computers in a virtualization system. A hypervisor provides the system processor, memory and other resources to the operating system of the virtual computers. The operating system of each virtual computer provides common services for various applications.

Hypervisors are provided in a number of forms. 'Type 1 hypervisors' provide an interface immediately beneath one or more system virtual machines and immediately above the underlying hardware with no intervening operating system. Type 1 hypervisors communicate directly with the underlying physical server hardware. For this reason type 1 hypervisors are sometimes known as bare metal hypervisors.

'Type 2 hypervisors' provide an interface immediately beneath one or more system virtual computers and immediately above an underlying operating system.

In both cases the role of a hypervisor is to generally supervise and provide one or more virtual computers while maintaining separation policies therebetween.

In virtualization systems employing hypervisors, cloning is generally provided to allow copying of virtual computers. It is possible to provide a number of types of clone. For example a 'full clone' generally refers to an independent copy of a virtual computer, the clone being entirely separate from the original virtual computer. A 'linked clone' generally refers to sharing a virtual disk with the original virtual computer to use the same software installation. In general a linked clone cannot operate without access to the original virtual computer. This arises due to a delta type arrangement being stored rather than a unified copy.

Generally linked clones can be created relatively quickly. Whilst the speed of creation is improved, linked clones sometimes suffer from performance degradation.

In a virtualization system, a snapshot facility will generally provide a clone by making a snapshot to disk. In some systems such as VMware a snapshot is similar to a linked clone. Generally a user is able to repeatedly return to a snapshot after activation. A snapshot can be considered as a repeatable suspended state of a virtual computer.

A suspend store facility will generally preserve the state of a virtual computer by saving the state of the virtual computer to disk without repeatability. With some systems the suspend facility provides a suspension pause facility storing the virtual computer state in memory without repeatability. A suspension store facility generally frees up memory and virtual CPUs. A suspension pause facility generally keeps the virtual machine in a frozen state with memory allocation still being provided. In both cases the processing and I/O operations of the virtual machine is suspended in a substantial manner. Notably resuming a suspended state from a suspend store state or suspend pause state does not allow the user to return to the same state repeatedly. The virtual machine is resumed from a suspended state and continues operating from the same point at which the machine was suspended without being able to return to the suspended state.

Virtual Computer Provision PCT/AU2014/050050

Referring to FIG. 1 there is shown a computer system 10. The computer system 10 provides virtualization infrastructure as illustrated by box 12. The computer system 10 is provided using a public cloud network 14.

As part of the computer system, a number of servers 16 provide virtual computers 18. Referring to FIG. 2 each virtual computer includes an operating system 20 and applications 22. A type 1 hypervisor 24 is installed on server hardware 26.

FIG. 3 illustrates user data 28 forming part of each virtual computer 18. FIG. 4 illustrates decoupling of the user data 28 from the operating system 20. As shown there is provided user data virtualization 30. The user data virtualization 30 provides a layer allowing separation of the user data including files, configuration and settings from the operating system and applications. As would be apparent other embodiments may include application virtualization.

As shown in FIG. 5, the computer system 10 includes a provision manager 32. The provision manager 32 acts a broker providing users 34 with access to the virtual computers 18. Each user 34 has a client 36 that provides access to respective virtual computers 18. The virtual computers 18 are provided to the users 34 as virtual computers having virtual desktops.

Referring to FIG. 6, the computer system 10 includes a pool facility 31 as part of the virtualization infrastructure. The pool facility 38 stores a pool 40 of suspended virtual computers 42. The suspended virtual computers 42 are based on two virtual computer templates 44. The virtual computer templates 44 comprise golden images. In another embodiments the virtual computer templates comprise active or suspended virtual computers.

Referring to FIG. 7, the provision manager 32 is configured to provide a series 46 of virtual computers 48, over time, as a result of a series 50 of system logon requests 52 by user 54. From the viewpoint of the user group a similar statement can be made in connection with the users as a whole.

In the computer system 10, a single user account is associated no more than one virtual computer 18 at any one time. Other arrangements are of course possible.

The passing of time is represented by arrows 56. A first system logon request 58 by the user 54 results in the provision of a virtual computer 60. A subsequent system logon request 62 results in the provision of a virtual computer 64. A subsequent system logon request 66 results in the provision of a virtual machine 68. A final system logon request 70 results in the provision of a virtual computer 72. In the embodiment the provision manger 32 ensures that each of the system logon requests 52 is separated by a system logoff requests 74. Each system logoff request 74 terminates the current virtual computer associated with the user.

The manner in which system logon requests 52 are initiated is demonstrated in FIGS. 8 and 9. In order to issue a system logon request, a user 54 uses an interface 76 provided a browser 78. The interface 76 provides a dashboard 80 providing a system logon request facility 82 in the form of a button. In operation the user 54 activates the system logon request facility 82 and is provided with a loading indicator 84. The loading indicator 84 is illustrated in FIG. 10.

Figure 11:
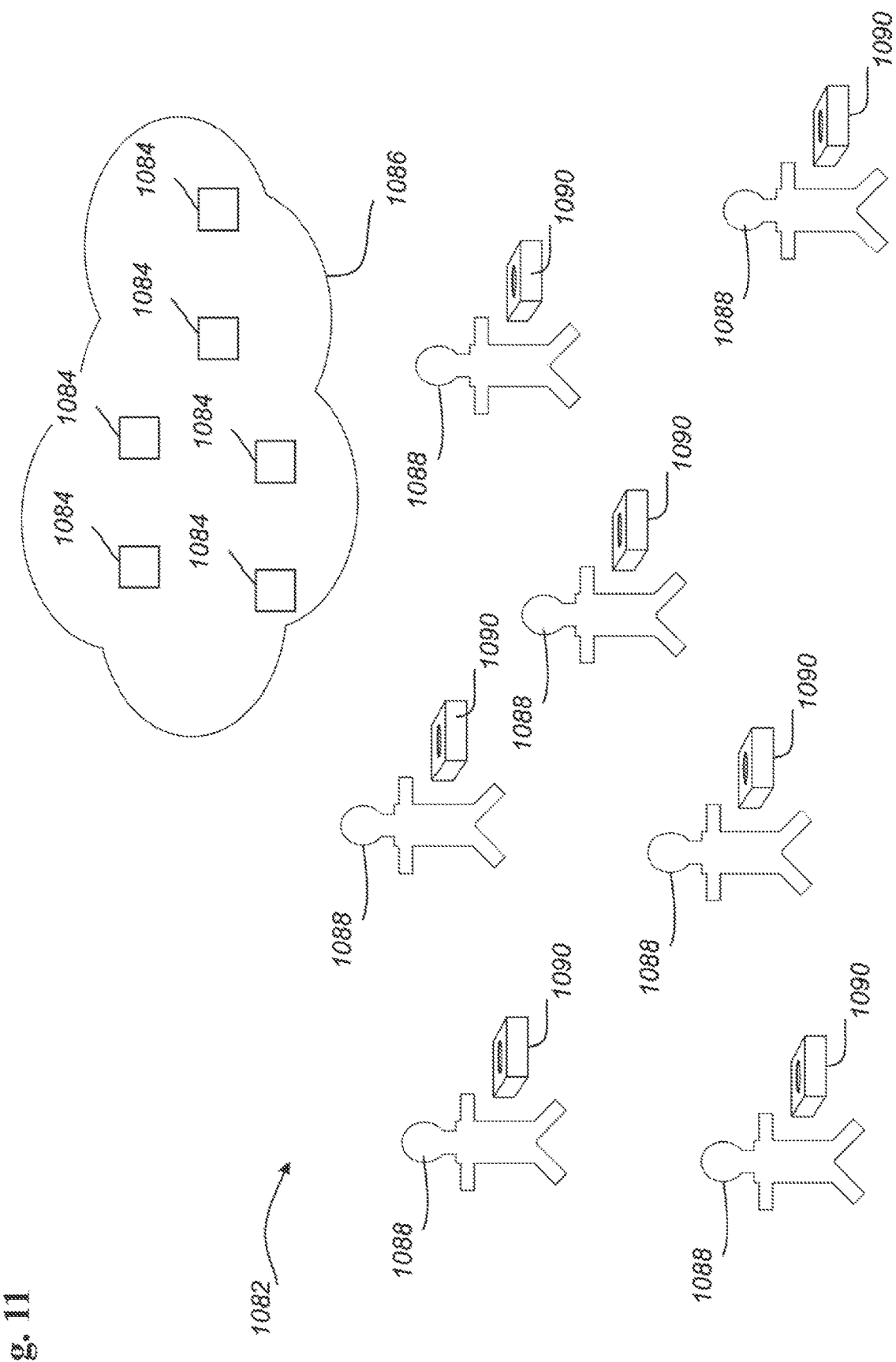
FIG. 11 provides schematic illustration of a computer system according to another preferred embodiment of the present invention.

Referring to FIG. 11, the user 54 is subsequently provided with a number of connection options 86. A first one of the options comprises using a remote desktop protocol client on the user machine to provide a desktop interface. A second one of the options comprises using the browser 80 to provide a desktop interface.

Selecting the second one of the options provides a web client 88 illustrated in FIG. 12. The web client 88 provides a virtual desktop 90 having a menu facility 92 and a desktop 94 upon shortcuts and other items can be placed. The virtual desktop 90 includes a task bar 96 showing visible applications. A run facility 98 is provided for command type execution. Applications are run on an operating system 20 corresponding with a single virtual computer 18.

Notably in other embodiments the system logon request facility 82 forms part of a dashboard authentication such that logging on the dashboard 80 automatically provides a system logon request 52 seeking access to a virtual computer.

Returning to FIG. 7 the provision manager 32 includes an update facility 100, a resume facility 102 and a customization facility 104. The update facility 100 is able to update each virtual computer template 44. The resume facility 102 is able to resume a virtual computer from the pool 40 of suspended virtual computers 42 provided by the pool facility 38. The customization facility is able to customize the resumed virtual computer for the user 54 to provide an active virtual computer.

As will be described the computer system 10 is configured for ensuring that a series of system logon requests by a user results in the user being provided with a series of virtual computers that reflect applied updates. More particularly as a result of each logon request by a user, a new virtual computer for the user is provided ('new' in the sense of being provided as part of a cloning process as described below).

The logon requests and virtual computers are provided on a one to one basis. That is, each logon request results in the provision of a single new virtual computer.

An initial state of the computer system 10 is illustrated in FIG. 13. After a system logon request 106 is initiated, the provision manager 32 uses the resume facility 102 to resume a suspended virtual computer 108 from the pool 40 of the suspended virtual computers 42. The customization facility 104 is then used to customize the resumed virtual computer 110. The customization associates user data 112 with the virtual computer 110 and applies security settings. After customization the provision manager 32 provides an active virtual computer 114 for access by the user. The active virtual computer 114 is then accessible by one of several known access techniques.

As part of the nature of the resume process, the resume facility 102 removes the suspended virtual computer 108 from the pool 40. The resume facility 102 employs a non-repeatable resume associated with the suspended virtual computer being in a non-repeatable suspended state.

The update facility 10Q regularly updates each virtual computer template 44 according to notifications from an update notification facility.

After resuming the suspended computer 42, a creation facility 116 schedules: (i) the cloning of a virtual template 44 to provide a virtual machine; and (ii) and the subsequent suspension of the virtual machine to provide a replacement suspended virtual computer 42. Initially there is provided a build instruction list.

The provision manger 32 advantageously includes a termination facility 118 for terminating virtual computers 18 based on system logoff requests by users to ensure that the virtual computers 18 provided to the users are regularly updated. After a user logs off from the computer system 10 the associated virtual computer is scheduled for termination.

After the user 54 has been provided with a virtual computer 114, the user is provided with access to a system logoff request facility 120 illustrated in FIG. 14. With the use of the logoff request facility 120, the user is able to issue a system logoff request 122 as shown in FIG. 15.

Advantageously, in the computer system 10, the provision manger 32 is able is ensure that the virtual computers 18 provided to the users 34 are regularly updated. This arises due to the system regularly updating the virtual computer templates 44 from which the suspended virtual computers 42 in the pool 40 are based. The computer system 10 employs Linux Kernel-based Virtual Machine (KVM) technology. Other technologies such as VMware, and Microsoft services may be used in other embodiments.

The provision manager 32 includes a range facility 124 that monitors the turnover of suspended virtual computers 42 in the pool 40. The range facility 124 access both historical and actual login/virtual machine information.

The provision manager 32 ensures that the number of suspended virtual computers in the pool 40 is with a range recommended by the range facility 124. The provision manager 32 ensures that the suspended virtual computers 42 have a desirable turnover rate by limiting the number of suspended virtual computers in the pool 40 in view of anticipated user demand. In this manner the churn of virtual computers through system logon requests and the regular updating of the templates 44 ensures that the suspended virtual computers 42 reflect updates in a timely manner.

In order to apply critical updates to active virtual computers, the provision manager 32 includes an active machine updater 126. The active machine updater 126 is configured to send update requests to the virtual computers 18. The virtual computers 18 respond to notifications from the active machine updater 126 to install updates. In this embodiment the active machine updater is provided by a technology known as 'Puppet' for Linux.

The termination facility 118 is configured to remove old suspended virtual computers in the pool 40 to ensure that the suspended virtual computer 42 in the pool desirably reflect updates and are suitable to be provided to the users 34.

In the past the process of cloning a virtual template 44 to provide an active virtual computer for a user would typically comprise: (i) determining whether a user has suffice credit; (ii) performing a cloning operation on a virtual template; (iii) deploying services on the virtual machine; (iv) installing applications; and (iv) applying security policies to allow access by the user. Performing items (ii), (iii) and (iv) provide a significant delay.

In the present embodiment the creation facility 116 is configured for creating the suspended virtual computers 42 in the pool 40 with each suspended virtual computer 42 having services suspended in a substantially deployed state. This advantageously serves to reduce the time visible to the user when requesting a virtual computer through the dashboard 80.

In particular, by having the remote desktop services of each suspended virtual computer 42 suspended in a substantially deployed state, the time to provide access to the virtual computer is advantageously reduced. In the case of each suspended computer 42 remote desktop services are deployed in the sense that the services are started and can be connected to a user from the network and provide functionality to that user. With the embodiment a substantial improvement in the time between the logon request and the provision of a virtual computer can be provided. Rdp, Xrdp, Xserver and other remote desktop technologies for performing VDI as remote desktop infrastructure are known. Manufactures of VDI systems include VMWare, Citrix and HP.

As discussed the creation facility 116 is provided for providing the suspended virtual computers 42 in the pool 40 by cloning the virtual computer templates 44. An installation facility 128 is provided for installing applications according to the different user classes. A suspension facility 130 is provided for suspending virtual computers as part of the creation process to provide the suspended virtual computers 42. The installation facility 128 is provided for installing applications after cloning a virtual template 44. The provision manager 32 includes an uninstall facility 132 for removing applications after cloning a virtual template 44. Generally uninstalling applications has a greater processing overhead than removing applications. Uninstalling applications can be advantageous in circumstances in which a requirement for uninstallation occurs relatively infrequently.

In the computer system 10, the user classes include accounting classes, secretarial classes and manager classes. The classes are associated with a particular application suites. Only a few user classes do not require the use of LibreOffice. In this embodiment the uninstall facility is provided to uninstall LibreOffice for these users. Advantageously this means that a reduced number of virtual templates have to be maintained by the system.

The active machine updater 126 provides a classification update facility for instructing virtual computers 18 to install or remove applications. Such an instance may occur when there is an alteration in the classification of a user.

The computer system 10 is considered to advantageously maintain a pool of virtual computers in a suspended state with substantially deployed services wherein the number of suspended virtual computers, and updating of templates results in users regularly being provided with virtual computers that incorporate recent updates.

Furthermore, by providing a pool of suspended virtual computers, circumstances involving high demand for virtual computers can be readily accommodated by maintaining a relatively large number of suspended virtual computers in the pool. In this manner the system can be configured to accommodate high demand such as might occur in a group computer laboratory session at a university. At other times a reduced number of suspended computers can be provided in the pool. Native deduplication of in the virtualized computer system is considered to allow for both relatively small and relatively large numbers of suspended virtual computers to be stored in the pool. The use of native deduplication for 'storm' type events is considered to be advantageous.

In another embodiment illustrated in FIG. 16, there is provided a computer system 134. The computer system 134 includes a template provision facility 136 for providing virtual computer templates 138 and an update facility 140 for determining whether revised virtual computer templates are required. A cache facility 142 is provided for caching suspended virtual computers 144 based on the virtual computer templates 138. A resume facility 146 is provided for resuming the cached suspended virtual computers 144 to provide active virtual computers in response to system logon requests by users. The cache facility 142 is configured to cache each suspended virtual computer 144 with services suspended in a substantially deployed state.

Referring to FIG. 17 there is shown a method 148. The method 148 advantageously provisions virtual computers 150 in response to system logon requests 152. A number of processes occur in the method 148.

At block 154 the method 148 includes regularly updating a number of virtual computer templates 156. At block 158 the method 148 includes receiving a system logon request 160. In response to the system logon request 160, the method 148 performs an account validation check at block 162. If the account is valid the method 148, at block 164, performs a check to determine whether an active virtual computer is currently associated with the user that issued the system logon request. If there is an existing virtual computer then a logoff request is issued at block 166 to shut-down the existing virtual computer. Once a shutdown request has been issued, the method 144 provides a virtual computer 150 as detailed at a block 168 (See FIG. 18).

At block 170, the method 148 includes checking the user account type to determine the number of suspended virtual computers 172 based on suitable templates 156 in a pool 174. In times of unanticipated high demand the number of suspended virtual computers 172 in the pool 174 may be depleted in which case the method waits a desirable amount of time at block 176 in anticipation of further suspended virtual computers being added to the pool 174.

At block 178 the method 146 commences a resume routine that non-repeatably resumes a suspended computer 180 to provide a virtual computer 182. The act of resuming the suspended computer 180 takes cpu, memory and storage resources from the underlying hypervisor. At block 184 specific resources, security profiles and other configuration settings are customized.

The customization includes the provision of a virtualised user data layer 186. At block 188 modifications are made to an application layer 190 which in the present embodiment is not virtualized. Various customizations are illustrated in block 188. A virtual computer 192 is then made available to the user at block 194. In this embodiment, after resuming a virtual computer it continues to reside on the existing physical machine. Of course the virtual computer could be migrated across the network to another physical machine.

Referring to FIG. 19, by applying the method 148 on each system logon by a user 196, the method 148 ensures that that a series of the system logon requests 198 results in the user 196 being provided with a series of virtual computers 200 than reflect applied updates. The method 148 applies these updates at block 154 and the updated virtual computer 200 are accordingly provided to the user 196 at each system logon.

Each virtual computer 200 in the progression of time 202 is provided by resuming a virtual computer from the pool 174 of suspended virtual computers 172, where the suspended virtual computers 172 are based on the virtual computer templates 156. At block 154 the method 148 regularly updates the virtual computer template 156. At block 184 the method 148 customizes the virtual computer for the user after being resumed from the pool 174. The process is repeated and proactively provides updated active virtual computers to each user of the system upon logon requests. The method 146 is applied across all users.

The method 148 includes terminating virtual computers 150 based on system logoff requests 204 by users. At block 206 shown in FIG. 20, the method 148 includes receiving logoff requests and determining user activity. In the case where user activity does not meet a threshold in a wait period 208, the machine is terminated at block 210. The user is able to manually issue a logoff request 204 which is received at block 212. The virtual computer is terminated at block 210. The method 148 ensures that the virtual computers provided to the users are regularly updated by terminating virtual computers based on system logoff requests by users.

Referring to FIG. 21, at block 214 the method 146 includes providing suspended virtual computers 216 in the pool 174. In this embodiment replenishment is initiated once a virtual computer has been made available to a user. Other embodiments advantageously have a routine that anticipates expected demand. At block 218 the method 146 determines whether to add a suspended virtual computer to the pool 174.

At block 220 a virtual template 156 is selected to replace the earlier resumed suspended virtual computer. At block 222 the template is cloned. At block 224 the template is checked to determine whether updates are required. If updates are required, the updates are applied at block 226. The updated virtual machine is cloned as a template at block 228 and the old template is removed at block 230. Some configuration may occur at block 232. At block 234 the virtual computer is suspended in the pool 174.

When applying the configuration at block 232 the method 148 suspends the services of the cloned template in a substantially deployed state. In the present embodiment the services that are suspended in a substantially deployed state include remote desktop services including XRDP to allow connections from RDP clients and Puppet (to apply ongoing configuration changes). The system services are running and are available for interaction by users. Replenishment occurs each time after an active virtual computer has been provided to a user. In this manner the pool 174 is refreshed.

The method 146 ensures that users are provided with regularly updated virtual computers by effectively maintaining suspended virtual computers in the pool 174 based on one or more regularly updated virtual computer templates 156.

The method 146 effectively maintains suspended virtual computers in the pool 174 by providing suspended virtual computers in the pool and ensuring that the suspended virtual computers have a desirable turnover rate. This is performed at block 236 illustrated in FIG. 22. When it is determined that the suspended computers do not have a desirable turnover rate that is providing regular updates through churn, old suspended computers are removed at block 238, and new suspended computers are added at block 214 as described.

At block 220 the virtual template to clone is selected based on the last suspended virtual computer that was resumed from the pool 174. In other embodiments the routine at block 236 adds and removes suspended computers based on anticipated demand by users.

At block 232 the customization of the active virtual computer 182 includes installing applications according to user class. In this manner suspended virtual computers can be provided in additional class types to the virtual computer templates 156. This is considered to be advantageous as it means that required customization at block 184 for different user classes can be limited. Examples of user class types includes accounting classes, secretarial classes, management classes and so forth.

In order to provide flexibility at block 184, the method 146 includes either installing or uninstalling applications according to a desired user class. Installing applications is generally is less intensive that uninstalling applications. Nonetheless in some situations a reduced number of templates and suspended machines types will be advantageous. In one embodiment word processing and spreadsheet applications are installed on a virtual template 156. During customization at block 184 the word processing and spreadsheet applications are uninstalled for a particular user class to allow for a reduced number of virtual templates and suspended virtual computer types.

The method 146 creates suspended virtual computers in the pool 174 with each suspended virtual computer having services suspended in a substantially deployed state. The method 146 uses this strategy to ensure that application installation or uninstallation at block 184 is limited to 30 seconds or less in time duration. The applicant considers that 20 seconds between requesting access to a virtual computer, with a logon request, provides an acceptable wait time by a user. Of course smaller wait times are desirable.

In the present embodiment the suspended virtual computers 172 are suspended in memory in a non-repeatable suspended state. The native de-duplication provided by virtual machine software that manages suspended virtual machines operates to conserve random memory space (KVM). In addition by being suspended the processing required to maintain the suspended virtual machines is nil or at least relatively insignificant. Suspending in random access memory is the preferred approach. The persistence of the guest's memory is dependent on the virtual host maintaining functionality, i.e. if the power is pulled out of the virtual host a 'suspend' guest will lose its memory state.

Solid state storage may provide another viable option, depending on the speed of the solid state store. As such, in some embodiments, the suspended virtual computers may be suspended on disk in a non-repeatable suspended state. Various other storage methods may be possible including being suspended on disk in a repeatable suspended state; or being suspended in memory in a repeatable suspended state.

In another embodiment, a method creates virtual computer templates and determines whether revised virtual computer templates are required with new updates. Suspended virtual computers are created based on the virtual computer templates and are cached for subsequent resuming to provide active virtual computers in response to system logon requests.

Various methods and systems of provisioning virtual computers are provided by preferred embodiments. By separating the user data it is possible to readily allow a user to deploy a different operating system or desktop environment with the same personal settings and applications. For example in some embodiments there is provided a desktop switching facility. The desktop switching facility allows the user to switch between a Macintosh type desktop environment and a Windows type desktop environment. Examples include switching between LDXE and XFCE. An operating switching facility could for example allow switching between UBUNTU and REDHAT.

Various embodiments advantageously buffer a lot of prepared VM's in advance to speed up deploying new VM's and address boot storm problems. Updates are provided by refreshing and upgrading the technology inside a virtual machine when a user logs in. The de-duplicating environment serves to reduce the physical memory space.

Referring to FIG. 23 there is shown a system 243 according to a further preferred embodiment. In the system the virtual host server the software used to manage virtual desktops is libvirt and KVM. The description of the system is specific to KVM interfaced through libvirt. As would be apparent, various virtualization environments may be provided in other embodiments The system 243 operates using KVM (Kernel-based Virtual Machine). As detailed on Wikipedia 'a wide variety of guest operating systems work with KVM, including many flavours of Linux, BSD, Solaris, Windows, Haiku, ReactOS, Plan 9, and AROS Research Operating System. In addition Android 2.2, GNU/Hurd[8] (Debian K16), Minix 3.1.2a, Solaris 10 U3, Darwin 8.0.1 and more Os's and some newer versions of these with limitations are known to work. A modified version of QEMU can use KVM to run Mac OS X'.

KVM provides a virtualisation infrastructure for the Linux kernel. KVM supports (interfaced through libvirt) suspending and resuming virtual machines as described in the earlier embodiments. As detailed on Wikipedia, libvirt is an open source API, daemon and management tool for managing platform virtualization. It can be used to manage Linux KVM, Xen, VMware ESX, QEMU and other virtualization technologies. These APIs are widely used in the orchestration layer of hypervisors in the development of a cloud-based solution.' Libvirt is a high level open source API, daemon and management tool for managing platform virtualization. Libvirt provides a virtualisation infrastructure interface to create, start, suspend, resume and destroy virtual machines.

In the system 243 golden images are updated. A golden image is a template for a virtual machine, virtual desktop, virtual server or hard disk image. A golden image is also sometimes referred to as a clone image, master image or base image. To create a golden image, a script is executed to first set up the computing environment exactly the way it is needed and then saves the disk image as a pattern for making more copies. A golden image is an unchanging disk image of an operating system install without any information being stored in RAM. This is due to the golden image being in a pre-boot state In the embodiment, the golden image has defined administrator user accounts that are specific to the golden image. There is no regular user accounts or regular user data associated with a golden image. Building golden images in done by executing the script "buildvm.pl<type>", where the value of "<type>" specifies additional customisations that are done to the gold image produced, namely: specifying the type 'lxde' installs the additional software packages 'lxde-common', 'lxde-icon-theme' and 'lxrandr', and setting the default desktop environment to LXDE.

The type of install provides features such as the GUI layout and visual environment. The system currently produces two gold image types: LXDE and XFCE. There are no limitations to the type of golden images that can be created.

In the system, the golden images can be listed with the following command:

```
(--------------------------------------------------------
root@vhost01:/home/rainmaker/rainmaker-vmscripts# rbd -p
gopc-rain-images ls | grep -v desktop.gopc.net
gnome-20130611; gnome-20130719; lxde-20130718; lxde-20130719;
lxde-20130806; lxde-20130822; lxde-20130827; lxde-20130828;
lxde-20130829; lxde-20130902; lxde-20130929; mate-20130719;
trinity-20130719; unity-20130719; xfce-20130719; xfce-20130806;
xfce-20130822; xfce-20130828; xfce-20130902; xfce-20130929;
--------------------------------------------------)
```

The script 'buildvm.pl' calls the Ubuntu script 'vmbuilder' to create a VM in KVM and start a basic installation of the Ubuntu operating system. When this basic Ubuntu installation is completed, the command 'virsh start' is issued and the VM is powered on and a script 'firstboot.sh' is executed from within the newly created VM to do the following customisations:

1. Write system configuration files, such as /etc/ldap.conf for LDAP system wide LDAP authentication, /etc/krb5.conf for Kerberos authentication, and /etc/puppet/puppet.conf to allow on the fly application installation.
2. Pre-installing all the dependencies for all the applications available in the GoPC AppStore. This is achieved by running a script to iterate through the list of applications in the AppStore and create a list of software dependencies where the dependency is associated with a library required for the execution of the program as opposed to a separate application.

These application dependencies include libqt4-xml, libtime-date-perl and python-cairo. By pre-installing the application dependencies the installation time of applications via the AppStore is greatly reduced as there are less packages to download and install. A screenshot of an application store is shown in FIG. 24. A script to achieve the update is detailed below.

```
(--------------------------------------------------------
#!/usr/bin/perl
use strict;
use warnings;
use Frontier::Client qw//;
use Data::Dumper qw/Dumper/;
main(@ARGV);
sub main {
    my %deps = ( );
    my $server = Frontier::Client->new('url' =>
'http://10.0.10.41:8081/RPC2', use_objects => 0);
    my $apps = $server->call('provisioning.applicationlist');
    my @packages = ( );
    for my $appname (keys %$apps) {
        for my $package (@{$apps->{$appname}}) {
            push @packages, $package->{name};
        }
    }
    my $packagelist = join ' ', @packages;
    open my $fh, '-|', "apt-rdepends $packagelist" or die "Could not get
dependencies: $!\n";
    while (my $line = <$fh>) {
        chomp $line;
        next unless $line =~ /(?:Depends|Recommends): (\S+)/;
        my $dep = $1;
        next unless $dep =~ /^lib/ or $dep =~ /^python/;
        next if $dep =~ /^libreoffice/;
        next if $dep =~ /^libtag1/;
        next if $dep =~ / ^lib(av|sw|postproc)/ && $dep =~ /extra/;
        $deps{$dep} = 1;
    }
}
```

-continued
```
    close $fh;
    my @deps = grep {is_real_package($_)} keys %deps;
    print 'DEBIAN_FRONTEND=noninteractive apt-get -y --no-install-recommends install ',join' ', @deps, "\n";
    exit 0;
}
sub is_real_package {
    my ($package) = @_;
    my $res = 0;
    open my $fh, '-|', "apt-cache show $package" or die "Could not get info for '$package': $!";
    while (my $line = <$fh>) {
        $res = 1;
        last;
    }
    close $fh;
    return $res;
}
-----------------------------------------------------)
```

As discussed above, customisations for the exact golden image type is performed. Once the 'firstboot.sh' script has finished executing, the VM created is powered down, terminating all operating system services and removing any running state in memory, with the command 'virsh destroy'. The following commands are executed:

```
(-----------------------------------------------------
    rbd snap create "gopc-rain-images/<name>@current";
    rbd snap protect "gopc-rain-images/<name>@current";
-----------------------------------------------------)
```

This makes the golden image disk image available on the storage back-end for cloning. The final step in the process is marking the golden image as 'active' in the provisioning database.

When updated versions of operating system or application software is required a new golden image is built and made active in the provisioning database. Application dependencies are based on the output of the above script and are downloaded from Ubuntu's software repository.

Suspend and resume refers to the process of taking a running virtual desktop and temporarily saving its memory state. At a later time, it is possible to resume the guest to its original running state, continuing execution where it left off. Suspend does not save a repeatably persistent image of the guest's memory.

A VM that is placed into a suspend state uses the same amount of RAM on the virtual host as a running VM, but consumes virtually no CPU time. A large number of suspended VMs can exist on the virtual host without impacting CPU resources.

At a high level the process steps of allocating a virtual desktop to a user are conventionally as follows:
1. User requests a virtual desktop
2. Making a clone(copy) of a golden image
3. Powering the clone on
4. Booting the operating system
5. Starting software services (such as xrdp, sshd and puppet) inside the clone
6. Waiting for the above software services to finish their start up sequences and be available for service (ie xrdp is listening on port 3389 for incoming RDP client connections)
7. Send a message to the user stating the virtual desktop is ready to use In the above list the steps from 4 to 6 can take upwards of 120 seconds to complete. For user driven interactive websites 120 seconds is considered to be too long to wait. Advantageous with the use of libvirt/KVM suspension the present embodiment is able to break this process into two independent separate processes to save the effective wait time for a user.

The first process in the embodiment is as follows:
1. Making a clone(copy) of a golden image
2. Powering the clone on
3. Booting the operating system
4. Starting software services (such as xrdp, sshd and puppet) inside the clone
5. Waiting for the above software services to finish their start up sequences and be available for service ie xrdp is listening on port 3389 for incoming RDP client connections (We test that xrdp is running by the successful TCP connection to port 3389).
6. Suspending the virtual desktop.

In one system, the services started are listed below:

```
(-----------------------------------------------------
avahi-daemon.conf; console.conf; console-setup.conf; container-detect.conf;
control-alt-delete.conf; cron.conf; cups.conf; dbus.conf; dmesg.conf;
failsafe.conf; flush-early-job-log.conf; hostname.conf; hwclock.conf; ;
hwclock-save.conf; lightdm.conf modemmanager.conf; module-init-tools.conf; mountall.conf; mountall-net.conf; mountall-reboot.conf;
mountall-shell.conf; mounted-debugfs.conf; mounted-dev.conf; mounted-proc.conf; mounted-run.conf; mounted-tmp.conf; mounted-var.conf;
networking.conf; network-interface.conf; network-interface-container.conf;
network-interface-security.conf; network-manager.conf; passwd.conf;
plymouth.conf; plymouth-log.conf; plymouth-ready.conf; plymouth-splash.conf; plymouth-stop.conf; plymouth-upstart-bridge.conf;
procps.conf; rc.conf; rcS.conf; rc-sysinit.conf; resolvconf.conf;
rsyslog.conf; setvtrgb.conf; shutdown.conf; ssh.conf; tty1.conf; tty2.conf;
tty3.conf; tty4.conf; tty5.conf; tty6.conf; udev.conf; udev-fallback-graphics.conf; udev-finish.conf; udevmonitor.conf; udevtrigger.conf;
upstart-socket-bridge.conf; upstart-udev-bridge.conf; ureadahead.conf;
ureadahead-other.conf; wait-for-state.conf; S20libnss-ldap; S20nscd;
S20saslauthd; S20xrdp; S21puppet; S25openafs-client; S50pulseaudio;
S70pppd-dns; S75sudo; S99grub-common; S99nxsensor; S99nxserver;
S99ondemand; S99rc.local
-----------------------------------------------------)
```

Through our testing we have found one of the last services to complete it's start-up sequence is the xrdp service.

The second process is as follows:
1. User requests a virtual desktop
2. Resuming the suspended virtual desktop
3. Send a message to the user stating the virtual desktop is ready to use The first process takes approximately 120 seconds to complete, and can be done independently of any user interaction. The second process takes less than 1 second, which means that the time taken for a user requesting a virtual desktop and the virtual desktop is minimal.

FIG. 25 provides a screen shot providing a time breakdown of the first process (building a clone of a golden image and putting it in a suspend state) under high virtual host system load. As shown the substantial time processes comprise cloning, waiting for XRDP and sleeping.

FIG. 26 provides a screenshot providing a time breakdown of the second process (setting a virtual desktop to resume state) under high virtual host system load. Because the cloning process is decoupled from the user interaction, system load on the virtual host does not substantially impact the interactive website processes of a user being allocated a virtual desktop.

In computing, data de duplication is a specialised data compression technique for eliminating duplicate copies of repeating data. De-duplication is applied to both contents in RAM and contents on disk storage. In the system de-duplication is provided by KVM for RAM and Ceph for network storage. Owing to the fact all virtual desktops of the same type are cloned from the same relatively small set of golden images the set of virtual desktops compress very well, giving significant savings in terms of required RAM and disk usage. This is considered to be advantageous.

Cloned images are built and put into a suspend mode (as detailed above), and then placed in a FIFO (First In, First Out) queue (referred to as the Virtual Desktop Pool) for later allocation and use by a user.

The code listed below regularly polls for the size of the suspended virtual desktop allocation pool, and triggers the construction of a clone from a gold image when the number of suspended virtual desktops drops below the desired suspended pool size.

```perl
(--------------------------------------------------------
#!/usr/bin/perl
use strict;
use warnings;
use Frontier::Client qw//;
use Data::Dumper qw/Dumper/;
use POSIX qw/:sys_wait_h/;
my $CHILD_LIMIT = 7;
my %children = ( );
sub REAPER {
    while ((my $child = waitpid(-1, WNOHANG)) > 0) {
        delete $children{$child };
    }
    $SIG{CHLD} = \&REAPER;
}
main(@ARGV);
sub main {
    my $provisioning = Frontier::Client->new('url' => 'http://provisioning:8081/RPC2',
use_objects => 0);
    my $desired = {
        lxde => 25,
        xfce => 15,
    };
    $SIG{CHLD} = \&REAPER;
    while (1) {
        eval {
            for my $basename (keys %$desired) {
                my $pools = $provisioning->call('provisioning.machinepoolsize');
                my $sparecount = $pools->{$basename} || 0;
                my $poolsize =$desired->{$basename} || 3;
                if ($sparecount < $poolsize && scalar keys %children < $CHILD_LIMIT) {
                    my $pid = fork( );
                    if ($pid) {
                        $children{$pid} = 1;
                        print "Child count is ", scalar keys %children, "\n";
                        sleep 1;
                    } elsif (defined $pid) {
                        eval {
                            my $orchestration = Frontier::Client->new('url' =>
'http://orchestration:8000/RPC2', use_objects => 0);
                            print "Pool for $basename is $sparecount, building machine\n";
                            print Dumper($orchestration->call('CreatePoolVM', $basename, 1));
                        };
                        if ($@) {
                            print "$@\n";
                        }
                        exit 0;
                    } else {
                        print "Fork error: $!\n";
                    }
                } else {
                    sleep 1;
                }
            }
            sleep 1;
        };
        if ($@) {
            print "Error occured: $@\n";
            sleep 15;
        }
    }
}
--------------------------------------------------------)
```

Virtual desktops have a life-cycle of the following states:
1. Building—when a virtual desktop in the process of being cloned from a gold image, powering on and starting service up until the virtual desktop is put into a suspend state.
2. Available—when a virtual desktop has been put into a suspend state and is placed into the Virtual Desktop Pool ready for user allocation.

3. In-Use—when a virtual desktop has been allocated to a user, has been resumed from it's suspended state and is currently in use.

4. Finished—when a virtual desktop is no longer in by a user and has been powered off by the system and the associated disk image has been removed.

When a user requests a virtual desktop via the GoPC website a suspended virtual desktop is chosen from the Virtual Desktop Pool (the oldest virtual desktop is always chosen here) and resumed with the command 'virsh resume'. Once resumed DNS records are updated to point <user's username>.desktop.gopc.net to the virtual desktop's IP address and the user's applications are installed and the user's configurations are applied.

All user created data and user application configuration and customisation is stored on networked storage (networked home directories) and not on the virtual desktops themselves. The networked home directories for users allows for the persistence of user data and configurations between different instances of virtual desktops.

User data and presented to the virtual desktop systems via the AFS distributed networked file system. User home directories are mounts from the following location: /afs/gopc.net/userskuser's unique UID number>.

Each time a new golden image is built the latest versions of operating system software, application software and application software dependencies from Ubuntu's software repository. To minimise any potential incompatibilities between new versions of software with user data and user configurations from older versions of software gold images are built on Ubuntu's LTS (Long Term Support) editions. Ubuntu LTS editions are created with a release life time of 5 years, and software compatibility between updated versions of software are tested by Ubuntu's internal QA teams to prevent this type of software breakages.

Once a virtual desktop has been determined to no longer be in use (either because of user interaction or due to lack of interactive user connections via RDP or NX) it is terminated. Termination involves powering the virtual desktop off (via the command 'virsh destroy'), removing the machine definition from libvirt/KVM (via the command 'virsh undefine') and removing the cloned disk image (via the command 'rbd rm'). Once a virtual desktop has been terminated it no longer uses any resources on the virtual host. Code to terminate virtual desktops is listed below:

```
(------------------------------------------------------
def clean_sessions(cleanup):
    server = xmlrpclib.ServerProxy('http://orchestration:8000')
    timeouts = { }
    for userid,idletime in db.Timeoutobjects.all( ).values_list('userid', 'idletime'):
        timeouts[userid] = idletime
    now = datetime.datetime.today( )
    for session in db.Session.objects.filter(stoptime = None, type=0):
        machine = session.machine
        usertype = timeouts.get(session.userid, 0)
        idletime = idletimes[usertype]
        if (session.lastseen + datetime.timedelta(minutes=idletime)) < now: '
            if cleanup:
                print server.DeleteDesktopIdle(session.userid)
        # free users, disconnect after 1 hours active time
        elif usertype == 0 or usertype == 1:
            if (session.starttime + datetime.timedelta(minutes=60)) < now:
                if cleanup:
                    print server.DeleteDesktopIdle(session.userid)
------------------------------------------------------)
```

Referring to FIG. 27 there is shown a schematic diagram of a computer system 240 that is configured to provide preferred arrangements of systems and methods described herein. The computer system 240 is provided as a distributed computer environment containing a number of individual computer systems 242 (computers/computing devices) that cooperate to provide the preferred arrangements. In other embodiments the computer system 240 is provided as a single computing device.

As shown, a first one of the computing devices 242 includes a memory facility 244. The memory facility 244 includes both 'general memory' and other forms of memory such as virtual memory. The memory facility 244 is operatively connected to a processing facility 246 including at least one processor. The memory facility 244 includes computer information in the form of executable instructions and/or computer data. The memory facility 244 is accessible by the processing facility 246 in implementing the preferred arrangements.

As shown each of the computing devices 242 includes a system bus facility 248, a data store facility 250, an input interface facility 252 and an output interface facility 254. The data store facility 250 includes computer information in form of executable instructions and/or computer data. The data store facility 250 is operatively connected to the processing facility 246. The data store facility 250 is operatively connected to the memory facility 244. The data store facility 250 is accessible by the processing facility 246 in implementing the preferred arrangements.

Embodiments are considered to provide number of preferred arrangements including:
  Systems and methods that maintain a pool of computers in a manner that users will regularly be provided with virtual computers that incorporate recent updates.
  Systems and methods that maintain a pool of computers in a manner that is able to readily accommodate varying numbers of users requiring access at a different times, the precise time of each users requiring access being unknown.
  Systems and methods that maintain a pool of computers in a manner that is able to accommodate different user application classes by providing suspended virtual computers for different categories, and adding or removing applications for different user classes.
  Systems and methods that provide an application update mechanism that serves to update active virtual computers associated with users based on different user application classes associated with the users.

In embodiments of the present invention described in relation to FIGS. 1 to 12 possibly employing virtual computer provision techniques of FIGS. 1' to 27' computer information may be located across a number of devices and be provided in a number of forms. For example the facilities may include computer information in the form of executable instructions and/or computer data. The computer data information may be provided in the form of encoded data instructions, data signals, data structures, program logic for server side operation, program logic for client side operation, stored webpages and so forth that are accessible by other facilities On one level, input interfaces allow computer data to be received by the computing devices 242. On another level, input interfaces allow computer data to be received from individuals operating one or more computer devices. Output interfaces, on one level, allow for instructions to be sent to computing devices. On another level, output interfaces allow computer data to be sent to individuals. The input and output interface facilities 252, 254 provide input and output interfaces that are operatively associated with the processing facility 246. The input and output facilities 252, 254 allow for communication between the computing devices 242 and individuals.

The computing devices 242 provide a distributed system in which several devices are in communication over network and other interfaces to collectively provide the preferred arrangements. Preferably there is provided at least one client device in the system of computing devices 242 where the system is interconnected by a data network.

The client device may be provided with a client side software product for use in the system which, when used, provides systems and methods where the client device and other computer devices 242 communicate over a public data network. Preferably the software product contains computer information in the form of executable instructions and/or computer data for providing the preferred arrangements.

Input interfaces associated with keyboards, mice, trackballs, touchpad's, scanners, video cards, audio cards, network cards and the like are known. Output interfaces associated with monitors, printers, speakers, facsimiles, projectors and the like are known. Network interfaces in the form of wired or wireless interfaces for various forms of LANs, WANs and so forth are known. Storage facilities in the form of floppy disks, hard disks, disk cartridges, CD-ROMS, smart card, RAID systems are known. Volatile and non-volatile memory types including RAM, ROM, EEPROM and other data storage types are known. Various transmission facilities such as circuit board material, coaxial cable, fibre optics, wireless facilities and so forth are known.

It is to be appreciated that systems, components, facilities, interfaces and so forth can be provided in several forms. Systems, components, facilities, interfaces and so forth may be provided as hardware, software or a combination thereof. The present invention may be embodied as computer readable memory, a personal computer and distributed computing environments.

In addition the present invention may be embodied as: a number of computer executable operations; a number of computer executable components; a set of process operations; a set of systems, facilities or components; a computer readable medium having stored thereon computer executable instructions for performing computer implemented methods and/or providing computer implemented systems; and so forth. In the case of computer executable instructions they preferably encode the systems, components and facilities described herein. For example a computer-readable medium may be encoded with one or more facilities configured to run an application configured to carry out a number of operations forming at least part of the present arrangements. Computer readable mediums preferably participate in the provision of computer executable instructions to one or more processors of one or more computing devices.

Computer executable instructions are preferably executed by one or more computing devices to cause the one or more computing devices to operate as desired. Preferred data structures are preferably stored on a computer readable medium. The computer executable instructions may form part of an operating system of a computer device for performing at least part of the preferred arrangements. One or more computing devices may preferably implement the preferred arrangements.

The term computer is to be understood as including all forms of computing device including servers, personal computers, smart phones, digital assistants and distributed computing systems.

Computer readable mediums and so forth of the type envisaged are preferably intransient. Such computer readable mediums may be operatively associated with computer based transmission facilities for the transfer of computer data. Computer readable mediums may provide data signals. Computer readable mediums preferably include magnetic disks, optical disks and other electric/magnetic and physical storage mediums as may have or find application in the industry.

Components, systems and tasks may comprise a process involving the provision of executable instructions to perform a process or the execution of executable instructions within say a processor. Applications or other executable instructions may perform method operations in different orders to achieve similar results. It is to be appreciated that the blocks of systems and methods described may be embodied in any suitable arrangement and in any suited order of operation. Computing facilities, modules, interfaces and the like may be provided in distinct, separate, joined, nested or other forms arrangement. Methods will be apparent from systems described herein and systems will be apparent from methods described herein.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The invention claimed is:

1. A security device for connection as a peripheral device to a local computer, said security device comprising a connector to the local computer, a locked-down system environment that includes a remote-access connector and an authenticator facility,
   wherein the remote-access connector is configured to initiate a remote connection request with a remote virtual-computer service, wherein the authenticator facility is configured to provide first authentication-data to said remote-access connector for ensuring that said security device has permission to be allocated a virtual computer from said remote virtual-computer service,
   wherein the first authentication-data comprises a unique identifier of the security device and/or the local computer, wherein the first authentication-data is usable by the remote virtual-computer service to associate a user account on the remote virtual-computer service to the local computer itself or to the local computer when the security device is connected to the local computer, wherein said locked-down system environment comprises an operating system directed to preventing third-party attacks and that provides no more than remote desktop services and authentication services.

2. The device of claim 1, wherein said authenticator facility is configured to provide said remote access connector with said first authentication-data, and wherein said virtual-computer service is configured to send said first authentication data from the local computer to the remote virtual-computer service so that the remote virtual-computer service can authenticate said remote connection request.

3. The device of claim 1, wherein said first authentication-data includes authentication data that is unique to said local computer and authentication data that is unique to said security device.

4. The device of claim 3, wherein said first authentication-data is read from encrypted data read from readable storage forming part of said security device.

5. The device of claim 1, wherein said security device comprises removable media that is configured to be connected to provide an operating system when booting said local computer.

6. The device of claim 1, wherein said security device comprises a thumb drive.

7. A manufacture comprising a non-transitory computer readable medium having encoded thereon one or more facilities configured to run an application configured to carry out a number of operations to provide and/or implement a security device according to claim 1.

8. The device of claim 1, wherein said security device is located locally in relation to the local computer.

9. The device of claim 1, wherein the locked-down system environment is implemented on the local computer.

10. A method comprising providing virtual computers for use by users, wherein providing said virtual computers comprises providing a remote virtual-computer service and providing a user from a plurality of users with a user security-device for connection as a peripheral device to a local computer, the security device provides a locked-down operating environment that includes a remote-access connector and an authenticator facility, at said remote virtual-computer service, receiving a remote-connection request initiated by said user, said remote-connection request having been sent to said remote virtual-computer service by said remote-access connector after having received first authentication-data from said authenticator facility, wherein the first authentication-data comprises a unique identifier of the security device and/or the local computer, and, at said remote virtual-computer service, authenticating said first authentication-data to ensure that said security device is an authenticated security-device that has permission to be allocated a virtual computer from said remote virtual-computer service by using the first authentication-data to associate a user account on the remote virtual-computer service to the local computer itself or to the local computer when the security device is connected to the local computer, wherein said locked-down system environment comprises an operating system directed to preventing third-party attacks and that provides no more than remote desktop services and authentication services.

11. The method of claim 10, wherein the user security-devices are used by inserting each user security-device into a local computer, said user security-devices each providing said locked-down operating environment, said remote access connector initiating a remote connection request with said remote virtual-computer service; and said authenticator facility providing first authentication-data uniquely identifying said local computer to said remote access connector for ensuring that said security device has permission to be allocated a virtual computer from the remote virtual-computer service.

12. The method of claim 11 wherein during a configuration operation, said security device sends said first authentication data uniquely identifying said local computer and said remote virtual-computer services uses said first authentication data to associate said user's account on said remote virtual-computer service with said local computer.

13. The method of claim 11 wherein during a configuration operation, said security device sends said first authentication data uniquely identifying said local computer and said remote virtual-computer services uses said first authentication data to associate said user's account on said remote virtual-computer service with said local computer on a one to one basis.

14. The method of claim 11, further comprising causing at least one computer processor to participate in execution of providing virtual computers for use by users.

15. A manufacture comprising a non-transitory computer readable medium having stored thereon computer executable instructions for executing the method recited in claim 11.

16. A security device for connection as a peripheral device to a local computer, said security device comprising a connector to the local computer, a locked-down system environment comprising a minimum operating environment that extend only to allow the device to perform the functions of: a remote-access connector and an authenticator facility, both of which are within the locked down environment;
   wherein the remote-access connector is configured to initiate a remote connection request with a remote virtual-computer service,
   wherein the authenticator facility is configured to provide authentication-data to said remote-access connector for ensuring that said security device has permission to be allocated a virtual computer from said remote virtual-computer service, wherein the authentication-data is usable by the remote virtual-computer service to associate a user account on the remote virtual-computer service to the local computer itself or to the local computer when the security device is connected to the local computer,
   wherein the authentication data comprises data that is unique to said local computer and/or data that is unique to said security device and data that is a one-time password.

* * * * *